(12) United States Patent
Purkayastha et al.

(10) Patent No.: US 10,009,093 B2
(45) Date of Patent: Jun. 26, 2018

(54) HANDOFF FOR SATELLITE COMMUNICATION

(71) Applicant: QUALCOMM Incorporated, San Diego, CA (US)

(72) Inventors: Punyaslok Purkayastha, San Diego, CA (US); Fatih Ulupinar, San Diego, CA (US); Peter Barany, Rancho Palos Verdes, CA (US); Gene Wesley Marsh, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

(21) Appl. No.: 15/498,388

(22) Filed: Apr. 26, 2017

(65) Prior Publication Data
US 2017/0230104 A1 Aug. 10, 2017

Related U.S. Application Data

(63) Continuation-in-part of application No. 15/141,641, filed on Apr. 28, 2016, now Pat. No. 9,888,426, (Continued)

(51) Int. Cl.
*H04W 36/38* (2009.01)
*H04B 7/185* (2006.01)
(Continued)

(52) U.S. Cl.
CPC ........ *H04B 7/18541* (2013.01); *H04W 36/32* (2013.01); *H04W 64/00* (2013.01); *H04W 84/06* (2013.01); *H04W 88/16* (2013.01)

(58) Field of Classification Search
CPC ............ H04B 7/18513; H04B 7/18528; H04B 7/18523; H04B 7/18567; H04B 7/18589;
(Continued)

(56) References Cited

U.S. PATENT DOCUMENTS 5,483,664 A 1/1996 Moritz et al.
5,500,648 A 3/1996 Maine et al.
(Continued)

FOREIGN PATENT DOCUMENTS

EP 0637142 A1 2/1995
EP 0808034 A2 11/1997

OTHER PUBLICATIONS

International Search Report and Written Opinion—PCT/US2016/030263—ISA/EPO—dated Jul. 19, 2016.
(Continued)

*Primary Examiner* — Daniel Lai
(74) *Attorney, Agent, or Firm* — Loza & Loza LLP

(57) ABSTRACT

Various aspects of the disclosure relate to handoff (e.g., idle mode handoff or other types of handoff) for a user terminal. In some aspects, a user terminal (UT) may request idle mode handoff information from a ground network (GN). Idle mode handoff information may include, for example, start times for a set of satellites, whereby each particular start time indicates when the UT may handoff to the corresponding satellite. The UT may send the request for idle mode handoff information to the GN when the UT has a defined number of valid entries (e.g., one unexpired entry) remaining in an idle mode handoff table. In some aspects, the idle UT may send the request for idle mode handoff information to the GN based on a time associated with a particular entry in an idle mode handoff table or based on a time of validity of an idle mode handoff table.

30 Claims, 51 Drawing Sheets

Related U.S. Application Data which is a continuation-in-part of application No. 14/856,933, filed on Sep. 17, 2015, now Pat. No. 9,762,314.

(60) Provisional application No. 62/156,063, filed on May 1, 2015, provisional application No. 62/409,289, filed on Oct. 17, 2016.

(51) Int. Cl.
*H04W 36/32* (2009.01)
*H04W 64/00* (2009.01)
H04W 84/06 (2009.01)
H04W 88/16 (2009.01)

(58) Field of Classification Search
CPC ........... H04B 7/18595; H04B 7/18541; H04W 36/32; H04W 64/00; H04W 88/16; H04W 84/06
See application file for complete search history.

(56) References Cited

U.S. PATENT DOCUMENTS

| | | | |
|---|---|---|---|
| 5,574,968 A | 11/1996 | Olds et al. | |
| 5,678,184 A | 10/1997 | Cutler, Jr. et al. | |
| 5,912,641 A | 6/1999 | Dietrich | |
| 5,966,640 A | 10/1999 | Leath et al. | |
| 5,999,797 A | 12/1999 | Zancho et al. | |
| 6,023,242 A | 2/2000 | Dixon | |
| 6,108,538 A * | 8/2000 | Blasiak | H04B 7/18541 370/316 |
| 6,512,920 B1 * | 1/2003 | Yaoya | H04B 7/18541 455/428 |
| 6,571,102 B1 | 5/2003 | Hogberg et al. | |
| 6,868,270 B2 | 3/2005 | Dent | |
| 6,920,323 B1 | 7/2005 | Grayson | |
| 7,136,620 B2 | 11/2006 | Wang | |
| 7,558,226 B2 | 7/2009 | Anderson et al. | |
| 8,223,719 B2 | 7/2012 | Hong et al. | |
| 2002/0052180 A1 | 5/2002 | Ravishankar et al. | |
| 2004/0014452 A1 | 1/2004 | Lim et al. | |
| 2007/0010252 A1 | 1/2007 | Balachandran et al. | |
| 2007/0135040 A1 | 6/2007 | Draim | |
| 2009/0041246 A1 | 2/2009 | Kitazoe | |
| 2010/0039984 A1 | 2/2010 | Brownrigg | |
| 2011/0013542 A1 | 1/2011 | Yu et al. | |
| 2013/0051360 A1 | 2/2013 | Monte et al. | |
| 2014/0045437 A1 | 2/2014 | Keskitalo | |
| 2014/0057634 A1 | 2/2014 | Chang et al. | |
| 2014/0128075 A1 | 5/2014 | Da et al. | |
| 2015/0271730 A1 | 9/2015 | Benammar et al. | |
| 2015/0381263 A1 | 12/2015 | Lejnell et al. | |
| 2016/0323032 A1 | 11/2016 | Ulupinar et al. | |
| 2016/0323800 A1 | 11/2016 | Ulupinar et al. | |

OTHER PUBLICATIONS

International Search Report and Written Opinion—PCT/US2016/029050—ISA/EPO—dated Jul. 19, 2016.
International Search Report and Written Opinion—PCT/US2017/029871—ISA/EPO—dated Jul. 19, 2017.

\* cited by examiner

HANDOFF FOR SATELLITE COMMUNICATION

CROSS-REFERENCE TO RELATED APPLICATION(S)

This application is a continuation-in-part of patent application Ser. No. 15/141,641 filed in the U.S. Patent and Trademark Office on Apr. 28, 2016, which is a continuation-in-part of patent application Ser. No. 14/856,933 filed in the U.S. Patent and Trademark Office on Sep. 17, 2015, and claims priority to and the benefit of provisional patent application No. 62/156,063 filed in the U.S. Patent and Trademark Office on May 1, 2015, and provisional patent application No. 62/409,289 filed in the U.S. Patent and Trademark Office on Oct. 17, 2016, the entire content of each of which is incorporated herein by reference.

INTRODUCTION

Various aspects described herein relate to satellite communication, and more particularly but not exclusively, to handoff for non-geosynchronous satellite communication.

Satellite-based communication systems may include gateways and one or more satellites to relay communication signals between the gateways and one or more user terminals. A gateway is an earth station having an antenna for transmitting signals to, and receiving signals from, communication satellites. A gateway provides communication links, using satellites, for connecting a user terminal to other user terminals or users of other communication systems, such as a public switched telephone network, the Internet and various public and/or private networks. A satellite is an orbiting receiver and repeater used to relay information.

A satellite can receive signals from and transmit signals to a user terminal provided the user terminal is within the "footprint" of the satellite. The footprint of a satellite is the geographic region on the surface of the Earth within the range of signals of the satellite. The footprint is usually geographically divided into "beams," through the use of antennas (e.g., the antennas may be used to create fixed, static beams or may be used to create dynamically adjustable beams through beam-forming techniques). Each beam covers a particular geographic region within the footprint. Beams may be directed so that more than one beam from the same satellite covers the same specific geographic region. In addition, beams from multiple satellites may be directed to cover the same geographic region. A cell may constitute any forward link frequency and/or return link frequency within a beam. In a case where each beam uses only one frequency, the terms "cell" and "beam" may be interchangeable.

Geosynchronous satellites have long been used for communication. A geosynchronous satellite is stationary relative to a given location on the Earth, and thus there is little timing shift and Doppler frequency shift in radio signal propagation between a communication transceiver on the Earth and the geosynchronous satellite. However, because geosynchronous satellites are limited to a geosynchronous orbit (GSO), which is a circle having a radius of approximately 42,164 km from the center of the Earth directly above the Earth's equator, the number of satellites that may be placed in the GSO is limited.

As alternatives to geosynchronous satellites, communication systems which utilize a constellation of satellites in non-geosynchronous orbits, such as low-earth orbits (LEO), have been devised to provide communication coverage to the entire Earth or at least large parts of the Earth. In non-geosynchronous satellite-based systems, such as LEO satellite-based systems, the satellites move relative to ground-based communication devices such as gateways or user terminals. Thus, at some point in time, a user terminal will be handed-off from one satellite to another. Consequently, there is a need for techniques that enable a user terminal to be efficiently handed-off to the best available satellite.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In one aspect, the disclosure provides a method for communication including: identifying a time associated with a particular entry of a set of handoff entries, wherein the set of handoff entries identifies a set of satellites for handoff of the apparatus; determining, based on the identified time, whether to send a request for an updated set of handoff entries; and sending the request for an updated set of handoff entries if the determination is to send the request.

In some aspects, the set of handoff entries may include (e.g., may be) an idle mode handoff table. In some aspects, the time may include a start time for a handoff to one satellite of the set of satellites. In some aspects, the particular entry may include a last entry of the set of handoff entries. In some aspects, the set of satellites may be for an idle mode operation of the apparatus. In some aspects, the time may indicate when the apparatus is to handoff to one satellite of the set of satellites while the apparatus is in an idle mode. In some aspects, the set of handoff entries may identify times at which the apparatus when in idle mode is to handoff to each satellite of the set of satellites. In some aspects, the set of handoff entries may include, for each satellite, a time for the apparatus when in idle mode to handoff to the satellite. In some aspects, the request may be communicated when the apparatus establishes a Radio connection with a ground network. In some aspects, the apparatus may include (e.g., may be) a user terminal. In some aspects, the request may be sent to a ground network.

In one aspect, the disclosure provides an apparatus configured for communication that includes a memory and a processor coupled to the memory. The processor and the memory are configured to: identify a time associated with a particular entry of a set of handoff entries, wherein the set of handoff entries identifies a set of satellites for handoff of the apparatus; determine, based on the identified time, whether to send a request for an updated set of handoff entries; and send the request for an updated set of handoff entries if the determination is to send the request.

In some aspects, the set of handoff entries may include an idle mode handoff table; and the idle mode handoff table may include, for each satellite, a time for the apparatus when in idle mode to handoff to the satellite. In some aspects, the processor and the memory may be further configured to send an indication of the time in conjunction with the sending of the request. In some aspects, the processor and the memory may be further configured to send an indication of a time of validity associated with the set of handoff entries in conjunction with the sending of the request. In some aspects, the processor and the memory may be further configured to: receive the updated set of handoff entries after sending the request; and hand off to a satellite identified by the updated set of handoff entries at a time indicated by the updated set of handoff entries. In some aspects, the processor and the memory may be further configured to receive an indication of at least one carrier frequency at which a next cell that provides coverage for the apparatus will be transmitting; and the handoff to the satellite identified by the updated set of handoff entries may be conducted on the at least one carrier frequency. In some aspects, the processor and the memory may be further configured to: determine location information for the apparatus; and send the location information in conjunction with the sending of the request.

In one aspect, the disclosure provides an apparatus configured for communication. The apparatus including: means for identifying a time associated with a particular entry of a set of handoff entries, wherein the set of handoff entries identifies a set of satellites for handoff of the apparatus; means for determining, based on the identified time, whether to send a request for an updated set of handoff entries; and means for sending the request for an updated set of handoff entries if the determination is to send the request.

In some aspects, the means for sending may be configured to send an indication of the time in conjunction with the sending of the request. In some aspects, the means for sending may be configured to send an indication of a time of validity associated with the set of handoff entries in conjunction with the sending of the request. In some aspects, the apparatus may include: means for receiving the updated set of handoff entries after sending the request; and means for handing off the apparatus to a satellite identified by the updated set of handoff entries at a time indicated by the updated set of handoff entries. In some aspects, the means for receiving may be configured to receive an indication of at least one carrier frequency at which a next cell that provides coverage for the apparatus will be transmitting; and the handoff to the satellite identified by the updated set of handoff entries may be conducted on the at least one carrier frequency. In some aspects, the apparatus may include means for determining location information for the apparatus, wherein the means for sending may be further configured to send the location information in conjunction with the sending of the request.

In one aspect, the disclosure provides a non-transitory computer-readable medium storing computer-executable code, including code to: identify a time associated with a particular entry of a set of handoff entries, wherein the set of handoff entries identifies a set of satellites for handoff of the apparatus; determine, based on the identified time, whether to send a request for an updated set of handoff entries; and send the request for an updated set of handoff entries if the determination is to send the request.

In one aspect, the disclosure provides a method for communication including: identifying a quantity of valid entries in a set of handoff entries, wherein the set of handoff entries identifies a set of satellites for handoff of the apparatus; determining, based on the identified quantity, whether to send a request for an updated set of handoff entries; and sending the request for an updated set of handoff entries if the determination is to send the request.

In some aspects, the determination of whether to send the request for an updated set of handoff entries may include determining whether the set of handoff entries includes only one valid entry. In some aspects, the request may be communicated when the apparatus establishes a Radio connection with a ground network. In some aspects, the set of handoff entries may identify times at which the apparatus when in idle mode is to handoff to each satellite of the set of satellites.

In one aspect, the disclosure provides an apparatus configured for communication that includes a memory and a processor coupled to the memory. The processor and the memory are configured to: identify a quantity of valid entries in a set of handoff entries, wherein the set of handoff entries identifies a set of satellites for handoff of the apparatus; determine, based on the identified quantity, whether to send a request for an updated set of handoff entries; and send the request for an updated set of handoff entries if the determination is to send the request.

In some aspects, the processor and the memory may be further configured to: receive the updated set of handoff entries after sending the request; and hand off to a satellite identified by the updated set of handoff entries at a time indicated by the updated set of handoff entries. In some aspects, the processor and the memory may be further configured to receive an indication of at least one carrier frequency at which a next cell that provides coverage for the apparatus will be transmitting; and the handoff to the satellite identified by the updated set of handoff entries may be conducted on the at least one carrier frequency. In some aspects, the processor and the memory may be further configured to: determine location information for the apparatus; and send the location information in conjunction with the sending of the request.

In one aspect, the disclosure provides an apparatus configured for communication. The apparatus including: means for identifying a quantity of valid entries in a set of handoff entries, wherein the set of handoff entries identifies a set of satellites for handoff of the apparatus; means for determining, based on the identified quantity, whether to send a request for an updated set of handoff entries; and means for sending the request for an updated set of handoff entries if the determination is to send the request.

In some aspects, the apparatus may include: means for receiving the updated set of handoff entries after sending the request; and means for handing off the apparatus to a satellite identified by the updated set of handoff entries at a time indicated by the updated set of handoff entries. In some aspects, the means for receiving may be configured to receive an indication of at least one carrier frequency at which a next cell that provides coverage for the apparatus will be transmitting; and the handoff to the satellite identified by the updated set of handoff entries may be conducted on the at least one carrier frequency. In some aspects, the apparatus may include means for determining location information for the apparatus, wherein the means for sending may be configured to send the location information in conjunction with the sending of the request.

In one aspect, the disclosure provides a non-transitory computer-readable medium storing computer-executable code, including code to: identify a quantity of valid entries in a set of handoff entries, wherein the set of handoff entries identifies a set of satellites for handoff of the apparatus; determine, based on the identified quantity, whether to send a request for an updated set of handoff entries; and send the request for an updated set of handoff entries if the determination is to send the request.

In one aspect, the disclosure provides a method for communication including: identifying a time of validity associated with a set of handoff entries, wherein the set of handoff entries identifies a set of satellites for handoff of another apparatus; determining, based on the identified time of validity, whether to send an updated set of handoff entries; and sending the updated set of handoff entries if the determination is to send the updated set of handoff entries.

In some aspects, the time of validity indicates a duration of time that the set of handoff entries may be valid. In some aspects, the identification of the time of validity may include receiving an indication of the time of validity. In some aspects, the identification of the time of validity may include: receiving an indication of a time associated with a particular entry of the set of handoff entries; and determining the time of validity based on the received indication. In some aspects, the identification of the time of validity may include determining a time associated with a last valid entry in the set of handoff entries. In some aspects, the set of handoff entries may include a last set of handoff entries sent by the apparatus to the other apparatus. In some aspects, the apparatus may include (e.g., may be) a ground network. In some aspects, the updated set of handoff entries may be sent to a user terminal.

In one aspect, the disclosure provides an apparatus configured for communication that includes a memory and a processor coupled to the memory. The processor and the memory are configured to: identify a time of validity associated with a set of handoff entries, wherein the set of handoff entries identifies a set of satellites for handoff of another apparatus; determine, based on the identified time of validity, whether to send an updated set of handoff entries; and send the updated set of handoff entries if the determination is to send the updated set of handoff entries.

In some aspects, the processor and the memory may be further configured to receive location information for the other apparatus. In some aspects, the processor and the memory may be further configured to generate the updated set of handoff entries based on the location information; and the updated set of handoff entries may be sent to the other apparatus. In some aspects, the processor and the memory may be further configured to receive location information for the other apparatus; and the determination of whether to send the updated set of handoff entries may be further based on the location information. In some aspects, the processor and the memory may be further configured to receive location information for the other apparatus. In some aspects, the processor and the memory may be further configured to determine movement of the other apparatus based on the location information; and the determination of whether to send the updated set of handoff entries may be further based on the movement of the other apparatus. In some aspects, the processor and the memory may be further configured to: receive location information for the other apparatus; determine movement of the other apparatus based on the location information; and determine how many updated handoff entries to send based on the movement of the other apparatus.

In one aspect, the disclosure provides an apparatus configured for communication. The apparatus including: means for identifying a time of validity associated with a set of handoff entries, wherein the set of handoff entries identifies a set of satellites for handoff of another apparatus; means for determining, based on the identified time of validity, whether to send an updated set of handoff entries; and means for sending the updated set of handoff entries if the determination is to send the updated set of handoff entries.

In some aspects, the apparatus may include: means for receiving location information for the other apparatus; and means for generating the updated set of handoff entries based on the location information, wherein the updated set of handoff entries may be sent to the other apparatus. In some aspects, the apparatus may include means for receiving location information for the other apparatus, wherein the determination of whether to send the updated set of handoff entries may be further based on the location information. In some aspects, the apparatus may include: means for receiving location information for the other apparatus; and means for determining movement of the other apparatus based on the location information, wherein the determination of whether to send the updated set of handoff entries may be further based on the movement of the other apparatus. In some aspects, the apparatus may include: means for receiving location information for the other apparatus; means for determining movement of the other apparatus based on the location information; and means for determining how many updated handoff entries to send based on the movement of the other apparatus.

In one aspect, the disclosure provides a non-transitory computer-readable medium storing computer-executable code for an apparatus, including code to: identify a time of validity associated with a set of handoff entries, wherein the set of handoff entries identifies a set of satellites for handoff of another apparatus; determine, based on the identified time of validity, whether to send an updated set of handoff entries; and send the updated set of handoff entries if the determination is to send the updated set of handoff entries.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

The accompanying drawings are presented to aid in the description of aspects of the disclosure and are provided solely for illustration of the aspects and not limitations thereof.

The accompanying drawings are presented to aid in the description of aspects of the disclosure and are provided solely for illustration of the aspects and not limitations thereof.

DETAILED DESCRIPTION

Various aspects of the disclosure relate to idle mode handoff for a user terminal (UT). In some scenarios, an idle UT requests idle mode handoff information from a ground network (GN). The idle mode handoff information may include, for example, start times for a set of satellites, whereby each particular start time indicates when the idle UT may handoff to the corresponding satellite. In some aspects, the idle UT may send the request for idle mode handoff information to the GN when the idle UT has a defined number of valid entries (e.g., one unexpired entry) remaining in an idle mode handoff table. In some aspects, the idle UT may send the request for idle mode handoff information to the GN based on a time associated with a particular entry (e.g., the last entry) in an idle mode handoff table. In some aspects, the idle UT may send the request for idle mode handoff information to the GN based on a time of validity of an idle mode handoff table. In some aspects, the idle UT may send the request for idle mode handoff information to the GN when the idle UT establishes a Radio connection with the GN. In some aspects, the GN may autonomously (e.g., without a request from the idle UT) send idle mode handoff information to the idle UT when the idle UT establishes a Radio connection with the GN.

Aspects of the disclosure are described in the following description and related drawings directed to specific examples. Alternate examples may be devised without departing from the scope of the disclosure. Additionally, well-known elements will not be described in detail or will be omitted so as not to obscure the relevant details of the disclosure.

Figure 1:
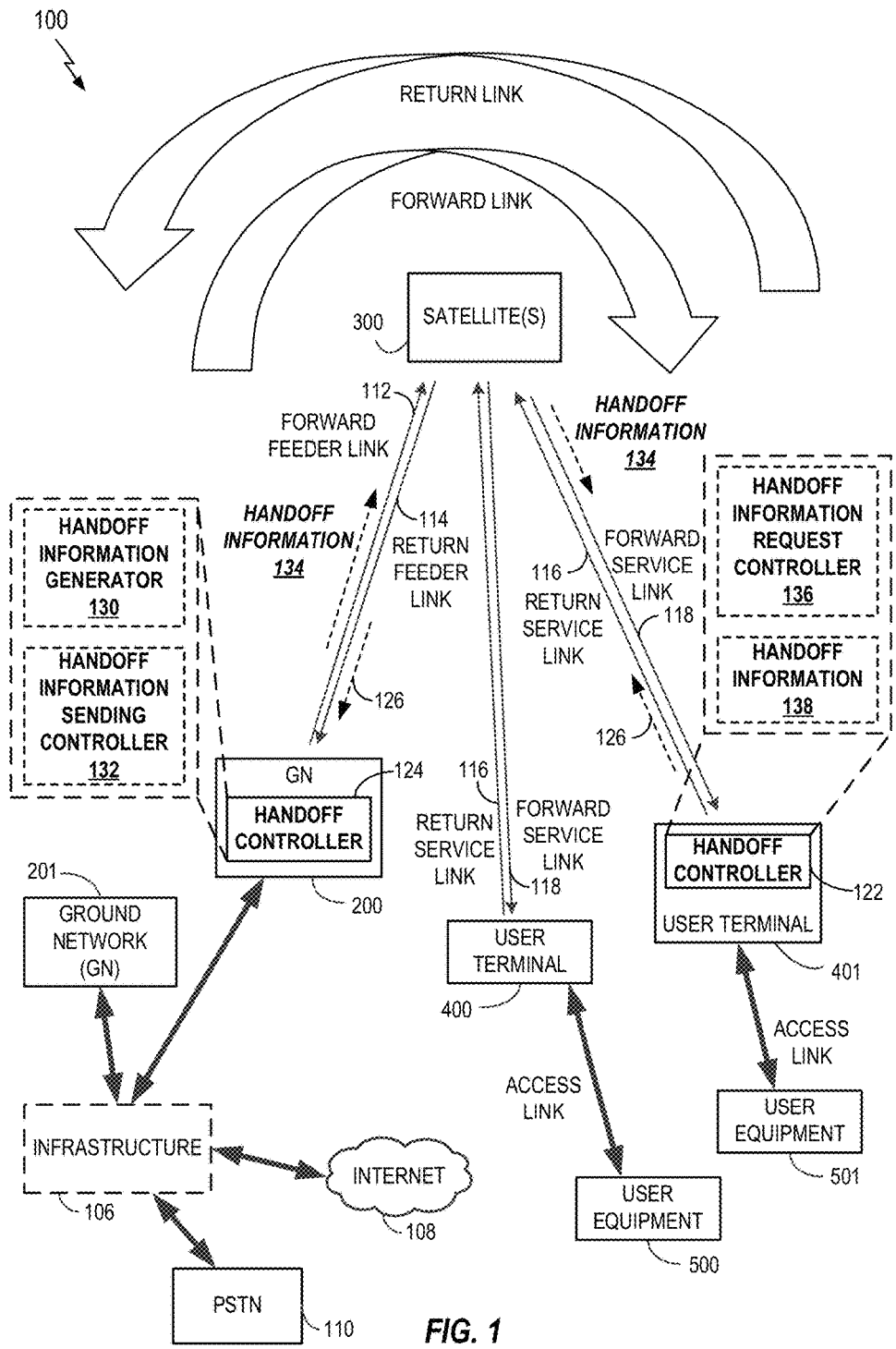
FIG. 1 is a block diagram of an example communication system in accordance with some aspects of the disclosure.

FIG. 1 illustrates an example of a satellite communication system 100 which includes a plurality of satellites (although only one satellite 300 is shown for clarity of illustration) in non-geosynchronous orbits, for example, low-earth orbits (LEO), a ground network 200 (e.g., corresponding to a satellite gateway or a satellite network portal) in communication with the satellite 300, a plurality of UTs 400 and 401 in communication with the satellite 300, and a plurality of user equipment (UE) 500 and 501 in communication with the UTs 400 and 401, respectively. Each UE 500 or 501 may be a user device such as a mobile device, a telephone, a smartphone, a tablet, a laptop computer, a computer, a wearable device, a smart watch, an audiovisual device, or any device including the capability to communicate with a UT. Additionally, the UE 500 and/or the UE 501 may be a device (e.g., access point, small cell, etc.) that is used to communicate to one or more end user devices. In the example illustrated in FIG. 1, the UT 400 and the UE 500 communicate with each other via a bidirectional access link (having a forward access link and a return access link), and similarly, the UT 401 and the UE 501 communicate with each other via another bidirectional access link. In another implementation, one or more additional UEs (not shown) may be configured to receive only and therefore communicate with a UT only using a forward access link. In another implementation, one or more additional UEs (not shown) may also communicate with the UT 400 or the UT 401. Alternatively, a UT and a corresponding UE may be integral parts of a single physical device, such as a mobile telephone with an integral satellite transceiver and an antenna for communicating directly with a satellite, for example.

The GN 200 may have access to the Internet 108 or one or more other types of public, semiprivate or private networks. In the example illustrated in FIG. 1, the GN 200 is in communication with infrastructure 106, which is capable of accessing the Internet 108 or one or more other types of public, semiprivate or private networks. The GN 200 may also be coupled to various types of communication backhaul, including, for example, landline networks such as optical fiber networks or public switched telephone networks (PSTN) 110. Further, in alternative implementations the GN 200 may interface to the Internet 108, PSTN 110, or one or more other types of public, semiprivate or private networks without using the infrastructure 106. Still further, the GN 200 may communicate with other GNs, such as the GN 201 through the infrastructure 106 or alternatively may be configured to communicate to the GN 201 without using the infrastructure 106. The infrastructure 106 may include, in whole or part, a network control center (NCC), a satellite control center (SCC), a wired and/or wireless core network and/or any other components or systems used to facilitate operation of and/or communication with the satellite communication system 100.

Communication between the satellite 300 and the GN 200 in both directions are called feeder links, whereas communication between the satellite and each of the UTs 400 and 401 in both directions are called service links. A signal path from the satellite 300 to a ground station, which may be the GN 200 or one of the UTs 400 and 401, may be generically called a downlink. A signal path from a ground station to the satellite 300 may be generically called an uplink. Additionally, as illustrated, signals can have a general directionality such as a forward link and a return link (or reverse link). Accordingly, a communication link in a direction originating from the GN 200 and terminating at the UT 400 through the satellite 300 is called a forward link, whereas a communication link in a direction originating from the UT 400 and terminating at the GN 200 through the satellite 300 is called a return link or a reverse link. As such, the signal path from the GN 200 to the satellite 300 is labeled a "Forward Feeder Link" 112 whereas the signal path from the satellite 300 to the GN 200 is labeled a "Return Feeder Link" 114 in FIG. 1. In a similar manner, the signal path from each UT 400 or 401 to the satellite 300 is labeled a "Return Service Link" 116 whereas the signal path from the satellite 300 to each UT 400 or 401 is labeled a "Forward Service Link" 118 in FIG. 1.

A handoff controller 122 of the UT 401 and a handoff controller 124 of the GN 200 cooperate to control handoff of the UT 401 from one satellite or cell to another. Other components of the satellite communication system 100 may include corresponding handoff controllers as well. For example, other GNs, satellites, and UTs (not shown) may include a corresponding controller. However, handoff controllers are only illustrated for the UT 401 and the GN 200 to reduce the complexity of FIG. 1.

The handoff controller 122 of the UT 401 sends UT information (e.g., including UT location information and/or UT capability information) to the handoff controller 124 of the GN 200 via the satellite 300 (e.g., via signaling 126). In addition, the handoff controller 122 includes a handoff information request controller 136 that determines whether to also send a handoff information request to the handoff controller 124 of the GN 200 (e.g., via signaling 126).

The handoff controller 124 includes a handoff information generator 130 that generates handoff information (e.g., a handoff table) indicative of handoff timing for the UT 401. In some aspects, the handoff information generator 130 may generate handoff information based, at least in part, on the UT information, satellite locations over time (obtained from ephemeris data), satellite cell patterns, and satellite cell turn-on and turn-off schedules. The handoff controller 124 also includes a handoff information sending controller 132 that determines whether to send handoff information 134 to the handoff controller 122 via the current satellite 300. In some aspects, the handoff information sending control 132 may send the handoff information 134 in response to a handoff information request from the UT 401.

The handoff controller 122 receives the handoff information 134 via the current satellite 300 and maintains a local copy of handoff information (e.g., a handoff table) 138. The handoff controller 122 can then control handoff of the UT 401 based on the handoff information 138.

In some implementations, the satellite communication system 100 manages idle mode handoff information. For example, the handoff controller 124 may determine (e.g., generate) the idle mode handoff information and send the idle mode handoff information to the handoff controller 122. In some aspects, the handoff controller 124 may receive UT information (e.g., UT location information) from the UT 401 and manages its idle mode handoff information based on the UT information. In some aspects, the handoff controller 122 may receive and manage a local copy of idle mode handoff information.

Figure 2:
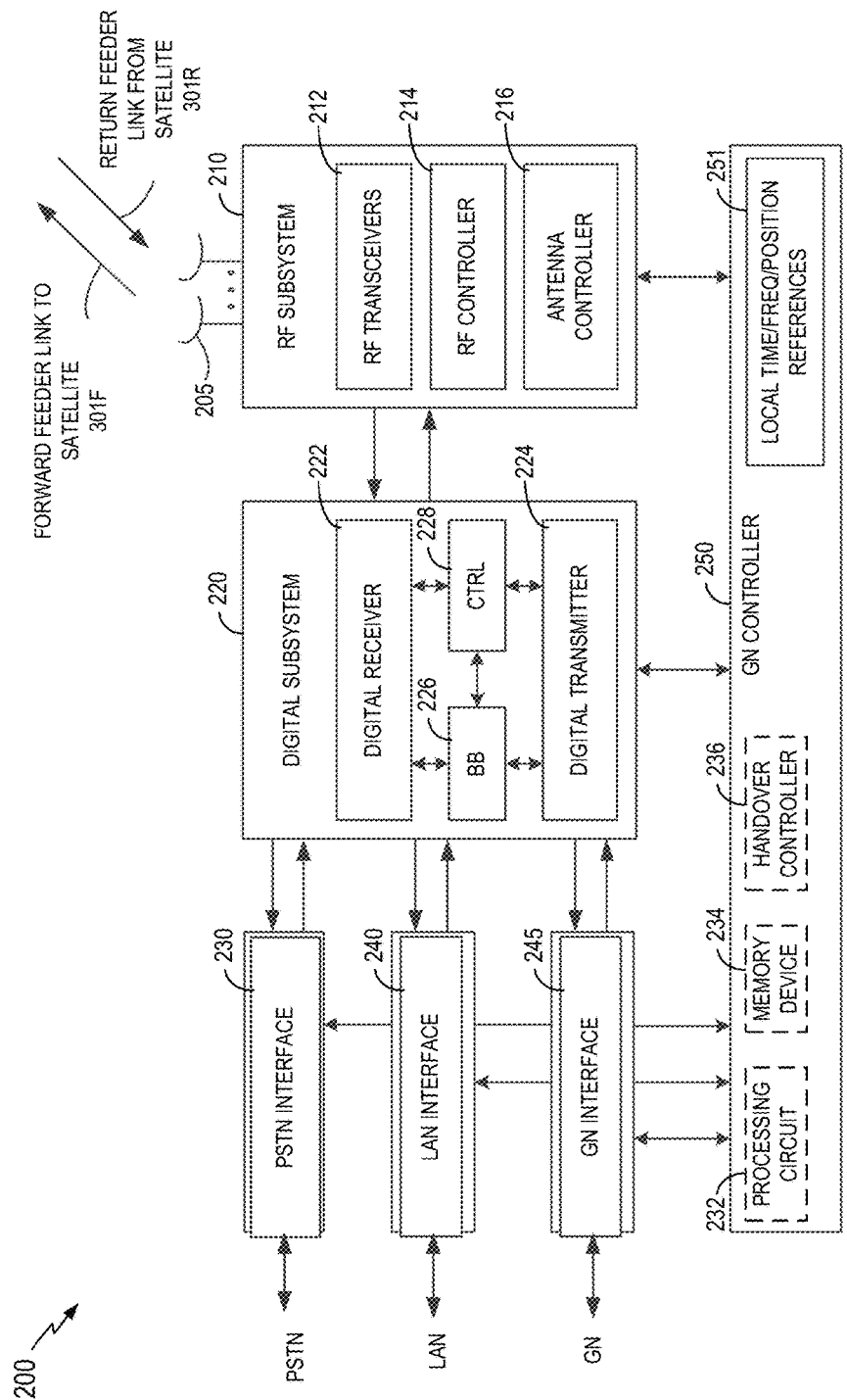
FIG. 2 is a block diagram of one example of a ground network (GN) of FIG. 1 in accordance with some aspects of the disclosure.

FIG. 2 is an example block diagram of the GN 200, which also can apply to the GN 201 of FIG. 1. The GN 200 is shown to include a number of antennas 205, an RF subsystem 210, a digital subsystem 220, a Public Switched Telephone Network (PSTN) interface 230, a Local Area Network (LAN) interface 240, a GN interface 245, and a GN controller 250. The RF subsystem 210 is coupled to the antennas 205 and to the digital subsystem 220. The digital subsystem 220 is coupled to the PSTN interface 230, to the LAN interface 240, and to the GN interface 245. The GN controller 250 is coupled to the RF subsystem 210, the digital subsystem 220, the PSTN interface 230, the LAN interface 240, and the GN interface 245.

The RF subsystem 210, which may include a number of RF transceivers 212, an RF controller 214, and an antenna controller 216, may transmit communication signals to the satellite 300 via a forward feeder link 301F, and may receive communication signals from the satellite 300 via a return feeder link 301R. Although not shown for simplicity, each of the RF transceivers 212 may include a transmit chain and a receive chain. Each receive chain may include a low noise amplifier (LNA) and a down-converter (e.g., a mixer) to amplify and down-convert, respectively, received communication signals in a well-known manner. In addition, each receive chain may include an analog-to-digital converter (ADC) to convert the received communication signals from analog signals to digital signals (e.g., for processing by the digital subsystem 220). Each transmit chain may include an up-converter (e.g., a mixer) and a power amplifier (PA) to up-convert and amplify, respectively, communication signals to be transmitted to the satellite 300 in a well-known manner. In addition, each transmit chain may include a digital-to-analog converter (DAC) to convert the digital signals received from the digital subsystem 220 to analog signals to be transmitted to the satellite 300.

The RF controller 214 may be used to control various aspects of a number of RF transceivers 212 (e.g., selection of the carrier frequency, frequency and phase calibration, gain settings, and the like). The antenna controller 216 may control various aspects of the antennas 205 (e.g., beamforming, beam steering, gain settings, frequency tuning, and the like).

The digital subsystem 220 may include a number of digital receiver modules 222, a number of digital transmitter modules 224, a baseband (BB) processor 226, and a control (CTRL) processor 228. The digital subsystem 220 may process communication signals received from the RF subsystem 210 and forward the processed communication signals to the PSTN interface 230 and/or the LAN interface 240, and may process communication signals received from the PSTN interface 230 and/or the LAN interface 240 and forward the processed communication signals to the RF subsystem 210.

Each digital receiver module 222 may correspond to signal processing elements used to manage communication between the GN 200 and the UT 400. One of the receive chains of RF transceivers 212 may provide input signals to multiple digital receiver modules 222. A number of digital receiver modules 222 may be used to accommodate all of the satellite beams and possible diversity mode signals being handled at any given time. Although not shown for simplicity, each digital receiver module 222 may include one or more digital data receivers, a searcher receiver, and a diversity combiner and decoder circuit. The searcher receiver may be used to search for appropriate diversity modes of carrier signals, and may be used to search for pilot signals (or other relatively fixed pattern strong signals).

The digital transmitter modules 224 may process signals to be transmitted to the UT 400 via the satellite 300. Although not shown for simplicity, each digital transmitter module 224 may include a transmit modulator that modulates data for transmission. The transmission power of each transmit modulator may be controlled by a corresponding digital transmit power controller (not shown for simplicity) that may (1) apply a minimum level of power for purposes of interference reduction and resource allocation and (2) apply appropriate levels of power when needed to compensate for attenuation in the transmission path and other path transfer characteristics.

The control processor 228, which is coupled to the digital receiver modules 222, the digital transmitter modules 224, and the baseband processor 226, may provide command and control signals to effect functions such as, but not limited to, signal processing, timing signal generation, power control, handoff control, diversity combining, and system interfacing.

The control processor 228 may also control the generation and power of pilot, synchronization, and paging channel signals and their coupling to the transmit power controller (not shown for simplicity). The pilot channel is a signal that is not modulated by data, and may use a repetitive unchanging pattern or non-varying frame structure type (pattern) or tone type input. For example, the orthogonal function used to form the channel for the pilot signal generally has a constant value, such as all 1's or 0's, or a well-known repetitive pattern, such as a structured pattern of interspersed 1's and 0's.

The baseband processor 226 is well known in the art and is therefore not described in detail herein. For example, the baseband processor 226 may include a variety of known elements such as (but not limited to) coders, data modems, and digital data switching and storage components.

The PSTN interface 230 may provide communication signals to, and receive communication signals from, an external PSTN either directly or through additional infrastructure 106, as illustrated in FIG. 1. The PSTN interface 230 is well known in the art, and therefore is not described in detail herein. For other implementations, the PSTN interface 230 may be omitted, or may be replaced with any other suitable interface that connects the GN 200 to a ground-based network (e.g., the Internet).

The LAN interface 240 may provide communication signals to, and receive communication signals from, an external LAN. For example, the LAN interface 240 may be coupled to the Internet 108 either directly or through additional infrastructure 106, as illustrated in FIG. 1. The LAN interface 240 is well known in the art, and therefore is not described in detail herein.

The GN interface 245 may provide communication signals to, and receive communication signals from, one or more other GNs associated with the satellite communication system 100 of FIG. 1 (and/or to/from GNs associated with other satellite communication systems, not shown for simplicity). For some implementations, the GN interface 245 may communicate with other GNs via one or more dedicated communication lines or channels (not shown for simplicity). For other implementations, the GN interface 245 may communicate with other GNs using the PSTN 110 and/or other networks such as the Internet 108 (see also FIG. 1). For at least one implementation, the GN interface 245 may communicate with other GNs via the infrastructure 106.

Overall GN control may be provided by the GN controller 250. The GN controller 250 may plan and control utilization of the satellite 300's resources by the GN 200. For example, the GN controller 250 may analyze trends, generate traffic plans, allocate satellite resources, monitor (or track) satellite positions, and monitor the performance of the GN 200 and/or the satellite 300. The GN controller 250 may also be coupled to a ground-based satellite controller (not shown for simplicity) that maintains and monitors orbits of the satellite 300, relays satellite usage information to the GN 200, tracks the positions of the satellite 300, and/or adjusts various channel settings of the satellite 300.

For the example implementation illustrated in FIG. 2, the GN controller 250 includes local time, frequency, and position references 251, which may provide local time or frequency information to the RF subsystem 210, the digital subsystem 220, and/or the interfaces 230, 240, and 245. The time or frequency information may be used to synchronize the various components of the GN 200 with each other and/or with the satellite(s) 300. The local time, frequency, and position references 251 may also provide position information (e.g., ephemeris data) of the satellite(s) 300 to the various components of the GN 200. Further, although depicted in FIG. 2 as included within the GN controller 250, for other implementations, the local time, frequency, and the position references 251 may be a separate subsystem that is coupled to the GN controller 250 (and/or to one or more of the digital subsystem 220 and the RF subsystem 210).

Although not shown in FIG. 2 for simplicity, the GN controller 250 may also be coupled to a network control center (NCC) and/or a satellite control center (SCC). For example, the GN controller 250 may allow the SCC to communicate directly with the satellite(s) 300, for example, to retrieve ephemeris data from the satellite(s) 300. The GN controller 250 may also receive processed information (e.g., from the SCC and/or the NCC) that allows the GN controller 250 to properly aim its antennas 205 (e.g., at the appropriate satellite(s) 300), to schedule beam transmissions, to coordinate handoffs, and to perform various other well-known functions.

The GN controller 250 may include one or more of a processing circuit 232, a memory device 234, or a handoff controller 236 that independently or cooperatively perform handoff information-related operations for the GN 200 as taught herein. In an example implementation, the processing circuit 232 is configured (e.g., programmed) to perform some or all of these operations. In another example implementation, the processing circuit 232 (e.g., in the form of a processor) executes code stored in the memory device 234 to perform some or all of these operations. In another example implementation, the handoff controller 236 is configured (e.g., programmed) to perform some or all of these operations. Although depicted in FIG. 2 as included within the GN controller 250, for other implementations, one or more of the processing circuit 232, the memory device 234, or the handoff controller 236 may be a separate subsystem that is coupled to the GN controller 250 (and/or to one or more of the digital subsystem 220 and the RF subsystem 210).

Figure 3:
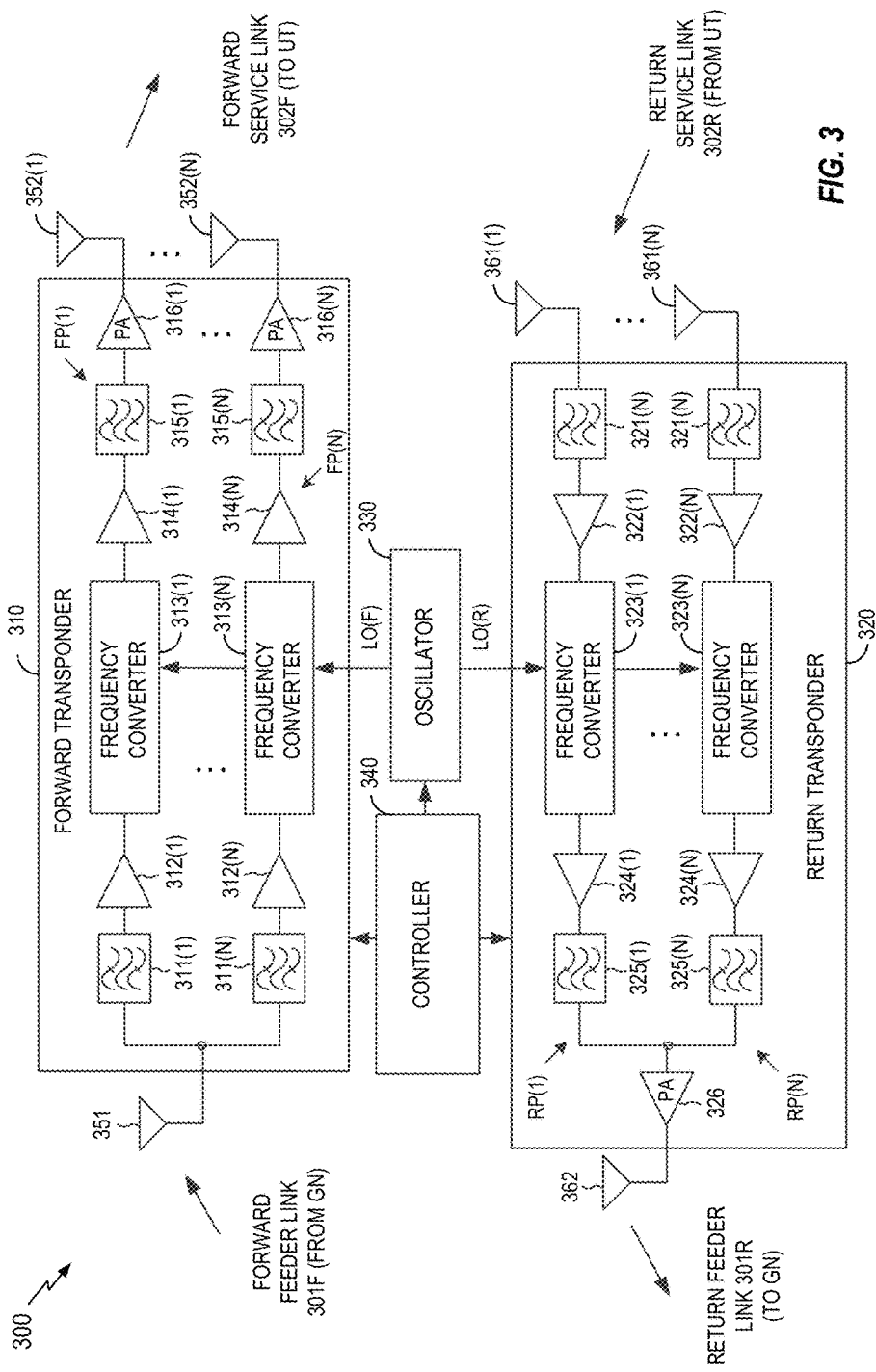
FIG. 3 is a block diagram of one example of a satellite of FIG. 1 in accordance with some aspects of the disclosure.

FIG. 3 is an example block diagram of the satellite 300 for illustrative purposes only. It will be appreciated that specific satellite configurations can vary significantly and may or may not include on-board processing. Further, although illustrated as a single satellite, two or more satellites using inter-satellite communication may provide the functional connection between the GN 200 and the UT 400. It will be appreciated that the disclosure is not limited to any specific satellite configuration and any satellite or combinations of satellites that can provide the functional connection between the GN 200 and UT 400 can be considered within the scope of the disclosure. In one example, the satellite 300 is shown to include a forward transponder 310, a return transponder 320, an oscillator 330, a controller 340, forward link antennas 351 and 352(1)-352(N), and return link antennas 362 and 361(1)-361(N). The forward transponder 310, which may process communication signals within a corresponding channel or frequency band, may include a respective one of first bandpass filters 311(1)-311(N), a respective one of first low noise amplifiers (LNAs) 312(1)-312(N), a respective one of frequency converters 313(1)-313(N), a respective one of second LNAs 314(1)-314(N), a respective one of second bandpass filters 315(1)-315(N), and a respective one of power amplifiers (PAs) 316(1)-316(N). Each of the PAs 316(1)-316(N) is coupled to a respective one of antennas 352(1)-352(N), as shown in FIG. 3.

Within each of respective forward paths FP(1)-FP(N), the first bandpass filter 311 passes signal components having frequencies within the channel or frequency band of the respective forward path FP, and filters signal components having frequencies outside the channel or frequency band of the respective forward path FP. Thus, the pass band of the first bandpass filter 311 corresponds to the width of the channel associated with the respective forward path FP. The first LNA 312 amplifies the received communication signals to a level suitable for processing by the frequency converter 313. The frequency converter 313 converts the frequency of the communication signals in the respective forward path FP (e.g., to a frequency suitable for transmission from the satellite 300 to the UT 400). The second LNA 314 amplifies the frequency-converted communication signals, and the second bandpass filter 315 filters signal components having frequencies outside of the associated channel width. The PA 316 amplifies the filtered signals to a power level suitable for transmission to the UTs 400 via a respective antenna 352. The return transponder 320, which includes a number N of return paths RP(1)-RP(N), receives communication signals from the UT 400 along the return service link 302R via the antennas 361(1)-361(N), and transmits communication signals to the GN 200 along the return feeder link 301R via one or more of the antennas 362. Each of the return paths RP(1)-RP(N), which may process communication signals within a corresponding channel or frequency band, may be coupled to a respective one of the antennas 361(1)-361(N), and may include a respective one of first bandpass filters 321(1)-321(N), a respective one of first LNAs 322(1)-322(N), a respective one of frequency converters 323(1)-323(N), a respective one of second LNAs 324(1)-324(N), and a respective one of second bandpass filters 325(1)-325(N).

Within each of the respective return paths RP(1)-RP(N), the first bandpass filter 321 passes signal components having frequencies within the channel or frequency band of the respective return path RP, and filters signal components having frequencies outside the channel or frequency band of the respective return path RP. Thus, the pass band of the first bandpass filter 321 may for some implementations correspond to the width of the channel associated with the respective return path RP. The first LNA 322 amplifies all the received communication signals to a level suitable for processing by the frequency converter 323. The frequency converter 323 converts the frequency of the communication signals in the respective return path RP (e.g., to a frequency suitable for transmission from the satellite 300 to the GN 200). The second LNA 324 amplifies the frequency-converted communication signals, and the second bandpass filter 325 filters signal components having frequencies outside of the associated channel width. Signals from the return paths RP(1)-RP(N) are combined and provided to the one or more antennas 362 via a PA 326. The PA 326 amplifies the combined signals for transmission to the GN 200.

The oscillator 330, which may be any suitable circuit or device that generates an oscillating signal, provides a forward local oscillator signal LO(F) to the frequency converters 313(1)-313(N) of the forward transponder 310, and provides a return local oscillator signal LO(R) to the frequency converters 323(1)-323(N) of the return transponder 320. For example, the LO(F) signal may be used by the frequency converters 313(1)-313(N) to convert communication signals from a frequency band associated with the transmission of signals from the GN 200 to the satellite 300 to a frequency band associated with the transmission of signals from the satellite 300 to the UT 400. The LO(R) signal may be used by the frequency converters 323(1)-323(N) to convert communication signals from a frequency band associated with the transmission of signals from the UT 400 to the satellite 300 to a frequency band associated with the transmission of signals from the satellite 300 to the GN 200.

The controller 340, which is coupled to the forward transponder 310, the return transponder 320, and the oscillator 330, may control various operations of the satellite 300 including (but not limited to) channel allocations. In one aspect, the controller 340 may include a processing circuit 364 (e.g., a processor) coupled to a memory (e.g., a memory device 366). The memory may include a non-transitory computer-readable medium (e.g., one or more nonvolatile memory elements, such as an EPROM, an EEPROM, a Flash memory, a hard drive, etc.) storing instructions that, when executed by the processing circuit 364, cause the satellite 300 to perform operations including (but not limited to) those described herein.

Figure 4:
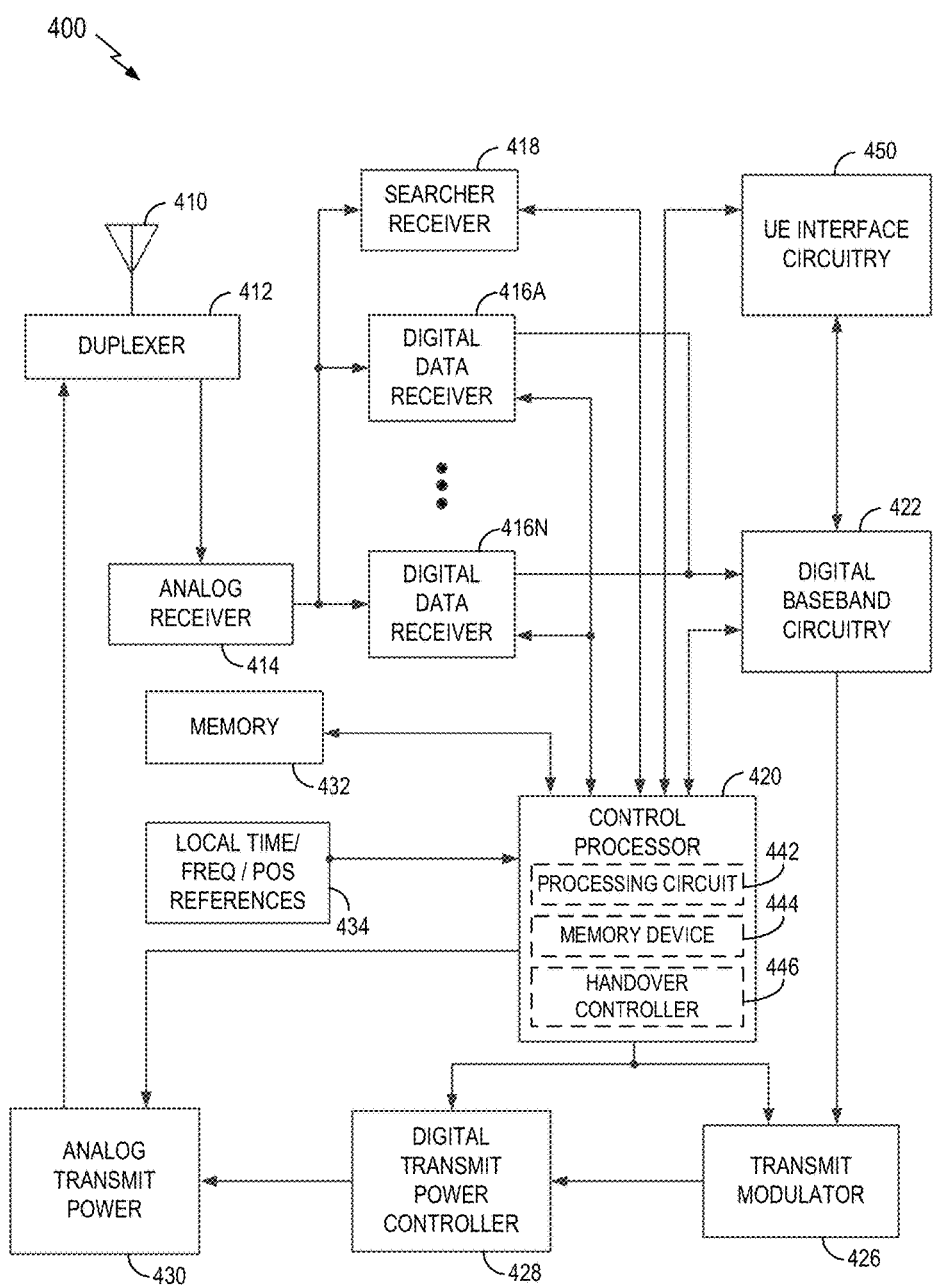
FIG. 4 is a block diagram of one example of a user terminal of FIG. 1 in accordance with some aspects of the disclosure.

FIG. 4 is an example block diagram of the UT 400 or the UT 401 for illustrative purposes only. It will be appreciated that specific UT configurations can vary significantly. Thus, the disclosure is not limited to any specific UT configuration and any UT that can provide the functional connection between the satellite 300 and the UE 500 or 501 can be considered within the scope of the disclosure.

UTs may be used in various applications. In some scenarios, a UT may provide a cellular backhaul. In this case, the UT may have a relatively large antenna and/or multiple antennas (e.g., to protect against blockage). In some scenarios, a UT may be deployed in an enterprise environment (e.g., placed on the roof of a building). In this case, the UT may have a relatively large antenna and/or multiple antennas (e.g., to provide relatively high backhaul bandwidth). In some scenarios, a UT may be deployed in a residential environment (e.g., placed on the roof of a house). In this case, the UT may have a smaller (and relatively inexpensive) antenna and provide fixed access for data service (e.g., Internet access). In some scenarios, a UT may be deployed in a maritime environment (e.g., placed on a cruise ship, a cargo ship, etc.). In this case, the UT may have a relatively large antenna and/or multiple antennas (e.g., to prevent blockage and provide relatively high bandwidth data service). In some scenarios, a UT may be deployed on a vehicle (e.g., carried by first responders, emergency crews, etc.). In this case, the UT may have a smaller antenna and used to provide temporary Internet access to a particular area (e.g., where cellular service is out). Other scenarios are possible.

The configuration of a particular UT may depend on the application for which the UT will be used. For example, the type of antenna, the antenna shape, the quantity of antennas, the supported bandwidth, the supported transmit power, the receiver sensitivity, etc., may depend on the corresponding application. As one example, a flat panel antenna (with a relatively low profile) may be used for aircraft applications.

In the example of FIG. 4, the UT is shown to include a transceiver where at least one antenna 410 is provided for receiving forward link communication signals (e.g., from the satellite 300), which are transferred to an analog receiver 414, where they are down-converted, amplified, and digitized. A duplexer element 412 is often used to allow the same antenna to serve both transmit and receive functions. Alternatively, a UT transceiver may employ separate antennas for operating at different transmit and receive frequencies.

The digital communication signals output by the analog receiver 414 are transferred to at least one digital data receiver 416A and at least one searcher receiver 418. Additional digital data receivers (e.g., as represented by a digital data receiver 416N) can be used to obtain desired levels of signal diversity, depending on the acceptable level of transceiver complexity, as would be apparent to one skilled in the relevant art.

At least one user terminal control processor 420 is coupled to the digital data receivers 416A-416N and the searcher receiver 418. The control processor 420 provides, among other functions, basic signal processing, timing, power and handoff control or coordination, and selection of frequency used for signal carriers. Another basic control function that may be performed by the control processor 420 is the selection or manipulation of functions to be used for processing various signal waveforms. Signal processing by the control processor 420 can include a determination of relative signal strength and computation of various related signal parameters. Such computations of signal parameters, such as timing and frequency may include the use of additional or separate dedicated circuitry to provide increased efficiency or speed in measurements or improved allocation of control processing resources.

The outputs of the digital data receivers 416A-416N are coupled to digital baseband circuitry 422 within the UT 400. The digital baseband circuitry 422 includes processing and presentation elements used to transfer information to and from the UE 500 as shown in FIG. 1, for example. Referring to FIG. 4, if diversity signal processing is employed, the digital baseband circuitry 422 may include a diversity combiner and decoder (not shown). Some of these elements may also operate under the control of, or in communication with, a control processor 420.

When voice or other data is prepared as an output message or a communication signal originating with the UT 400, the digital baseband circuitry 422 is used to receive, store, process, and otherwise prepare the desired data for transmission. The digital baseband circuitry 422 provides this data to a transmit modulator 426 operating under the control of the control processor 420. The output of the transmit modulator 426 is transferred to a power controller 428 which provides output power control to a transmit power amplifier 430 for final transmission of the output signal from the antenna 410 to a satellite (e.g., the satellite 300).

In FIG. 4, the UT transceiver also includes a memory 432 associated with the control processor 420. The memory 432 may include instructions for execution by the control processor 420 as well as data for processing by the control processor 420. In the example illustrated in FIG. 4, the memory 432 may include instructions for performing time or frequency adjustments to be applied to an RF signal to be transmitted by the UT 400 via the return service link to the satellite 300.

In the example illustrated in FIG. 4, the UT 400 also includes optional local time, frequency and/or position references 434 (e.g., a GPS receiver), which may provide local time, frequency and/or position information to the control processor 420 for various applications, including, for example, time or frequency synchronization for the UT 400.

The digital data receivers 416A-416N and the searcher receiver 418 are configured with signal correlation elements to demodulate and track specific signals. The searcher receiver 418 is used to search for pilot signals, or other relatively fixed pattern strong signals, while the digital data receivers 416A-416N are used to demodulate other signals associated with detected pilot signals. However, a digital data receiver 416 can be assigned to track the pilot signal after acquisition to accurately determine the ratio of signal chip energies to signal noise, and to formulate pilot signal strength. Therefore, the outputs of these units can be monitored to determine the energy in, or frequency of, the pilot signal or other signals. These receivers also employ frequency tracking elements that can be monitored to provide current frequency and timing information to the control processor 420 for signals being demodulated.

The control processor 420 may use such information to determine to what extent the received signals are offset from the oscillator frequency, when scaled to the same frequency band, as appropriate. This and other information related to frequency errors and frequency shifts can be stored in a storage or memory element (e.g., the memory 432) as desired.

The control processor 420 may also be coupled to the UE interface circuitry 450 to allow communication between the UT 400 and one or more UEs. The UE interface circuitry 450 may be configured as desired for communication with various UE configurations and accordingly may include various transceivers and related components depending on the various communication technologies employed to communicate with the various UEs supported. For example, the UE interface circuitry 450 may include one or more antennas, a wide area network (WAN) transceiver, a wireless local area network (WLAN) transceiver, a Local Area Network (LAN) interface, a Public Switched Telephone Network (PSTN) interface and/or other known communication technologies configured to communicate with one or more UEs in communication with the UT 400.

The control processor 420 may include one or more of a processing circuit 442, a memory device 444, or a handoff controller 446 that independently or cooperatively perform handoff information-related operations for the UT 400 as taught herein. In an example implementation, the processing circuit 442 is configured (e.g., programmed) to perform some or all of these operations. In another example implementation, the processing circuit 442 (e.g., in the form of a processor) executes code stored in the memory device 444 to perform some or all of these operations. In another example implementation, the handoff controller 446 is configured (e.g., programmed) to perform some or all of these operations. Although depicted in FIG. 4 as included within the control processor 420, for other implementations, one or more of the processing circuit 442, the memory device 444, or the handoff controller 446 may be a separate subsystem that is coupled to the control processor 420.

Figure 5:
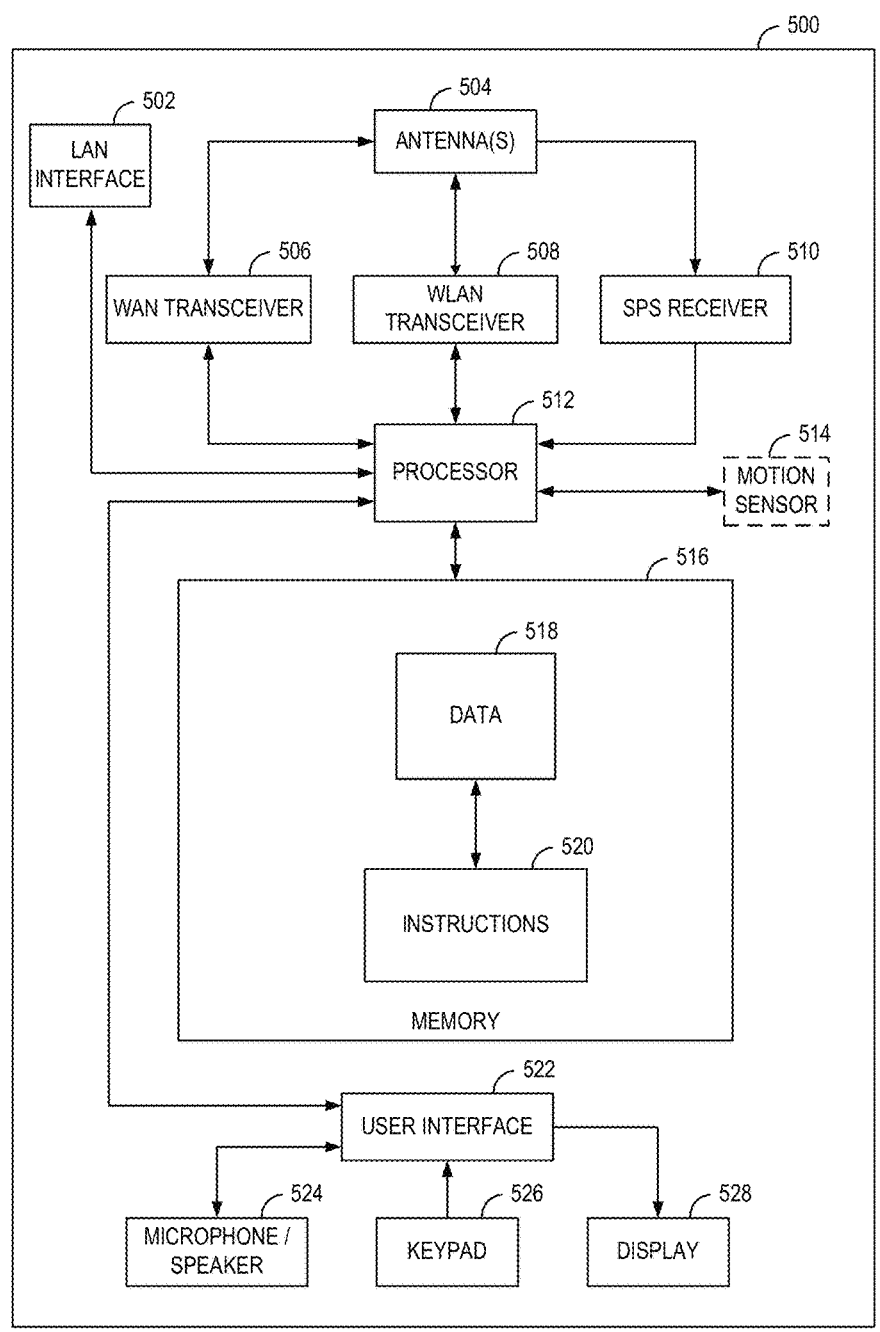
FIG. 5 is a block diagram of one example of a user equipment of FIG. 1 in accordance with some aspects of the disclosure.

FIG. 5 is a block diagram illustrating an example of the UE 500, which also can apply to the UE 501 of FIG. 1. The UE 500 as shown in FIG. 5 may be a mobile device, a handheld computer, a tablet, a wearable device, a smart watch, or any type of device capable of interacting with a user, for example. Additionally, the UE 500 may be a network side device that provides connectivity to various ultimate end user devices and/or to various public or private networks. In the example shown in FIG. 5, the UE 500 may include a LAN interface 502, one or more antennas 504, a wide area network (WAN) transceiver 506, a wireless local area network (WLAN) transceiver 508, and a satellite positioning system (SPS) receiver 510. The SPS receiver 510 may be compatible with the Global Positioning System (GPS), the Global Navigation Satellite System (GLONASS) and/or any other global or regional satellite based positioning system. In an alternate aspect, the UE 500 may include a WLAN transceiver 508, such as a Wi-Fi transceiver, with or without the LAN interface 502, the WAN transceiver 506, and/or the SPS receiver 510, for example. Further, the UE 500 may include additional transceivers such as Bluetooth, ZigBee and other known technologies, with or without the LAN interface 502, the WAN transceiver 506, the WLAN transceiver 508 and/or the SPS receiver 510. Accordingly, the elements illustrated for the UE 500 are provided merely as an example configuration and are not intended to limit the configuration of UEs in accordance with the various aspects disclosed herein.

In the example shown in FIG. 5, a processor 512 is connected to the LAN interface 502, the WAN transceiver 506, the WLAN transceiver 508 and the SPS receiver 510. Optionally, a motion sensor 514 and other sensors may also be coupled to the processor 512.

A memory 516 is connected to the processor 512. In one aspect, the memory 516 may include data 518 which may be transmitted to and/or received from the UT 400, as shown in FIG. 1. Referring to FIG. 5, the memory 516 may also include stored instructions 520 to be executed by the processor 512 to perform the process steps for communicating with the UT 400, for example. Furthermore, the UE 500 may also include a user interface 522, which may include hardware and software for interfacing inputs or outputs of the processor 512 with the user through light, sound or tactile inputs or outputs, for example. In the example shown in FIG. 5, the UE 500 includes a microphone/speaker 524, a keypad 526, and a display 528 connected to the user interface 522. Alternatively, the user's tactile input or output may be integrated with the display 528 by using a touch-screen display, for example. Once again, the elements illustrated in FIG. 5 are not intended to limit the configuration of the UEs disclosed herein and it will be appreciated that the elements included in the UE 500 will vary based on the end use of the device and the design choices of the system engineers.

Additionally, the UE 500 may be a user device such as a mobile device or external network side device in communication with but separate from the UT 400 as illustrated in FIG. 1, for example. Alternatively, the UE 500 and the UT 400 may be integral parts of a single physical device.

In the example shown in FIG. 1, the two UTs 400 and 401 may conduct two-way communication with the satellite 300 via return and forward service links within a beam coverage. A satellite may communicate with more than two UTs within a beam coverage. The return service link from the UTs 400 and 401 to the satellite 300 may thus be a many-to-one channel. Some of the UTs may be mobile while others may be stationary, for example. In a satellite communication system such as the example illustrated in FIG. 1, multiple UTs 400 and 401 within a beam coverage may be time-division-multiplexed (TDM'ed), frequency-division-multiplexed (FDM'ed), or both.

UT Handoff

At some point in time, a UT may need to be handed-off to another satellite (not shown in FIG. 1). Handoff may be caused by scheduled events or unscheduled events.

Several examples of handoff due to scheduled events follow. Inter-beam and inter-satellite handoff may be caused by movement of the satellite, movement of the UT, or a satellite beam being turned off (e.g., due to a Geo-stationary satellite (GEO) restriction). Handoff also may be due to a satellite moving out of the GN's range while the satellite is still within the UT's line of sight.

Several examples of handoff due to nonscheduled events follow. Handoff may be triggered by a satellite being obscured by an obstacle (e.g., a tree). Handoff also may be triggered due to a drop in channel quality (e.g., signal quality) due to rain fade or other atmospheric conditions.

In some implementations, at a particular point in time, a particular satellite may be controlled by a particular entity (e.g., a network access controller, NAC) in a GN. Thus, a GN may have several NACs (e.g., implemented by the GN controller 250 of FIG. 2), each of which controls a corresponding one of the satellites controlled by the GN. In addition, a given satellite may support multiple beams. Thus, over time, different types of handoff may occur.

In inter-beam handoff, a UT is handed-off from one beam of a satellite to another beam of the satellite. For example, the particular beam serving a stationary UT may change over time as the serving satellite moves.

In inter-satellite handoff, a UT is handed-off from the current serving satellite (referred to as the source satellite) to another satellite (referred to as the target satellite). For example, a UT may be handed-off to the target satellite as the source satellite moves away from the UT and the target satellite moves toward the UT.

Idle Mode Handoff

In a satellite network, a UT in idle mode should point to the best satellite and beam to receive a page for the idle UT. Similarly, the GN should use the same satellite beam to page the idle UT. In practice, the selection of the correct satellite and beam may be challenging (e.g., relatively complex) since the satellites and beams may be turned off for a variety of reasons that are known to the GN but not to the idle UT. Consequently, it is possible that an idle UT could point to a different satellite than the GN uses to page the idle UT.

To address this issue, the disclosure relates in some aspects to a network-guided idle mode handoff procedure that enables an idle UT to reliably receive paging messages transmitted by the GN. To receive a page, an idle UT identifies and points its antenna at the satellite that will be providing coverage for the idle UT at that time. This enables the idle UT to then tune to a beam that the satellite will be transmitting in, camp on the corresponding cell, and monitor the control channel to determine whether there is a page for the idle UT.

In some aspects, the network-guided idle mode handoff algorithm involves the GN repeatedly (e.g., periodically or aperiodically) or on demand providing to the idle UT information that the UT can use to perform handoff (reselection) when the UT is in idle mode. This information may be referred to as idle mode information. The UT may maintain this information in an idle mode handoff table.

The idle mode information may take various forms. In some cases, the idle mode information indicates the sequence of satellites that will be covering the idle UT over a span of time, such that the idle UT can subsequently point to the correct satellite and receive a page (e.g., at designated times). In some cases, the idle mode information includes start times for a set of satellites, where each particular start time indicates when the idle UT may handoff to the corresponding satellite. Thus, the application relates in some aspects to network-guided idle reselection where a UT is directed by the network to a proper list of satellites for idle mode operation.

In some scenarios, an idle UT requests idle mode handoff information from a GN. In some scenarios, an idle UT may send a request for idle mode handoff information to the GN when the idle UT has a defined number of valid entries remaining in an idle mode handoff table. For example, the idle UT may send the request when there is only one unexpired entry remaining in the table. In some scenarios, an idle UT may send a request for idle mode handoff information to the GN if the idle mode handoff table is about to expire or has expired. In some scenarios, an idle UT may send a request for idle mode handoff information to the GN based on a time associated with a particular entry (e.g., the last entry) of the idle mode handoff table.

The request may include, for example, the start time of the last entry in the current idle mode handoff table at the UT and the location of the UT. This information enables the GN to determine the next set of satellites that will be covering the idle UT and to determine when to send an indication of the next set of satellite to the UT.

In some scenarios, a GN may send idle mode information to a UT during radio connection operations. For example, an idle UT may send a request for idle mode handoff information to the GN when the idle UT establishes a radio connection with the GN. As another example, the GN may autonomously (e.g., without a request from the idle UT) send idle mode handoff information to the idle UT when the idle UT establishes a radio connection with the GN.

Example Handoff Signaling

Figure 6:
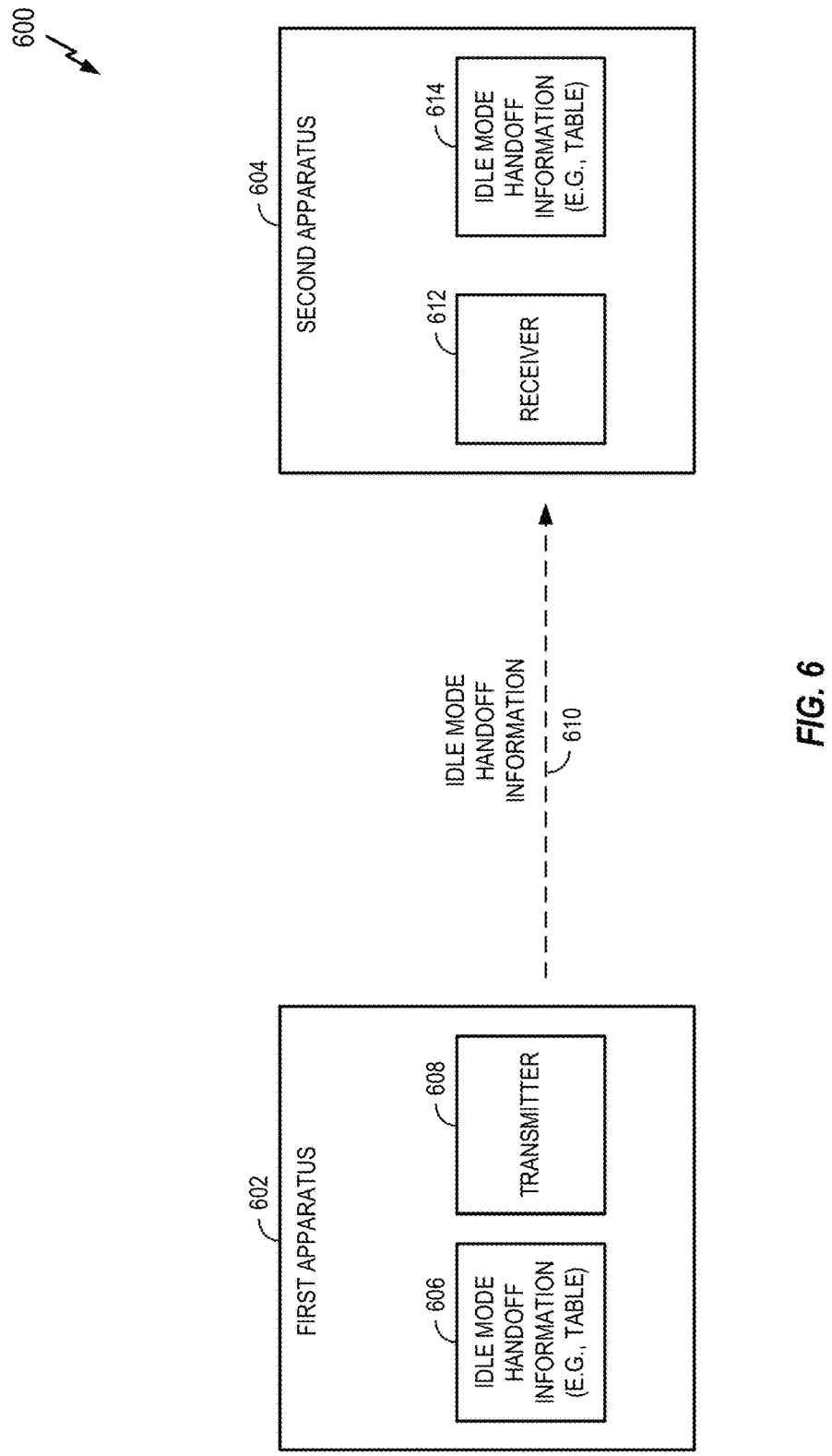
FIG. 6 is a block diagram illustrating example transmitter and receiver devices in accordance with some aspects of the disclosure.

The disclosure relates in some aspects to signaling to support idle mode handoff. FIG. 6 illustrates a communication system 600 that includes a first apparatus 602 and a second apparatus 604. The first apparatus 602 maintains (e.g., generates) idle mode handoff information (e.g., a table) 606 and includes a transmitter 608 that can transmit idle mode handoff information 610 to the second apparatus 604. The second apparatus 604 includes a receiver 612 for receiving the idle mode handoff information 610 such that the second apparatus 604 can maintain local idle mode handoff information 614. In some aspects, the first apparatus 602 may be an example of the GN 200 or the GN 201 of FIG.

1. In addition, the second apparatus 604 may be an example of the UT 400 or the UT 401 of FIG. 1.

Figure 7:
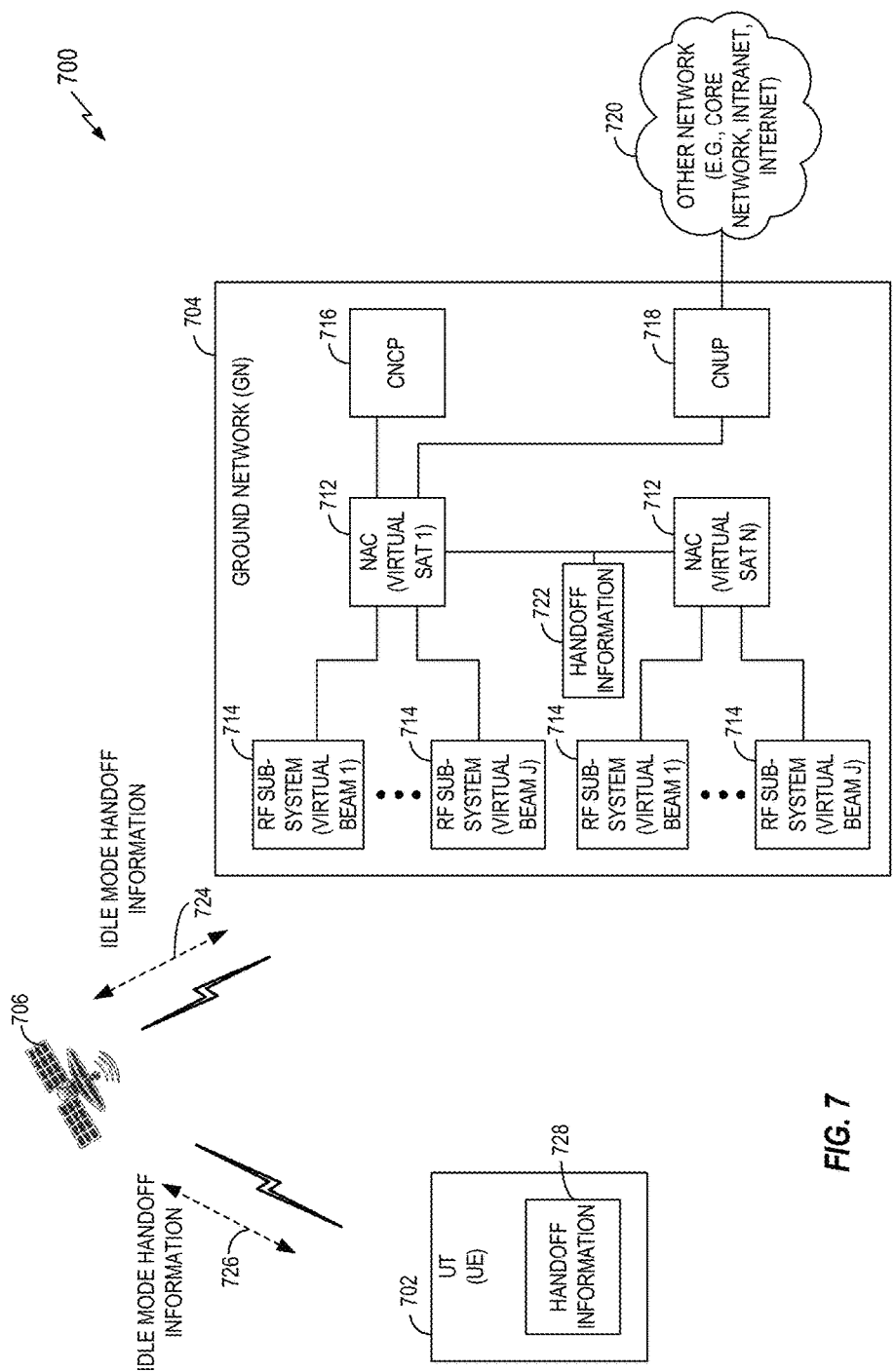
FIG. 7 is a block diagram of an example communication system in accordance with some aspects of the disclosure.

In some implementations, the communication system 600 is a satellite communication system. FIG. 7 illustrates a UT 702 in communication with a GN 704 via a satellite 706 in a non-geosynchronous satellite communication system 700, such as a LEO satellite communication system for data, voice, video, or other communication. The UT 702, the GN 704, and the satellite 706 may respectively correspond to, for example, the UT 401, the GN 200, and the satellite 300 of FIG. 1.

The GN 704 includes network access controllers (NACs) 712, each of which interfaces with one or more radio frequency (RF) subsystems 714 for communicating with the UT 702 and other UTs (not shown) via the satellite 706 (or some other satellite, not shown). The GN 704 also includes a core network control plane (CNCP) 716 and a core network user plane (CNUP) 718, or other similar functionality, for communicating with another network 720. The network 720 may represent, for example, one or more of a core network (e.g., 3G, 4G, 5G, etc.), an intranet, or the Internet.

At various points in time, the GN 704 may determine (e.g., receive or generate) idle mode handoff information 722. The GN may then broadcast or unicast the idle mode handoff information 722 to the UT 702 via messages 724 and 726 relayed by the satellite 706. The UT 702 thereby maintains its own idle mode handoff information 728. The GN 704 may send the idle mode handoff information 722 to the UT in response to a request from the UT or autonomously (e.g., not in response to a request).

In an example implementation, a request for an idle mode handoff table may include two fields. A first field includes a start time (e.g., absolute GPS time) of the last row entry of the current table. The start time may be set to 0 if the UT does not have a current table. This first field could be 32 bits or some other size. A second field includes the location of the UT corresponding to the last received table (e.g., this field could be used for moving UTs only). This field could be 32 bits or some other size. In some implementations, the request could also include (e.g., in another field) an indication of the time of validity of the current idle mode handoff table at the UT (e.g., an indication of how much longer the table is valid).

The disclosure relates in some aspects to using a unicast signaling-based transfer of idle mode handoff information (e.g., an idle mode handoff table). In some aspects, unicast signaling may provide more flexibility than broadcast information block-based idle mode updates (e.g., unicast signaling may be more adaptable for future development).

Figure 8:
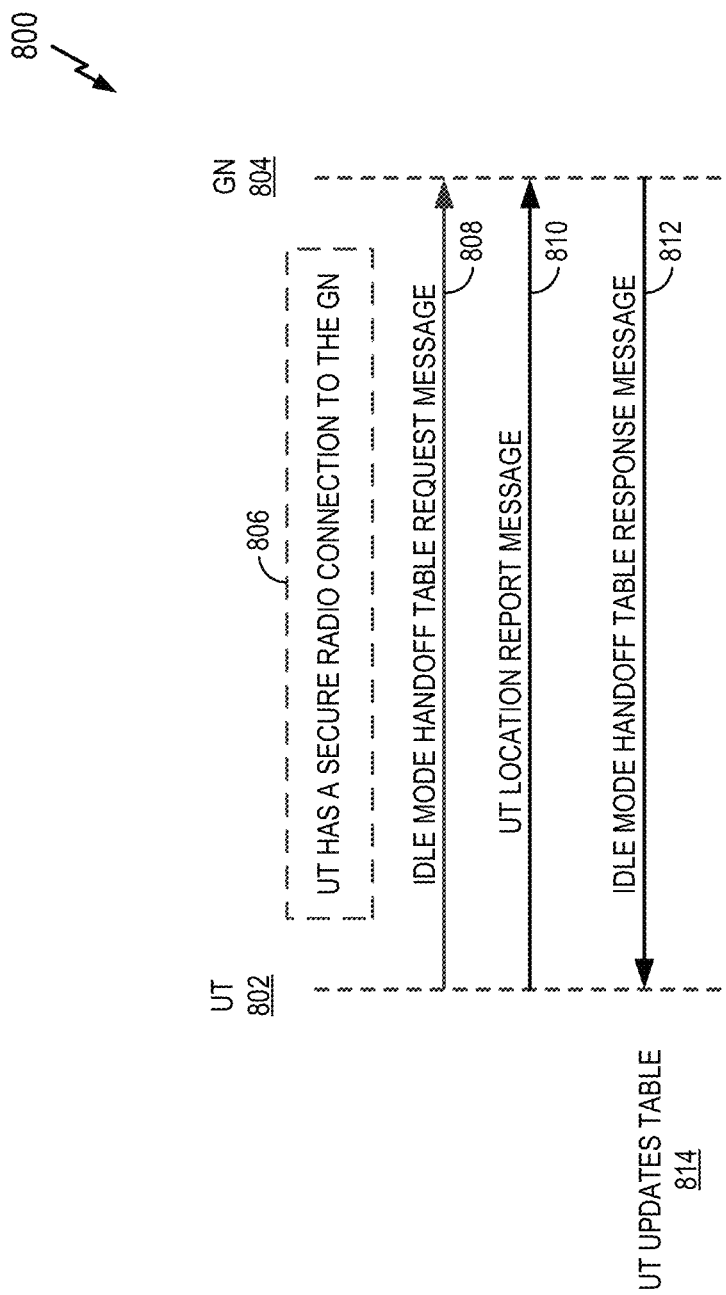
FIG. 8 is a diagram illustrating an example of communicating idle mode information in accordance with some aspects of the disclosure.

FIG. 8 illustrates an example of signaling call-flow 800 to provide handoff information (e.g., a handoff table) to an idle UT. The signaling call-flow 800 includes a request-response pair of Radio messages that may be based, for example, on a network-guided idle mode handoff algorithm.

In some aspects, the request-response pair of messages may be exchanged between a UT 802 and a GN 804 when the UT is Radio connected and when security is active 806. That is, Radio request-response messages may be used to provide an idle mode handoff table to a UT that is Radio connected, and the table may be provided after security is activated.

An idle mode handoff table request message 808 may be sent after (or can be sent simultaneously when) UT location information is sent. For example, the request message 808 can be provided simultaneously with a Radio UT location report message 810.

In some aspects, the GN may use the UT location information to prepare an idle mode handoff table for the UT. For example, the GN may determine, based on satellite ephemeris information and the UT's location, which satellites may be able to serve the UT over a given period of time. The GN then sends an idle mode handoff table response message 812 including this satellite information to the UT and the UT updates its table 814.

In some implementations, the GN may determine whether the send an idle mode handoff table to the UT based on the time of validity of the current idle mode handoff table at the UT. In some cases, the GN may receive an indication of this time of validity from the UT (e.g., in an idle mode handoff table request message). In some cases, the GN may track this time of validity by itself (e.g., based on a validity time the GN calculates for the last table the GN sent to the UT).

In some implementations, the GN may determine whether to send an idle mode handoff table to the UT based on a time (e.g., a start time) associated with an entry (e.g., the last entry) of the current idle mode handoff table at the UT. In some cases, the GN may receive an indication of this time from the UT (e.g., in a handoff table request message). In some cases, the GN may track this time by itself (e.g., by saving the last table the GN sent to the UT).

In view of the above, the disclosure relates in some aspects to sending to a UT an indication of at least one satellite for an idle mode operation of the UT. Here, the indication of at least one satellite may take the form of a satellite table, a satellite list, or some other form. For each satellite of the at least one satellite (e.g., in a satellite list), an indication may also be sent to the UT indicating the time that the UT is to handoff to the satellite. An indication of at least one carrier frequency at which the next satellite cell (e.g., the cell of the next satellite that will be serving the UT) will be transmitting may also be sent to the UT.

In some aspects, a decision to send the indication may be based on: 1) the location of the UT; 2) the start time for an entry (e.g., the last entry) in the current idle mode handoff table; 3) the number of valid entries in the idle mode handoff table; or 4) a combination thereof. In some aspects, a decision to send the indication may be based on the time of validity of the last idle mode handoff table a GN provided to the UT. The above information enables a GN to determine whether the UT is about to run out of current satellite information. Consequently, a GN may send a new table to the UT if the last table sent to the UT is about to run out of valid entries or if the table is about to expire.

Example Handoff Table

A GN may send idle mode handoff information (e.g., autonomously or in response to a request) via an idle mode handoff table. An example idle mode handoff table is shown in Table 1. The base time for the table (e.g., in seconds) may be, for example: absolute GPS time (e.g., 32 bits). This table would be updated over time (e.g., as the satellites move and/or the UT moves). It should be appreciated that different handoff tables may include different types of information and/or different entries.

TABLE 1

| Satellite ID | Start Times (e.g., seconds) |
|---|---|
| Sat1 | startTime1 |
| outage | startTime2 |
| Sat3 | startTime3 |
| . . . | . . . |
| SatN | startTimeN |

In an example implementation, a handoff table may include the three fields that follow. A first field is for the base time for the table (e.g., in seconds): absolute GPS time (e.g., 32 bits). A second field is for the Satellite ID (e.g., 16 bits). Table 1 shows an example of this field. The second field could also indicate outage periods when no satellite is covering the UT (e.g., due to EPFD mitigation), as shown. A third field is for start times: startTime 1, . . . , startTimeN. (e.g., each 32 bits). Table 1 also shows an example of this field. These times may be chosen such that the GN can specify long enough periods of time relative to the base time during which the table entries are valid.

The size of the handoff table provided to the UT may depend on whether the UT is stationary or moving. In general, smaller handoff tables may be used for moving UTs whereby the size of such a handoff table may depend on the speed at which a UT is moving.

For fast moving UTs (e.g., UTs on an airplane), a smaller table may be provided because the table may be invalidated quickly due to UT motion. Such a table may be valid, for example, for a few minutes.

For slow moving UTs (e.g., UTs on a cruise ship or a container ship), a larger table may be provided. Such a table may be valid, for example, for an hour.

For a stationary UT, a large table can be provided to reduce the overhead due to establishment of a new connection (e.g., as discussed in Option 1 below) or due to signaling overhead (e.g., as discussed in in Option 3 below). Such a table may be valid, for example, for a several hours (e.g., 10 hours).

A GN can estimate the speed of a UT based on location reports the GN receives from the UT. Combining this information with the information received in a request message regarding the time for which the current table at the UT is valid, the GN can optimize the size of the table that the GN provides to a moving UT. This may help achieve a good trade-off between the signaling overhead incurred in transmitting a table and the period of time for which a provided table can remain valid for a moving UT.

An outage period may exist for different reasons under different circumstances. For example, a satellite or satellites may be inactive (e.g., during the period of time that the UT would otherwise be within the coverage of the satellite(s)) and thereby unable to provide service. As another example, a service restriction (e.g., a regulatory restriction or country restriction) may dictate that a UT cannot receive service from a particular satellite (e.g., service is restricted always, at certain times, or at certain locations).

In some aspect, the outage period information may be used by a UT to determine whether to remain in or enter a low power (e.g., sleep) mode. For example, a UT in or entering idle mode can determine that it may sleep from startTime2 to startTime3 based on Table 1.

Triggers for Requesting or Sending Idle Mode Handoff Information

Various types of triggers could be used to determine when to request or send idle mode handoff information (e.g., an idle mode handoff table). Several examples of triggers that a UT (or some other type of device) may use to determine when to request idle mode handoff information or that a GN (or some other type of device) may use to determine when to send idle mode handoff information follow.

A first request trigger is based on the number of valid entries remaining in a set of idle mode handoff information (e.g., an idle mode handoff table) maintained by a UT (or some other suitable device). For example, a UT may send a request for idle mode handoff information based on the number of valid entries (e.g., one, two, etc.) that remain in an idle mode handoff table maintained by the UT. As a specific example, a UT may send a request to a GN for idle mode handoff information if the idle mode handoff table only includes one valid entry (or two valid entries, or three valid entries, and so on). In this way, the UT can obtain a new idle mode handoff table from the GN before the idle mode handoff table maintained by the UT runs out of valid (e.g., current) entries. In some aspects, an entry in the table may be deemed to be invalid (e.g., not current) if the time (e.g., the start time, the end time, etc.) associated with that entry has past.

A second request trigger is based on timing of an entry of a set of idle mode handoff information (e.g., an idle mode handoff table) maintained by a UT (or some other suitable device). For example, a UT may send a request for idle mode handoff information based on timing (e.g., a start time, an end time, etc.) associated with a particular entry (e.g., a last entry, a second to last entry, etc.) of an idle mode handoff table maintained by the UT. As a specific example, a UT may send a request to a GN for idle mode handoff information if the difference between the current time and the time (e.g., start time, etc.) for the particular entry (e.g., the last entry) of the idle mode handoff table is less than a threshold amount of time. In this way, the UT can obtain a new idle mode handoff table from the GN before the idle mode handoff table maintained by the UT runs out of current entries (e.g., before the table runs out of entries or is no longer valid).

A third request trigger is based on a combination of the first request trigger and the second request trigger. For example, a UT may send a request to a GN for idle mode handoff information if the idle mode handoff table only includes one valid entry or if the difference between the current time and the time for the last entry is less than a threshold amount of time. Other combinations may be used in other scenarios.

In some scenarios, the GN (or some other suitable device) may track the UT's table (or some other device's table) to determine when to send idle mode handoff information (e.g., an idle mode handoff table). Such an scenario could occur, for example, in cases where a UT (or some other device) does not send a request for a new table.

A first sending trigger is based on how long the idle mode handoff information (e.g., an idle mode handoff table) sent to a UT (or some other suitable device) will remain valid. For example, a GN (or some other suitable device) may send idle mode handoff information to a UT based on the remaining period of validity for the UT's idle mode handoff table. As a specific example, a GN may send a new idle mode handoff table to a UT if the remaining period of validity for the last idle mode handoff table that the GN sent to the UT is less than a threshold amount of time. In this way, the GN can provide a new idle mode handoff table to the UT before the UT's idle mode handoff table maintained becomes invalid.

Other triggers for sending idle mode handoff information may be similar to the first request trigger, the second request trigger, and the third request trigger. For examples, a GN may send idle mode handoff information based on the number of valid entries remaining in a UT's idle mode handoff table, based on a time (e.g., a start time) for a particular entry (e.g., the last entry) in a UT's idle mode handoff table, or based on a combination of these triggers.

Example Messages

A GN (or some other suitable device) may sent various types of information to an idle UT (or some other suitable device). In some scenarios, this information may be sent via a broadcast information block (BIB) message. In an example implementation this information indicates at least one carrier frequency (e.g., an absolute radio-frequency channel number) in which the next cell will be transmitting. This information may be may be carried by a 16 bit (or other size) parameter called "nextCellTransmitFreq." As one example, nextCellTransmitFreq can indicate a list of possible frequencies that can follow. As another example, nextCellTransmitFreq can indicate a particular frequency. It should be appreciated that nextCellTransmitFreq could take other forms as well. It may be assumed that a satellite will be transmitting using a limited number N (e.g., 8 or some other suitable number) of carrier frequencies on the forward service link (FSL) over a given region. The set of N carrier frequencies may vary from region to region.

A UT may perform the following operations to tune to a beam of a satellite. When the UT switches from one satellite to another following an idle mode handoff table, the UT may perform a search over the N frequencies and select one frequency to camp on. The UT may use the nextCellTransmitFreq information when the UT switches from one beam of a satellite to another beam of the satellite. For example, when the UT is being covered by a satellite, the UT may use the nextCellTransmitFreq information to determine the next beam to which the UT should tune.

Example Signaling

Several examples of signaling and UT procedures based on the above follow. These examples are referred to as Option 1, Option 2, Option 3, and Option 4.

In Option 1, an idle UT sends a request message to the GN when the UT has one entry left in its current table. Here, the UT establishes a Radio connection to the GN and sends the request message. The UT Radio layer may trigger a control layer to initiate a Service Request procedure and establish a Radio connection to a GN. Upon receipt of the request message, the GN sends a response including a new handoff table to the UT. The UT replaces its current table with the new table upon receipt of the response message.

In Option 2, the UT does not send a request message. Instead, the GN maintains, for each UT, information regarding the time of validity of the last table the GN provided to the UT. Whenever the UT establishes a Radio connection to the network, the GN checks whether the UT needs to be provided a new table and sends a new table if required. In some cases, the GN may send the new table after the GN receives a Radio location report message from the UT that indicates the location of the UT.

In Option 3, the UT sends a request message to the GN every time the UT establishes a Radio connection to the GN. Based on the information provided in the request message, the GN determines whether a table needs to be provided to the UT. For example, a stationary UT need not be provided a new table if the UT has entries for sufficient time into the future. For a moving UT, the GN can optimize the size of the table it provides to the UT based on the information provided in the request message (e.g., as discussed with regard to the table size for stationary and moving UTs). Once the UT receives the response message from the GN, the UT may replace overlapping entries and append new entries to its current table.

Option 2 enables the procedure to piggyback on Radio connections that are established by the UT for various reasons, such as, when the UT has uplink (UL) data to transmit, or when the UT responds to a page, or when a periodic timer (e.g., a 54 minute period) expires. Thus, no additional connections may need to be set up to send a request or receive an idle mode handoff table in these scenarios. In some implementations, the timer could be a paging area update timer. Other types of timers could be used in other implementations.

Option 4 is a combination of Option 1 and Option 3. For example, the UT may establish a Radio connection to obtain a new table whenever the UT approaches the end of its current table. In addition, the UT may request a table whenever a Radio connection is established for other reasons. An example of option 4 follows.

When an idle UT finds it has one entry left in its current table, the UT Radio triggers a control layer to initiate a Service Request procedure and establish a Radio connection to a GN. The UT then sends the handoff request over the connection, and the GN provides the UT a new table in response. The UT then replaces its current table with the new table.

As discussed above, stationary UTs and moving UTs may have different constraints. Stationary UTs may benefit from a large table (10 hours or more) to reduce connection overhead. Moving UT may use a smaller table as significant movement could invalidate the table. Thus, the amount of handoff information sent by the GN may be based on the movement (e.g., speed) of a UT.

As discussed above, the UT may send the handoff table request message whenever a UT gets Radio connected to the GN. Upon receipt of this message, the GN determines whether the UT should be provided a table. A stationary UT need not be provided a new table if the UT's current table has entries for sufficient time into the future. For a moving UT, the GN can provide tables of smaller size. The UT can append (e.g., replacing overlapping entries) to its handoff table upon receiving the response message.

Example Timeline

Figure 9:
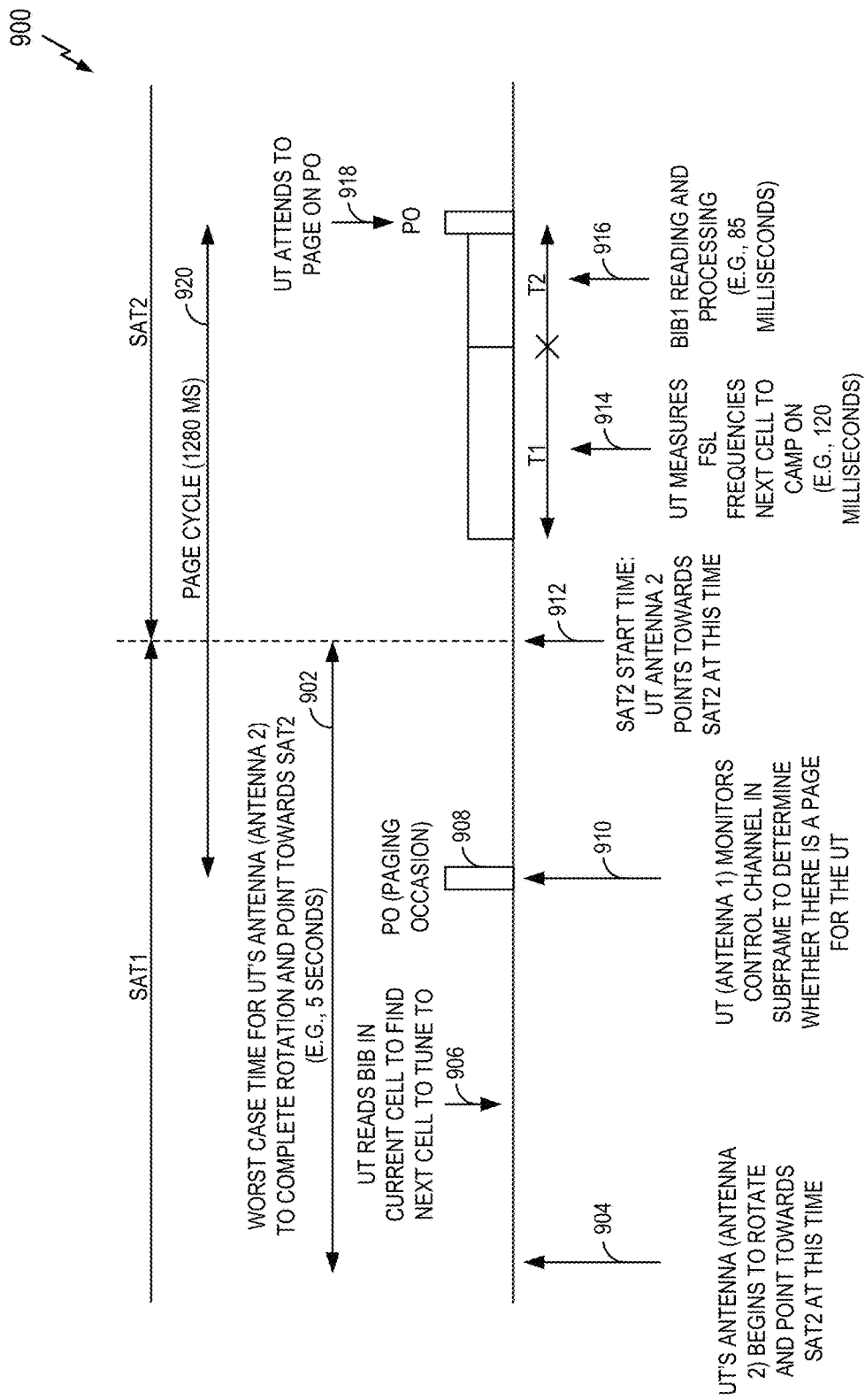
FIG. 9 is a diagram illustrating an example of idle mode handoff in accordance with some aspects of the disclosure.

FIG. 9 shows an example timeline 900 at an idle UT as the idle UT switches from a first satellite (designated SAT1) to a second satellite (designated SAT2) according to a handoff table. This example is for a UT with dual, parabolic antennas. In an example implementation, the worst case time 902 for the UT's antenna (e.g., an antenna 2) to complete rotation and point towards SAT2 is indicated. In an example scenario, such an antenna may take about 5 seconds to rotate through an elevation range of 90 degrees (e.g., the minimum elevation sweep speed at a particular azimuth may be 18 degrees/second).

At time 904, the UT's antenna (the antenna 2) begins to rotate and point towards SAT2. At time 906, the UT reads the BIB in the current cell to find the next cell to tune to. At a paging occasion (PO) 908, the UT uses another antenna (e.g., an antenna 1) to monitor a control channel in a subframe to determine whether there is a page for the UT 910. At the SAT2 start time 912, the UT's antenna 2 points towards the second satellite SAT2. At time 914, the UT measures FSL frequencies in the next cell to camp on. For example, the UT may measure for 120 milliseconds or for some other period of time. At time 916, the UT reads and processes BIB1. For example, the UT may perform these operations for 85 milliseconds or for some other period of time. The UT attends to a page during the PO 918. In an example implementation, the page cycle 920 is 1280 milliseconds.

Additional Handoff Operations

Figure 10:
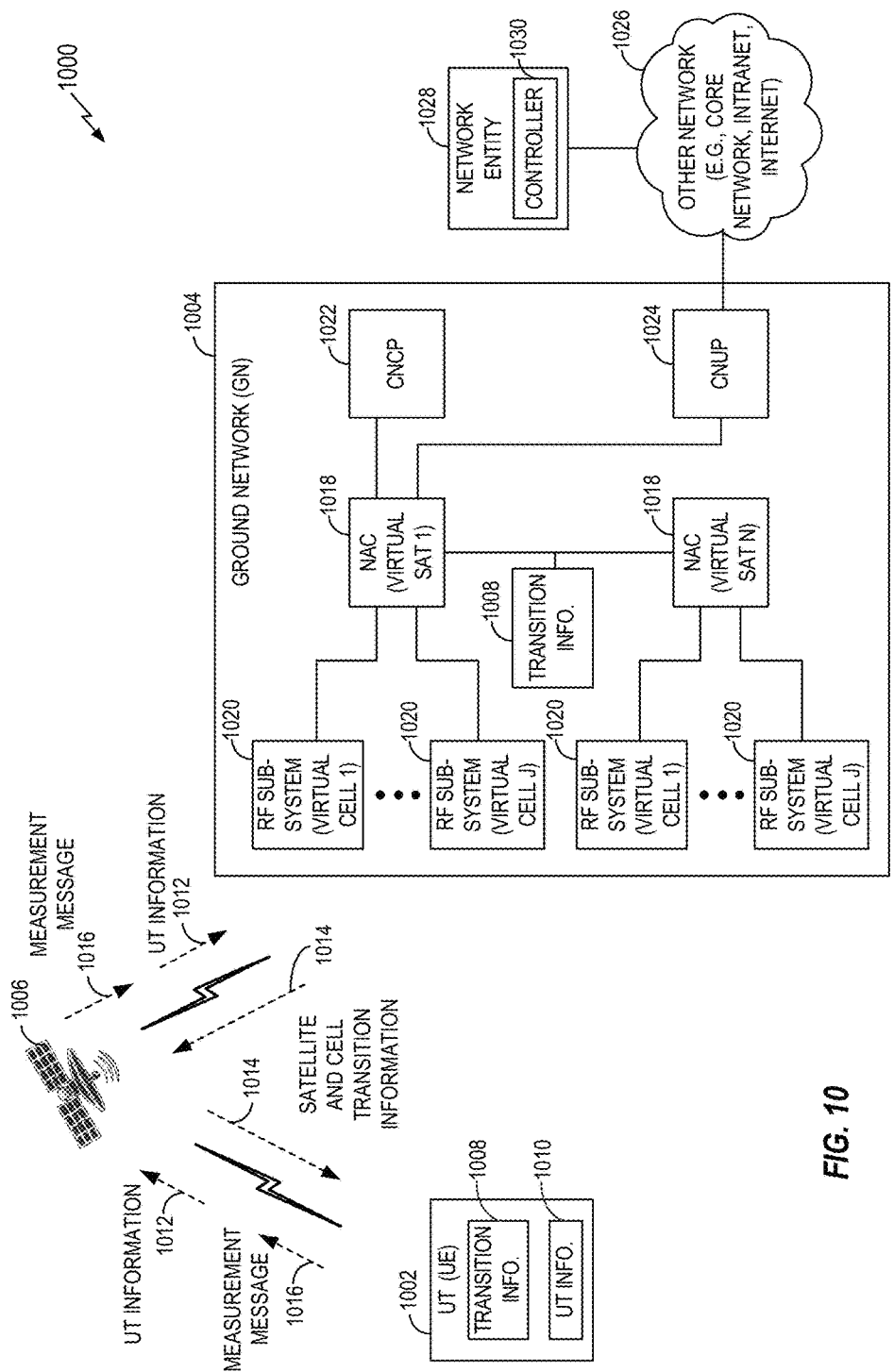
FIG. 10 is a block diagram of an example communication system in accordance with some aspects of the disclosure.

Referring to FIG. 10, various aspects of the disclosure relate to handoff of a UT 1002 in communication with a GN 1004 via a satellite 1006 in a satellite communication system 1000. In some implementations, the system 1000 may be a non-geosynchronous satellite communication system, such as a low-earth orbit (LEO) satellite communication system, for data, voice, video, or other communication. The UT 1002 is an example of the UT 400 or the UT 401 of FIG. 1. The GN 1004 is an example of the GN 200 or the GN 201 of FIG. 1. The satellite 1006 is an example of the satellite 300 of FIG. 1.

In some aspects, the GN 1004 and the UT 1002 use satellite and cell transition information 1008 to determine when to handoff the UT 1002 from one cell to another and/or from one satellite to another. For example, the UT 1002 may send UT information 1010 (e.g., capability information, location information, or other information) to the GN 1004 via first signaling 1012. Based on the information 1010, the GN 1004 or some other entity generates the satellite and cell transition information 1008 and sends the information 1008 to the UT 1002 via second signaling 1014. Alternatively, or in addition, the GN 1004 or some other entity selects a handoff procedure for the UT 1002 based on the information 1010. In some aspects, handoff of the UT 1002 to a different satellite (a new serving satellite) involves the UT 1002 conducting satellite signal measurements and sending a measurement message 1016 to the GN 1004. In some aspects, the GN 1004 generates new satellite and cell transition information (e.g., modifies a satellite and cell transition table) as a result of receiving the measurement message 1016.

The UT 1002 may perform other handoff-related operations in accordance with the teachings herein. In some aspects, the UT 1002 may receive satellite ephemeris information via the GN 1004 and use the satellite ephemeris information to synchronize to a satellite (e.g., the satellite 1006). In some aspects, the UT 1002 invokes a radio link failure mode if the UT 1002 loses connectivity to a satellite and/or cell.

In some aspects, a handoff design may attempt to meet one or more design objectives. Example of such objective include: minimize signaling during handoffs; minimize data outage during handoffs; or reduce reliance on the UT's knowledge of the satellite ephemeris data (e.g., instead relying on the GN's knowledge of the satellite location and the UT location).

In the example of FIG. 10, the GN 1004 includes network access controllers (NACs) 1018, each of which interfaces with one or more radio frequency (RF) subsystems 1020 for communicating with the UT 1002 and other UTs (not shown) via the satellite 1006 (or some other satellite, not shown). The GN 1004 also includes a core network control plane (CNCP) 1022 and a core network user plane (CNUP) 1024, or other similar functionality (e.g., control and user plane functionality for other types of networks), for communicating with a network 1026. The network 1026 may represent, for example, one or more of a core network (e.g., 3G, 4G, 5G, etc.), an intranet, or the Internet.

In some implementations, the GN 1004 determines (e.g., receives or generates) the satellite and cell transition information 1008. For example, an NAC 1018 may generate satellite and cell transition information for all UTs under the control of the NAC 1018 based on information (e.g., ephemeris information) received via the network 1026 and information (e.g., configuration information and measurement messages) received from UTs. As another example, an NAC 1018 may receive the satellite and cell transition information for its UTs via the network 1026 (e.g., from a network entity 1028).

Other entities in the system could generate the satellite and cell transition information 1008 as well. In some implementations, a controller 1030 of the network entity 1028 may generate the satellite and cell transition information 1008 and send the satellite and cell transition information 1008 to control components of the system 1000 (e.g., during system startup and/or at other times). For example, the network entity 1028 may transmit the satellite and cell transition information 1008 to the GN 1004 via the network 1026 (e.g., a core network, an intranet, or the Internet) or some other data transfer mechanism. For purposes of illustration, the network entity 1028 is depicted as being outside of the network 1026. However, the network entity 1028 could be part of the network 1026.

Several example aspects of a UT, a GN, or a satellite that may be used in conjunction with handoff of a UT in accordance with the teachings herein will now be described. These aspects may include, for a given one of these satellite system components, one or more of: a parameter or other information used by the component, a parameter assigned to the component, a characteristic (e.g., capability) of the component, signaling used by the component, or an operation performed by the component.

Satellite ID

A Satellite Identifier (ID) is a unique ID of a particular satellite within a satellite system. The Satellite ID allows the satellite to be uniquely identified within the satellite system (e.g., by a UT). To allow for a large satellite deployment, A Satellite ID could be 16 bits or more. In some implementations, the Satellite ID is transmitted on an overhead channel and is not required to be read immediately by the UT. The UT and the GN may use a Satellite ID to index an ephemeris information table to locate the satellite and the projections of the satellite's cells on the earth at a given time.

Cell or Beam ID

A Cell ID is a unique ID for a cell. Similarly, a Beam ID is a unique ID for a beam. For convenience, the term cell/beam may be used herein to indicate a cell and/or a beam. The Cell/Beam ID allows a cell/beam from a given satellite to be uniquely identified (e.g., by a UT). In some aspects, a Cell/Beam ID may be detectable by a UT in a very short period of time (e.g., the Cell/Beam ID may be a continuous signature used on the pilot of the cell/beam). Thus, a UT might not need to decode an overhead message to discover a Cell/Beam ID. In one non-limiting example, a Cell/Beam ID could include 10 bits: 2 bits for a GN ID (e.g., 2 bits may be sufficient to have a unique GN visible by a UT; and the 4 values for the GN ID could be reused across the globe); and 8 bits for the cell/beam commanded by a GN (e.g., a GN controls approximately 10 satellites×16 beams/satellite=160 beams/GN=>8 bits to uniquely identify the cells/beams). A different number of bits could be used in other implementations. Also, spatial diversity of the satellites could be taken into consideration to reduce the number of bits.

UT Capabilities

A UT may exchange its capabilities with the GN at connection time or some other time. Several non-limiting example of UT capabilities follow.

A UT may be dual cell/beam sense capable. Thus, one UT capability parameter (e.g., that takes a value of YES or NO) may indicate whether the UT is capable of sensing more than one cell/beam. For example, this capability parameter may indicate, while the UT is actively communicating using a cell/beam of a particular satellite, whether the UT can sense and detect a Cell/Beam ID of another cell/beam of the same satellite. In some implementations, this capability parameter can be used to indicate whether a UT can support two cells/beams at the same time. A different number of cells/beams (e.g., three or more) could be supported in other implementations.

A UT may be dual satellite sense capable. Thus, another UT capability parameter (e.g., that takes a value of YES or NO) may indicate whether the UT is capable of sensing more than one satellite. For example, this capability parameter may indicate, while the UT is actively communicating using a cell/beam of a particular satellite, whether the UT can sense and detect a Cell/Beam ID of another satellite. In some implementations, this capability parameter can be used to indicate whether a UT can support two satellites at the same time. A different number of satellites (e.g., three or more) could be supported in other implementations.

As discussed in more detail below, a GN may use the sense capability of a UT to determine what type of handoff to use for the UT. For example, if a UT can only support a single cell/beam at a time, handoff could simply be based on the satellite and cell transition table. Conversely, if a UT can support multiple cells/beams/satellites at a time, a GN could monitor for a measurement message from a UT during handoff, whereby the measurement message may affect how (e.g., when and/or where) the UT is handed-off.

Another UT capability parameter may indicate the inter-cell tune time and/or inter-beam tune time (e.g., in microseconds (μsec)) for a UT. For convenience, the term inter-cell/beam tune time may be used to refer to the inter-cell tune time and/or the inter-beam tune time. This UT capability parameter may indicate the time duration it takes for the UT to stop listening to a cell/beam and start listening to another cell/beam of the same satellite. Thus, in some aspects, the inter-cell/beam tune time indicates how long it takes a UT to tune from one cell/beam to another cell/beam.

Another UT capability parameter may indicate the inter-satellite tune time (e.g., in microseconds (μsec)) for a UT. This UT capability parameter may indicate the time duration it takes for the UT to stop listening to a cell/beam on the current satellite and start listening to a cell/beam of another satellite. Thus, in some aspects, the inter-satellite tune time indicates how long it takes a UT to tune from one satellite to another satellite.

In some implementations, a tune time may be given as an upper bound. For example, a tune time may indicate the maximum amount of time that the UT is expected to take to tune from one cell/beam or satellite to another.

In some implementations, a tune time may be described according to a formula. A non-limiting example of such a formula is: a+b*τ where, a is a constant that indicates the minimum time duration for the inter-satellite tuning, τ is the angular distance (in degrees) between the current satellite and the target satellite, and b is the movement speed of the UT's antenna in degrees of movement per millisecond.

Tune-Away Definitions

Signaling may be employed to allow a UT to tune-away for inter-satellite and inter-cell/beam sensing. This signaling can be used to define tune-away periods for a UT to sense other cells/beams of the same satellite or other satellites.

UT Location

A UT location reporting mechanism is employed for handoff processing and paging so that the GN will know the location of the UT (e.g., on a continual or regular basis). In some implementations, a UT will have reliable global positioning system (GPS) positioning.

For stationary UTs, the UT location reporting mechanism may involve the UT sending a signaling message to the GN that reports the location (e.g., the GPS coordinates) of the UT.

For mobile UTs (e.g., UTs on a ship or an airplane), the UT location reporting mechanism may involve the UT sending a signaling message to the GN that reports the speed and direction of the UT. This allows the GN to continuously estimate the location of the UT. Even for mobile UTs, the direction and speed information may be relatively stable if the UTs are carried by (e.g., attached to) relatively large vessels.

Also, via location-related signaling, the UT may be informed of the location drift allowed before a new location update message is needed.

Some implementations may employ thresholds for location tolerance. Some implementations may employ GEO fencing. For example, if a UT is beyond a designated boundary relative to a satellite and/or a GN (e.g., the UT is a certain distance away), the UT may be configured to send a location update to the GN.

Ephemeris Transfer and Update Signaling

Ephemeris Transfer and Update signaling messages may be used to transfer satellite ephemeris data to the UTs. In some aspects, ephemeris data includes a geographic description of where a given satellite is at a given point in time. This data may be used by the UT when it searches for the next satellite and cell/beam (e.g., after the UT detects a radio link failure). For example, in some aspects, a UT may use the ephemeris data for a given satellite to determine where to point the UT's antenna (antennas) at a given point in time. In some aspects, a GN may transmit a signaling message containing the satellite ephemeris data to all connected UTs (e.g., whenever there is an update). In some aspects, a UT may request satellite ephemeris data from the GN (e.g., when the UT establishes a connection).

Satellite and Cell Transition Tables

Each satellite beam may be regarded as a separate cell with its own data and control channels, and signals. The GN or some other entity may generate a satellite and cell transition table that provides a list of satellites to which a UT may choose to handoff next. The transition table also may dictate exactly at what time the UT will switch over from one cell (e.g., corresponding to a beam and/or an RF band) of the next satellite to another. A transition table may indicate, for a number of satellites, the cells (e.g., the beams and/or the bands) to be used for each satellite. A transition table may indicate, for each cell (e.g., beam), the frequency (e.g., the nominal radio frequency or frequency band) of the cell. A transition table may also indicate the Cell ID of each Cell (or Beam ID of each beam).

A GN may define a satellite and cell transition table based on various information. In some aspects, a GN may define the table using the location (and speed and direction, if specified) of the UT. In some aspects, a GN may define the table using satellite locations over time calculated from ephemeris data. In some aspects, a GN may define the table based on information regarding whether certain cells/beams and/or satellites are turned off at certain times.

Table 2 below is one example of a satellite and cell transition table. The entries for this table include Satellite IDs, Beam IDs, Beam Frequencies (Freq), Start Times, and End Time. This table could also be referred to as a satellite and beam transition table. TAbeam denotes the tune-away time from one beam to another of the same satellite. In this example, the UT is to tune to Satellite 1, Beam 1 (on frequency F11) from time a1 to time b1. The UT is to then tune to Satellite 1, Beam 2 (on frequency F21) from time b1+TAbeam to time c1, and so on.

In some implementations, the table may be sent in a signaling message by the GN to the UT it is serving, at any time before the UT is handed-off to the next satellite.

TABLE 2

| Satellite ID | Beam ID | Freq. | Start Time (e.g., Frame Number) | End Time (e.g., Frame Number) |
|---|---|---|---|---|
| Satellite 1 | Beam 1 | $F_{11}$ | $a_1$ | $b_1$ |
| | Beam 2 | $F_{21}$ | $b_1 + TA_{beam}$ | $c_1$ |
| | ... | ... | ... | ... |
| | Beam N | $F_{N1}$ | $m_1 + TA_{beam}$ | $n_1$ |
| Satellite 2 | Beam 1 | $F_{12}$ | $a_2$ | $b_2$ |
| | Beam 2 | $F_{22}$ | $b_2 + TA_{beam}$ | $c_2$ |
| | ... | ... | ... | ... |
| | Beam N | $F_{N2}$ | $m_2 + TA_{beam}$ | $n_2$ |
| ... | ... | ... | ... | ... |

In one example, the overhead of the satellite and cell transition table message is as follows (assuming that there are two satellites listed in the table): Satellite ID=16 bits; Beam ID=10 bits; Freq.=4 bits (assuming 16 beam frequencies per satellite); and Start and End Times=15 bits.

The Start Time and the End Time can be specified in terms of Frame Numbers. The physical layer may specify the use of 10 millisecond (ms) transmission frames for the system. Assuming that a satellite handoff takes place every 3 minutes, the number of frames that can be transmitted between handoffs is 18,000. Frame Numbers can be re-initialized from zero after every handoff. The number of bits that are then required to specify the Frame Numbers is thus 15 bits in this example.

In the above example, the total overhead of the message would be 1020 bits=128 bytes (approximately). The values of a1, b1, . . . , n1, TAbeam would be specified.

If a maximum of 1000 active users can be served at any time by one beam, and if a beam overall downlink (DL) throughput is approximately 300 Mbps, the overhead is given by: overhead=(128 bytes×numUsersBeam)/(total bytes delivered by beam over 3 minutes)=(128 bytes×1000)/(300×106×3×60)=19×10−6 (approximately).

Table 3 below is another example of a satellite and cell transition table. SatelliteID is a unique ID assigned to a satellite in the system. The forward link (FL) Band is a positive integer index that identifies a transmission frequency band of the FL. The return link (RL) Band is a positive integer index that identifies a transmission frequency band of the RL.

Handoff Activation Time specifies the time when a UT should stop transmitting and receiving. In some implementations, this time is specified in the source cell in units of System Frame Numbers (SFNs). SFNs may be, for example, sequence numbers assigned to 10 ms physical layer transmission radio frames. The UT stops transmitting and receiving at the beginning of the SFN. For example, if the Handoff Activation Time is specified to be at the SFN 5, then the UT stops transmitting or receiving at sub-frame 0 of the SFN 5.

TABLE 3

| SatelliteID | FL Band | RL Band | ... | RL Band | Handoff Activation Time (e.g., SFN) |
|---|---|---|---|---|---|
| Satellite 1 | $F_1$ | $R_{11}$ | ... | $R_{1M}$ | $a_1$ |
| | $F_2$ | $R_{21}$ | ... | $R_{2M}$ | $a_2$ |
| | ... | ... | ... | ... | ... |
| | $F_{16}$ | $R_{16,1}$ | ... | $R_{16,M}$ | $a_{16}$ |

TABLE 3-continued

| SatelliteID | FL Band | RL Band | ... | RL Band | Handoff Activation Time (e.g., SFN) |
|---|---|---|---|---|---|
| Satellite 2 | ... | ... | ... | ... | ... |
| | ... | ... | ... | ... | ... |
| | ... | ... | ... | ... | ... |

The UT starts transmitting or receiving in the target cell at the Handoff Activation Time plus a tune-away time. Two examples of UT parameters related to the tune-away time are an inter-cell tune-away time and an inter-satellite tune-away time. These parameters may be included in the UT Capability information.

Inter-Satellite Handoff

Figure 11:
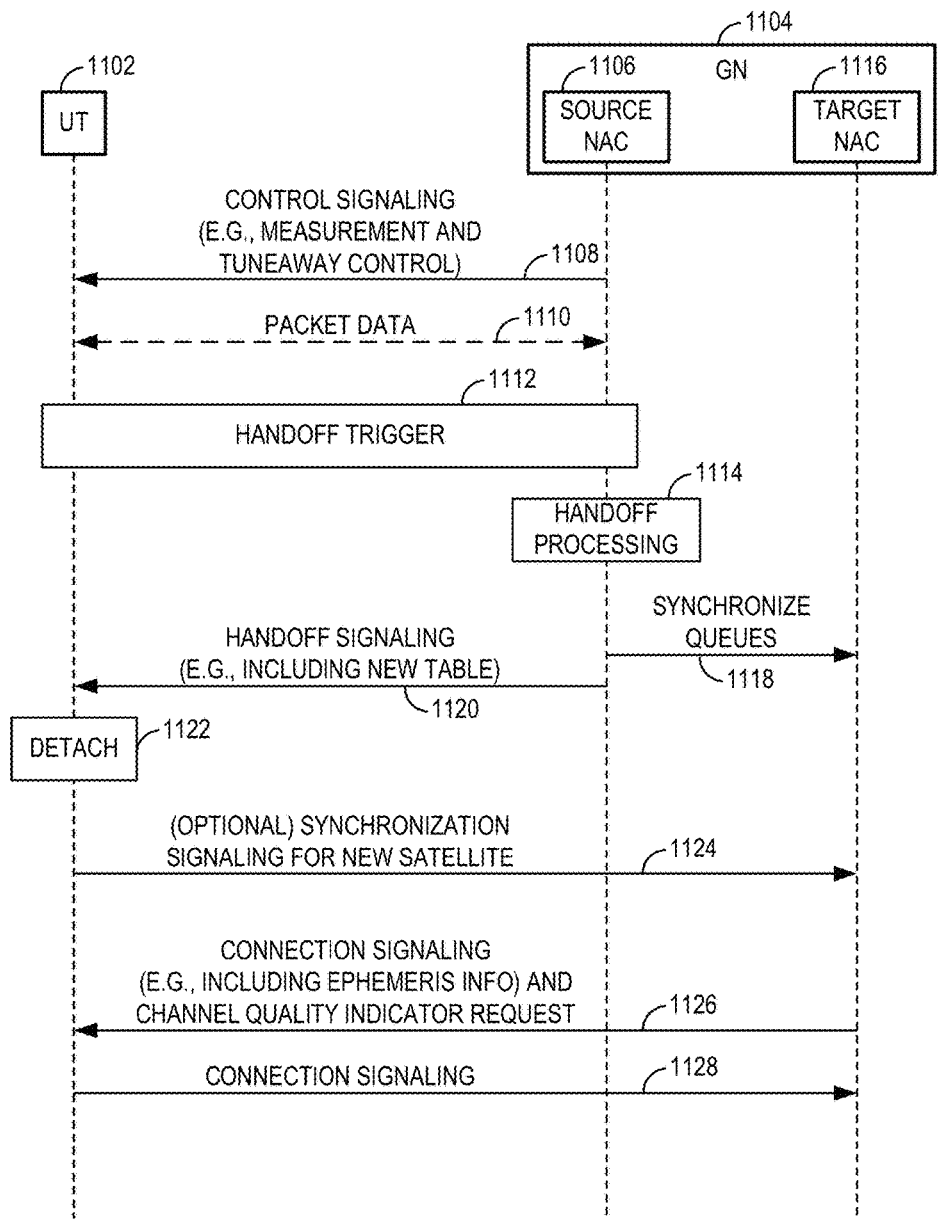
FIG. 11 is a diagram illustrating an example of inter-satellite handoff signaling in accordance with some aspects of the disclosure.
Figure 12:
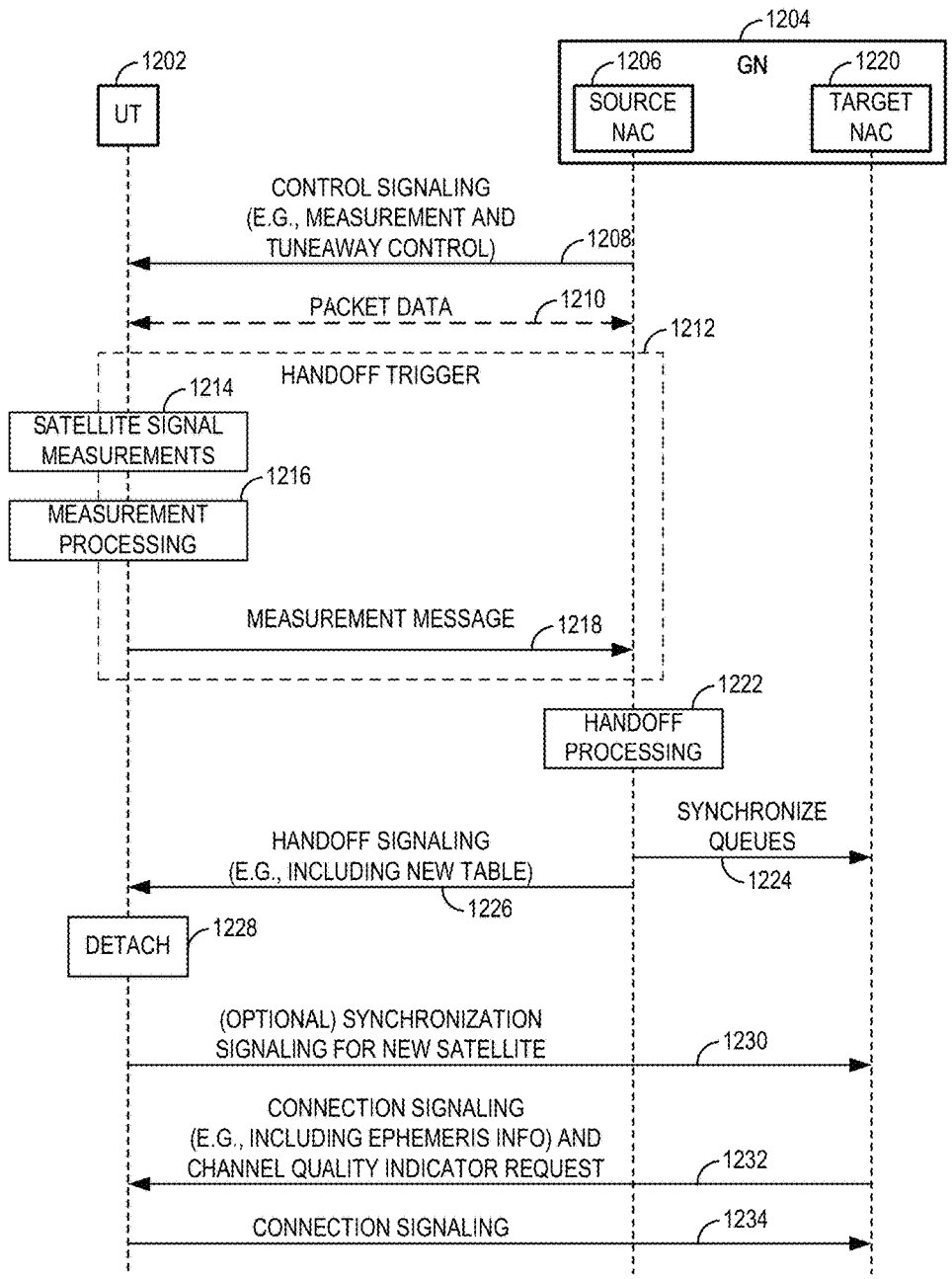
FIG. 12 is a diagram illustrating another example of inter-satellite handoff signaling in accordance with some aspects of the disclosure.

FIGS. 11 and 12 illustrate examples of inter-satellite handoff. In these examples, the GN includes a source NAC that controls a first satellite and a target NAC that controls a second satellite. In each case, the UT initially is connected to a source satellite (and, hence, the source NAC) and is subsequently handed-off to a target satellite (and, hence, the target NAC). A different number of NACs and satellites could be supported in other implementations. Also, in some implementations, a common (e.g., the same) entity could support multiple satellites.

FIG. 11 is an example where a UT 1102 does not send a measurement message. For example, the UT 1102 might not support the sensing of multiple cell/beams and/or satellites or the UT 1102 may determine that a measurement message need not be sent to a GN 1104. In this case, the UT 1102 and the GN 1104 rely on the existing satellite and cell transition table to determine when to transition to the next cell/beam and/or satellite and where to transition (e.g., which cell/beam, which frequency, which satellite). The UT 1102 is an example of the UT 400 or the UT 401 of FIG. 1. The GN 1104 is an example of the GN 200 or the GN 201 of FIG. 1.

A source NAC 1106 sends control signaling 1108 to the UT 1102. This control signaling 1108 may include, for example, measurement information and tune-away control information (e.g., tune-away definitions). In addition, packet data 1110 is exchanged between the UT 1102 and the source NAC 1106. The source NAC 1106 is an example of the NAC 1012 of FIG. 10.

At some point in time a handoff is triggered 1112. For example, the current time may correspond to the time for a transition from one satellite to the next indicated by the satellite and cell transition table.

Other handoff triggers may be employed as well. For example, the GN 1104 (e.g., the source NAC 1106) may decide autonomously that the UT 1102 needs to be handed-off. Such a trigger may be due to, for example: the current serving satellite is moving out of range of the UT 1102; the satellite is moving out of the range of the GN 1104, even if it may be within the range of the UT 1102; or the cell/beam serving the UT 1102 will be blocked-out due to GEO requirements.

In the event the UT 1102 is capable of sensing another cell/beam and/or satellite while connected to the first satellite, the UT 1102 may search the signal strength of the default satellite and cell/beam for handoff. It may be assumed that the UT 1102 has the location information of this satellite in order to do so. This location information can be obtained from the satellite ephemeris data the UT 1102 possesses. If the signal strength is satisfactory, the UT 1102 does nothing and waits for the source NAC 1106 to start the inter-satellite handoff process.

Thus, in the example of FIG. 11, both the UT 1102 and the source NAC 1106 will follow the table and commence the handoff to a new serving satellite. To this end, the source NAC 1106 will perform handoff processing 1114. For example, the source NAC 1106 may communicate with a target NAC 1116 to commence the handoff. In some aspects, this may involve synchronizing the queues 1118 (e.g., packet traffic queues) between the NACs 1106 and 1116. Also, as the time of the handoff is known ahead of time, the user queues can be transferred ahead of time. The target NAC 1116 is an example of the NAC 1012 of FIG. 10.

The source NAC 1106 then sends handoff signaling 1120 to the UT 1102. In some aspects, this handoff signaling 1120 may include information that enables the UT 1102 to communicate with the target NAC 1116. In some aspects, this handoff signaling 1120 may include a new satellite and cell transition table (e.g., that the source NAC 1106 received from the target NAC 1116).

The UT 1102 then detaches 1122 from the first satellite and synchronizes to the second satellite. To this end, the UT 1102 may send synchronization signaling 1124 for the second satellite to the target NAC 1116. In some aspects, this may involve the UT 1102 performing a random access procedure at the second satellite.

The UT 1102 and the target NAC 1116 may then exchange connection signaling 1126 and 1128. In some aspects, this may involve the target NAC 1116 sending ephemeris information to the UT 1102 and requesting a channel quality indicator from the UT 1102. In some aspects, the UT 1102 may use the ephemeris information to synchronize with the second satellite.

Also, the various entities may perform various background operations to ensure that packet forwarding is done properly and any needed clean-up (e.g., cache clean-up) is performed.

FIG. 12 is an example where a UT 1202 does send a measurement message. For example, the UT 1202 might determine that a measurement message needs to be sent to a GN 1204 because the measured channel conditions (e.g., signal strength) from the serving satellite or the target satellite are unacceptable (e.g., the signal strength is too low). In this case, the GN 1204 may generate a new satellite and cell transition table based on the measurement message. The UT 1202 and the GN 1204 will then use the new satellite and cell transition table to determine when to transition to the next cell/beam and/or satellite and where to transition (e.g., which cell/beam, which frequency, which satellite). The UT 1202 is an example of the UT 400 or the UT 401 of FIG. 1. The GN 1204 is an example of the GN 200 or the GN 201 of FIG. 1.

As in FIG. 11, a source NAC 1206 sends control signaling 1208 to the UT 1202. This control signaling 1208 may include, for example, measurement information and tune-away control information (e.g., tune-away definitions). In addition, packet data 1210 is exchanged between the UT 1202 and the source NAC 1206. The source NAC 1206 is an example of the NAC 1012 of FIG. 10.

At some point in time a handoff is triggered 1212. In some cases, the current time corresponding to the time for a transition from one satellite to the next as indicated by the satellite and cell transition table constitutes a handoff trigger. In some cases, a measurement message sent by the UT 1202 indicating that a neighbor satellite is materially stronger (e.g., associated with a stronger received signal strength) than a current serving satellite may constitute a handoff trigger.

Other handoff triggers may be employed as well. For example, the GN 1204 (e.g., the source NAC 1206) may decide autonomously that the UT 1202 needs to be handed-off. Such a trigger may be due to, for example: the current serving satellite is moving out of range of the UT 1202; the satellite is moving out of the range of the GN 1204, even if it may be within the range of the UT 1202; or the cell/beam serving the UT 1202 will be blacked-out due to GEO requirements.

In the example of FIG. 12, the UT 1202 is capable of sensing another cell/beam and/or satellite while connected to the first satellite. Thus, the UT 1202 may perform channel quality measurements (e.g., satellite signal strength measurements). For example, the UT 1202 may measure 1214 the signal strength from the current serving satellite (first satellite) and the target satellite (second satellite).

The UT 1202 then performs measurement processing 1216 to determine, for example, whether either channel quality is inadequate (e.g., signal strength is too low). In the event either channel quality is inadequate, the UT 1202 may elect to send a measurement message 1218 to the source NAC 1206. This measurement message 1218 may include, for example, the results of the measurements (e.g., signal strength in dB), an indication that the handoff time needs to be advanced (e.g., because the signal from the source satellite is currently too low), an indication that the handoff time needs to be delayed (e.g., because the signal from the target satellite is currently too low), or some other indication.

Thus, similar to FIG. 11, the UT 1202 may search the signal strength of the default satellite and cell/beam for handoff. Again, it may be assumed that the UT 1202 has the location information of this satellite in order to do so (e.g., obtained from the satellite ephemeris data the UT 1202 possesses). If the signal strength is not satisfactory, the UT 1202 may send a measurement message 1218 to the source NAC 1206 indicating a satellite different from the default one, to trigger the handoff process early or delay it.

The source NAC 1206 may thus make a decision to handoff the UT 1202 to a target satellite and a target NAC 1220 based on the satellite and cell transition table and on any measurement message 1218 the source NAC 1206 receives from the UT 1202. Thus, as indicated in FIG. 12, the source NAC 1206 will perform some handoff processing 1222. For example, the source NAC 1206 may decide, based on the measurement message 1218, whether the handoff time needs to be advanced (early handoff) or delayed (late handoff), or whether some other satellite should be selected as the target. In addition, the source NAC 1206 may communicate with a target NAC 1220 to commence the handoff. In some aspects, this may involve synchronizing the queues 1224 (e.g., packet traffic queues) between the NACs 1206 and 1220. The target NAC 1220 is an example of the NAC 1012 of FIG. 10.

The source NAC 1206 then sends handoff signaling 1226 to the UT 1202. In some aspects, this handoff signaling 1226 may include information that enables the UT 1202 to communicate with the target NAC 1220. In some aspects, this handoff signaling 1226 may include a new satellite and cell transition table (e.g., that the source NAC 1206 received from the target NAC 1220).

The UT 1202 then detaches 1228 from the first satellite and synchronizes to the second satellite. To this end, the UT 1202 may send synchronization signaling 1230 for the second satellite to the target NAC 1220.

The UT 1202 and the target NAC 1220 may then exchange connection signaling 1232 and 1234. In some aspects, this may involve the target NAC 1220 sending ephemeris information to the UT 1202 and requesting a channel quality indicator from the UT 1202. Again, the various entities may perform various background operations to ensure that packet forwarding is done properly and any needed clean-up (e.g., cache clean-up) is performed.

With normal inter-satellite handoff, hybrid automatic repeat request (HARQ) processes may be terminated. However, the source NAC may know exactly when the handoff will happen, therefore the source NAC can ensure that the forward link data buffers are drained. Also, the gap for data flow can be minimized since the time of handoff is known.

Inter-Beam Handoff

Inter-cell/beam handoff is executed by the GN and the UT synchronously according to the timeline specified in the satellite and cell transition table. Using the tune-away periods or dual receive capability, the UT detects the presence of the next cell/beam specified in the satellite and cell transition table. If the UT detects the next cell/beam successfully, a normal inter-cell/beam handoff is executed without any signaling between the UT and the GN.

With normal inter-cell/beam handoff, forward link HARQ processes may be carried over from one cell/beam to the next. In addition, reverse assignments may be cancelled as the UT hands-off from one cell/beam to the next. For example, the UT may instead send new request messages to send reverse link data.

Exception Scenarios

If the UT loses the current serving cell/beam before the expiration of the specified time in the satellite and cell transition table, the UT enters into radio link failure (RLF) mode. In RLF mode, the UT may attempt to find an alternate cell/beam or satellite (e.g., based on the ephemeris information at the UT). For example, the UT may attempt to connect to the next satellite that should be serving the UT. If the UT successfully establishes another connection, the UT can send signaling messages to the GN to continue communication where the UT left off before the RLF.

While being served by a cell/beam, the UT may fail to detect the next cell/beam specified in the satellite and cell transition table, but may detect another cell/beam. This may happen, for example, to a fast moving UT (e.g., a UT attached to an airplane). In this case, the UT may send a measurement message to initiate another handoff procedure. In addition, the UT may also send a position update if it has moved since the last time a position update was sent. In response, the GN may send an updated satellite and cell transition table. In this case, the UT follows the updated table. Alternatively, the GN may start a completely new handoff process.

Example Connected Mode Handoff Details

Referring now to FIGS. 13-23, various aspects of radio connected mode handoff in accordance with the teachings herein will be described in more detail. The following describes examples of call flows for various connected mode handoff operations. In addition, the following details describe several procedures that may be used to improve handoff performance. In various aspects, these procedures may be used to define handoff measurements, determine when to trigger the measurements, determine when to handoff a UT, or determine whether to trigger a UT to obtain return link synchronization after a handoff. For purposes of explanation, these details will be discussed in the context of a NAC that comprises two components, a BxP and an AxP, for controlling and/or communicating with a satellite.

Figure 13:
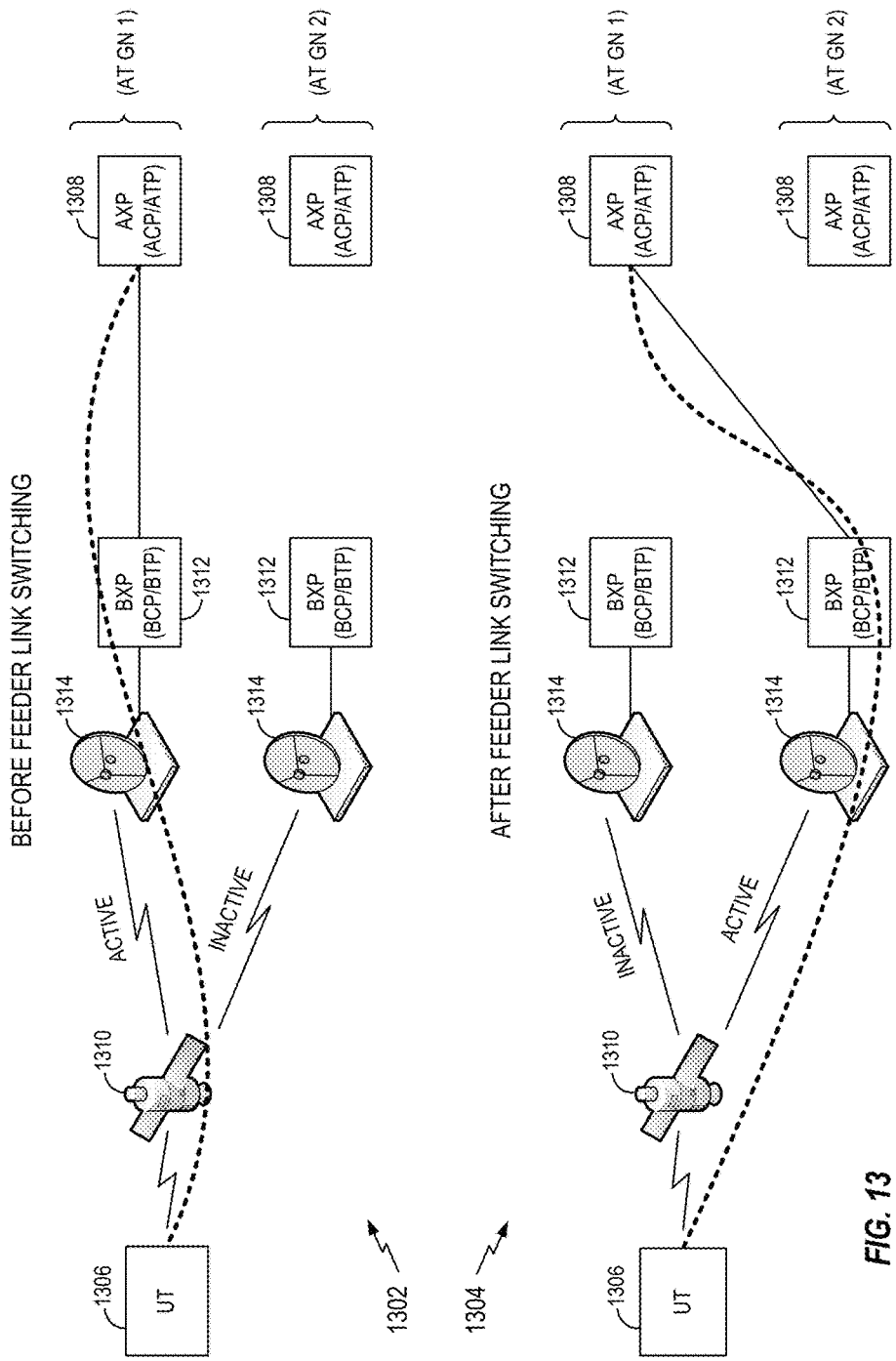
FIG. 13 is a diagram illustrating an example of feeder link switching in accordance with some aspects of the disclosure.

FIG. 13 illustrates an example deployment of BxP and AxP components in a satellite system. At a given point in time, a UT 1306 communicates with one of the AxPs 1308 via a satellite 1310 and one of the BxPs 1312, where each BxP 1312 includes or is associated with a satellite RF subsystem 1314.

A BxP refers to a combination of a BCP and a BTP (hence, the acronym BxP). In some aspects, a BxP may include radio network components for controlling a satellite. For example, a BxP may include, for a given cell/beam of a satellite, a corresponding set of digital circuits that serves that cell/beam. Thus, in some aspects, a BxP corresponds to a particular antenna. Also, in some aspects, a given BxP may be associated with a particular band for a given cell/beam of a satellite.

An AxP refers to a combination of an ACP and an ATP (hence, the acronym AxP). In some aspects, an AxP corresponds to an anchor point. In some aspects, an anchor point may be associated with a particular region (e.g., an administrative region, a country boundary, etc.). A given AxP may serve one or more satellites. Also, a given satellite may service one or more AxPs.

In the above scenario, a UT in connected mode may undergo two types of handoff: BxP handoff or AxP handoff. For example, as satellites move in a non-GSO satellite system, the cells/beams (and, hence, the circuits and antennas associated with those cells/beams) used to serve a given UT will change over time. Thus, in some aspects, a BxP handoff may correspond to a handoff to a different cell/beam (or antenna, etc.). As another example, rain fade on a particular cell/beam operating on a first band may necessitate a switch to a different band for that cell/beam. Thus, in some aspects, a BxP handoff may correspond to a handoff to a different band for a given cell/beam. An AxP handoff corresponds to handoff to a different anchor point. For example, a UT may move to a different administrative region, thereby necessitating a change in the serving AxP. A BxP handoff might or might not be associated with an AxP handoff.

In some aspects, the disclosure that follows addresses satellite pointing errors that may occur in a satellite communication system. These errors may result from various causes in the system.

Figure 14:
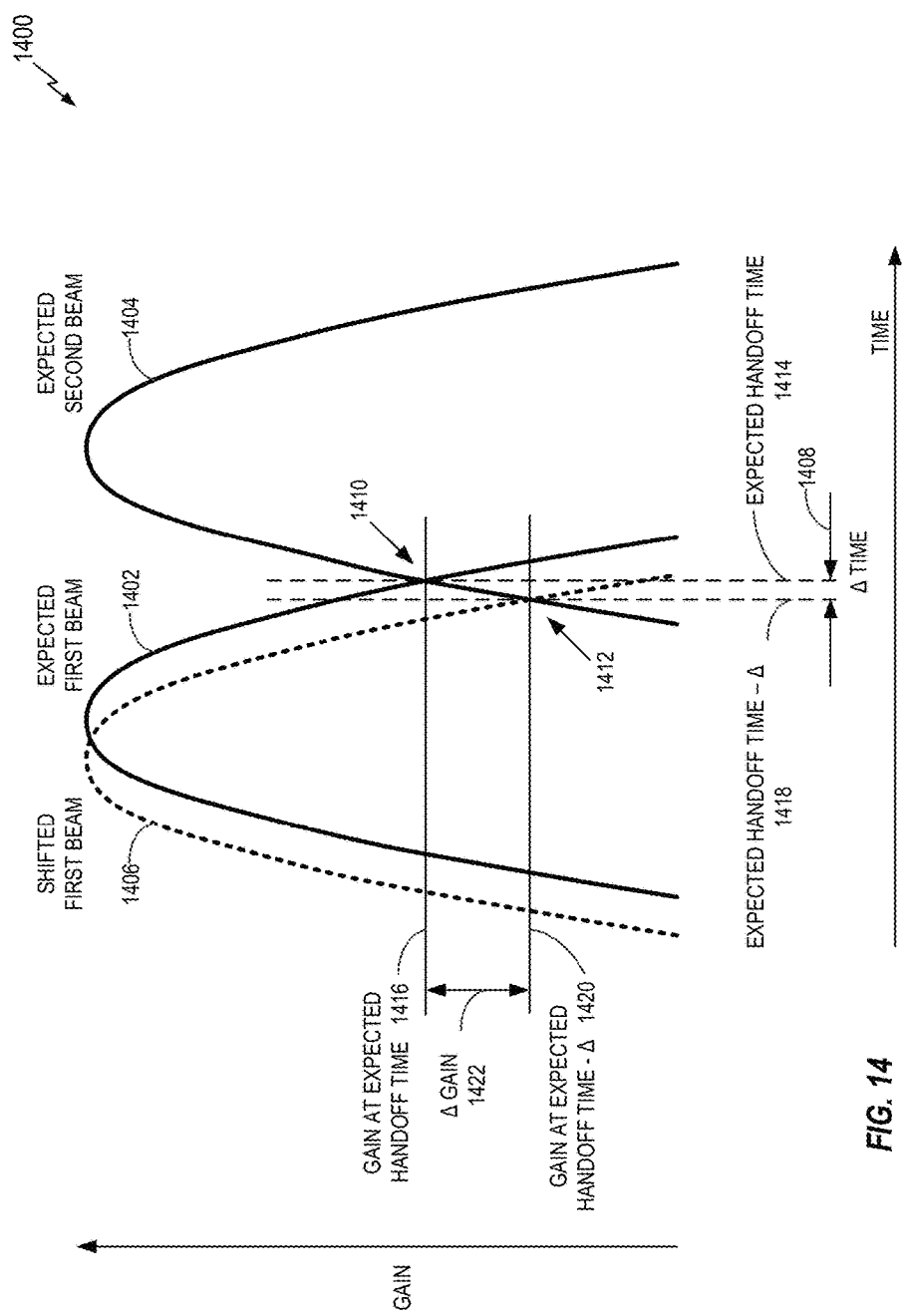
FIG. 14 is a diagram illustrating an example of a satellite pointing error in accordance with some aspects of the disclosure.

The graph 1400 of FIG. 14 illustrates expected gain contours 1402 and 1404 from different satellite beams, a first expected beam and a second expected beam, respectively. In some aspects, these beam gain contours may be used to determine when to handoff a UT from one beam to the next. For example, a UT may be handed over when the beam gain from the first expected beam (a source beam) that is currently serving the UT drops below the beam gain of the second expected beam (a candidate target beam).

For the first expected beam, FIG. 14 illustrates an actual beam gain contour 1406 that may be seen by a UT due to a satellite pointing error. As indicated in FIG. 14, a shift 1408 in the gain contour due to a satellite pointing error shifts the gain contour intersection between the two beam contours from a first intersection 1410 to a second intersection 1412. Thus, at the expected (ideal) handoff time 1414, the gain from the first beam will be lower (by the indicated amount) than the expected gain 1416, thereby adversely affecting handoff performance. As a result, the signal quality at the UT may be lower than desired immediately prior to handoff. To address this issue, the ideal handoff time may be shifted by a Δ (earlier in time in this example) based on the shift 1408 in the beam contour due to the satellite pointing error. Thus, handoff will occur at a new handoff time 1418. As shown in FIG. 14, the gain 1420 at the new handoff time 1418 may be lower by a Δ gain 1422 than the expected gain 1416 associated with the expected first beam.

To this end, a UT may conduct measurements of satellite signals (e.g., inter-satellite and intra-satellite) and send this information to a GN. Based on these signals, the GN may modify the handoff time for the UT. Accordingly, a GN may send updated handoff information to a UT (e.g., via a satellite and cell transition table or a subset of the satellite and cell transition table) to account for the satellite pointing error.

In some aspects, a random access procedure may be used in scenarios where a UT has not yet achieved synchronization with a satellite during a handoff. For example, a random access procedure based on UT measurements of satellite signals may allow a UT to achieve return link synchronization.

BxP Handoff

A logical BxP may be uniquely identified by a 4-tuple including a satellite access network (SAN), a GN antenna, a Satellite Beam, and a forward service link (FSL) Frequency, where GN Antenna refers to the antenna in FIG. 13. A BxP handoff occurs for a UT in radio connected mode if the BxP 4-tuple of its connection changes.

Table 4 lists an example of these four types of BxP handoffs and the changes (highlighted in bold) associated with the BxP 4-tuple for each type of BxP handoff. For the Feeder Link Switching handoff, only the BxP changes, not the entire SAN.

TABLE 4

| Type of BxP handoff | BxP-4 tuple changes (in bold) |
| --- | --- |
| Intra-Sat handoff | (SAN, GN Antenna, Sat Beam, FSL Frequency) |
| Inter-Sat handoff | (SAN, GN Antenna, Sat Beam, FSL Frequency) |
| Feeder Link Switching handoff | (SAN, GN Antenna, Sat Beam, FSL Frequency) |
| Intra-GN, GN antenna failover | (SAN, GN Antenna, Sat Beam, FSL Frequency) |

The BxP handoff occurs at either a handoff time based upon a priori information, denoted as THO_a_priori, or a new handoff time recalculated using UT measurement reports, denoted as THO_recalc, where THO_recalc=THO_a_priori (e.g., as in FIG. 14).

If the satellite antenna pointing errors are well known a priori, then the BxP handoff shall be initiated by the UT based solely upon its Satellite Handoff Table (e.g., satellite and cell transition table). Otherwise, the BxP handoff may require UT measurements of the target cell and subsequent measurement reporting by the UT to the source AxP based upon which the source AxP shall update the UTs satellite and cell transition table.

BxP Handoff—Feeder Link Switching

Referring again to FIG. 13, a first configuration 1302 and a second configuration 1304 illustrate a feeder link switching BxP handoff. Each satellite has dual feeder link connections to two GNs, but only one feeder link connection is active at any one time. The dual feeder link connections allow instantaneous switching of the active feeder link connection at a satellite. The feeder link switching appears as an idempotent handoff in which the UT hands over to the same satellite, the same cell and the same frequency. However, the feeder link switching BxP handoff can also be made to occur at the same time as a cell handoff for some UTs, in which case the target cell is different from the source cell.

Figure 15:
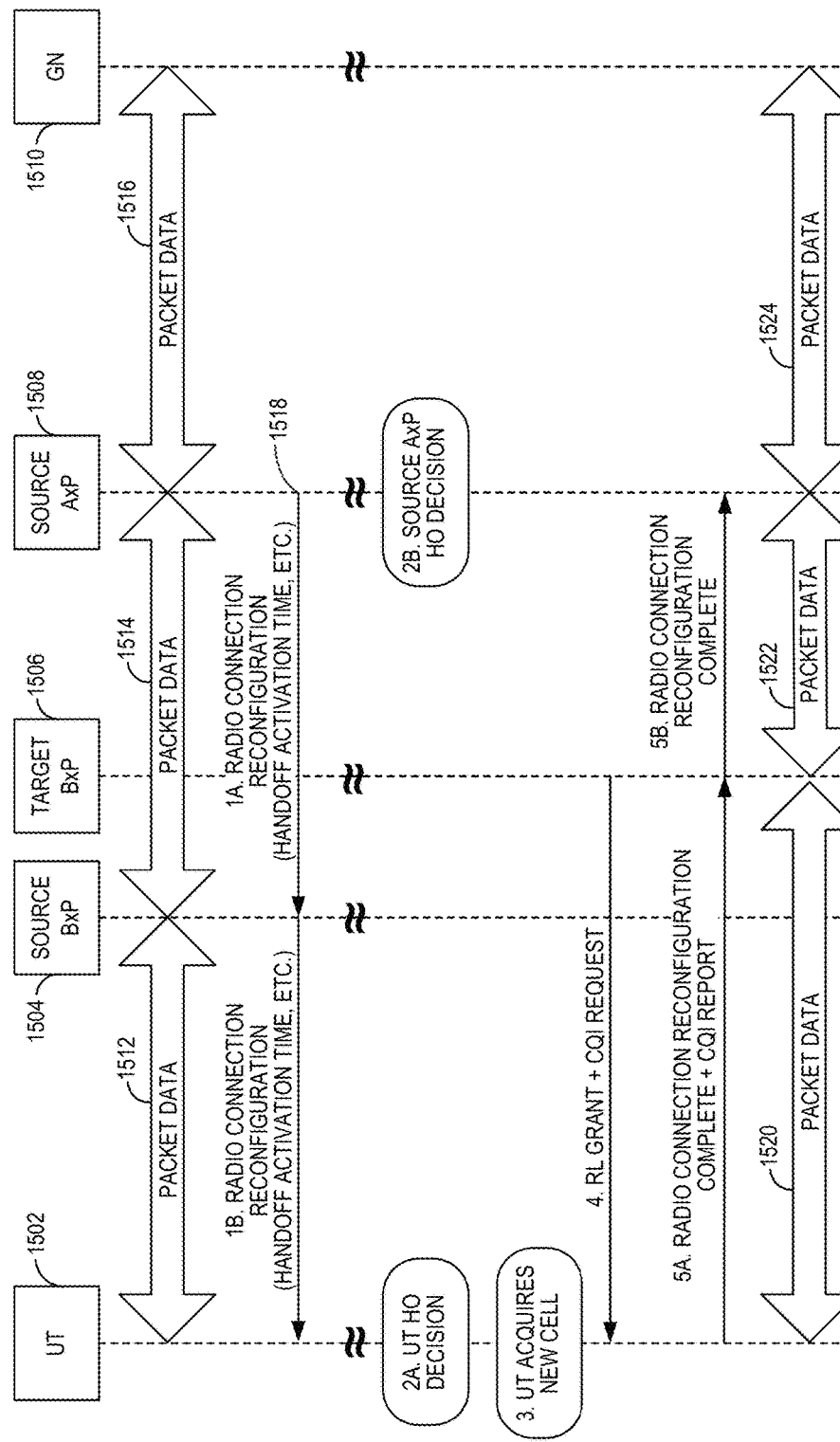
FIG. 15 is a diagram illustrating an example of a call flow for a non-random access-based B×P handoff in accordance with some aspects of the disclosure.
Figure 17:
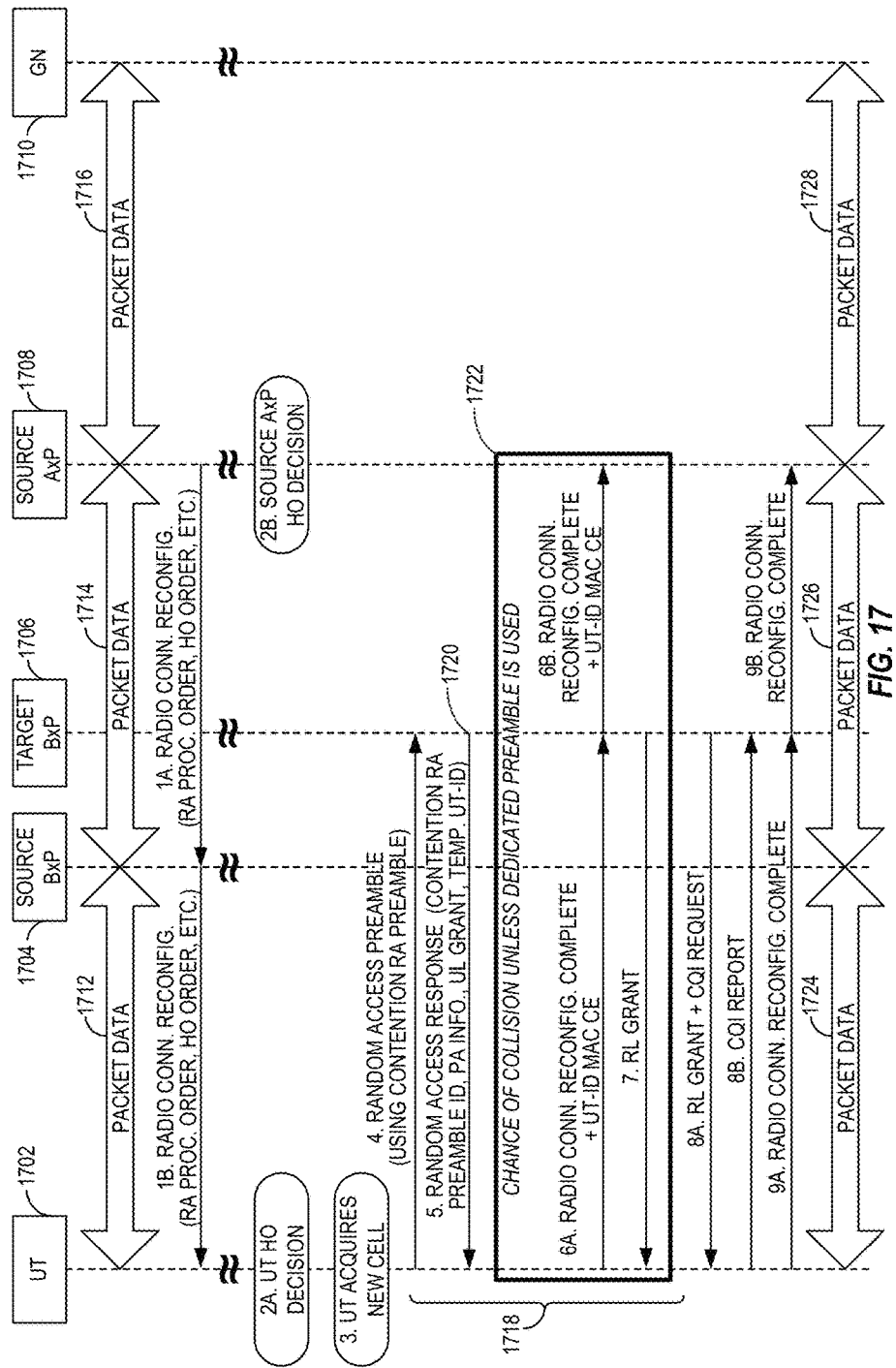
FIG. 17 is a diagram illustrating an example of a call flow for a random access-based B×P handoff in accordance with some aspects of the disclosure.

The call flows for feeder link switching BxP handoff are the same as those illustrated in FIG. 15 and FIG. 17 discussed below. The call flow in FIG. 15 is applicable for the case where the UT does not need to perform a Random Access procedure in order to achieve RL synchronization after the feeder link switching occurs. The call flow in FIG. 17 is applicable for the case where the UT does need to perform a Random Access procedure in order to achieve RL synchronization after the feeder link switching occurs.

BxP Handoff—Non-Random Access

FIG. 15 illustrates a non-Random Access-based BxP handoff call flow without UT measurements and measurement reporting. A typical use-case is an intra-satellite BxP handoff. The call flow is between a UT 1502, a source BxP 1504, a target BxP 1506, a source AxP 1508, and a GN 1510.

A description of the steps in the non-Random Access-based BxP handoff call flow without UT measurements and measurement reporting is provided below. Initial packet data flow is represented by lines 1512, 1514, and 1516.

At point 1518, the source AxP 1508 pre-configures the target BxP 1506 for handoff before (e.g., 1 second before) the handoff activation time (e.g., before THO_a_priori). At step 1A, the source AxP 1508 sends a Radio Connection Reconfiguration message to the UT 1502. At step 1B, the message is sent to the UT 1502 sufficiently in advance of the handoff activation time so that the UT 1502 has adequate time to receive the message. This message may include satellite handoff information such as a row of a transition table (e.g., indicative of a handoff activation time) and other parameters. The UT 1502 starts timer T-4. If T-4 expires (e.g., a handoff failure occurs), then the UT 1502 performs the Radio Connection Re-establishment procedure.

At steps 2A and 2B, based upon the single row of the satellite and cell transition table contained in the Radio Connection Reconfiguration message in step 1, both the UT 1502 and source AxP 1508 simultaneously prepare for BxP handoff at the handoff activation time (e.g., at THO_a_priori). Thus, the UT 1502 prepares to handoff from the source BxP 1504 to the target BxP 1506, and the source AxP 1508 prepares to handoff the UT 1502 from the source BxP 1504 to the target BxP 1506.

At step 3, the UT 1502 resets the media access control (MAC) state. The UT 1502 then acquires the new cell (e.g., FL synchronization).

At step 4, after the handoff activation+Inter-Cell Tuneaway time, the target BxP 1506 sends to the UT 1502 an RL grant+channel quality indicator (CQI) request. The RL grant is addressed to the UT identifier (UT-ID) that the source AxP 1508 assigned to the UT 1502 in the Radio Connection Reconfiguration message (see Step 1).

At step 5, upon receiving the RL grant from the target BxP 1506, the UT 1502 stops timer T-4 (e.g., the handoff is successful) and sends a CQI report and Radio Connection Reconfiguration Complete message to the target BxP 1506 (step 5A) for forwarding to the source AxP 1508 (step 5B). The Radio Connection Reconfiguration Complete message contains no information elements (IEs) and is integrity protected and encrypted with the old keys (e.g., Kint and Kenc, respectively). Final packet data flow is represented by lines 1520, 1522, and 1524.

Figure 16:
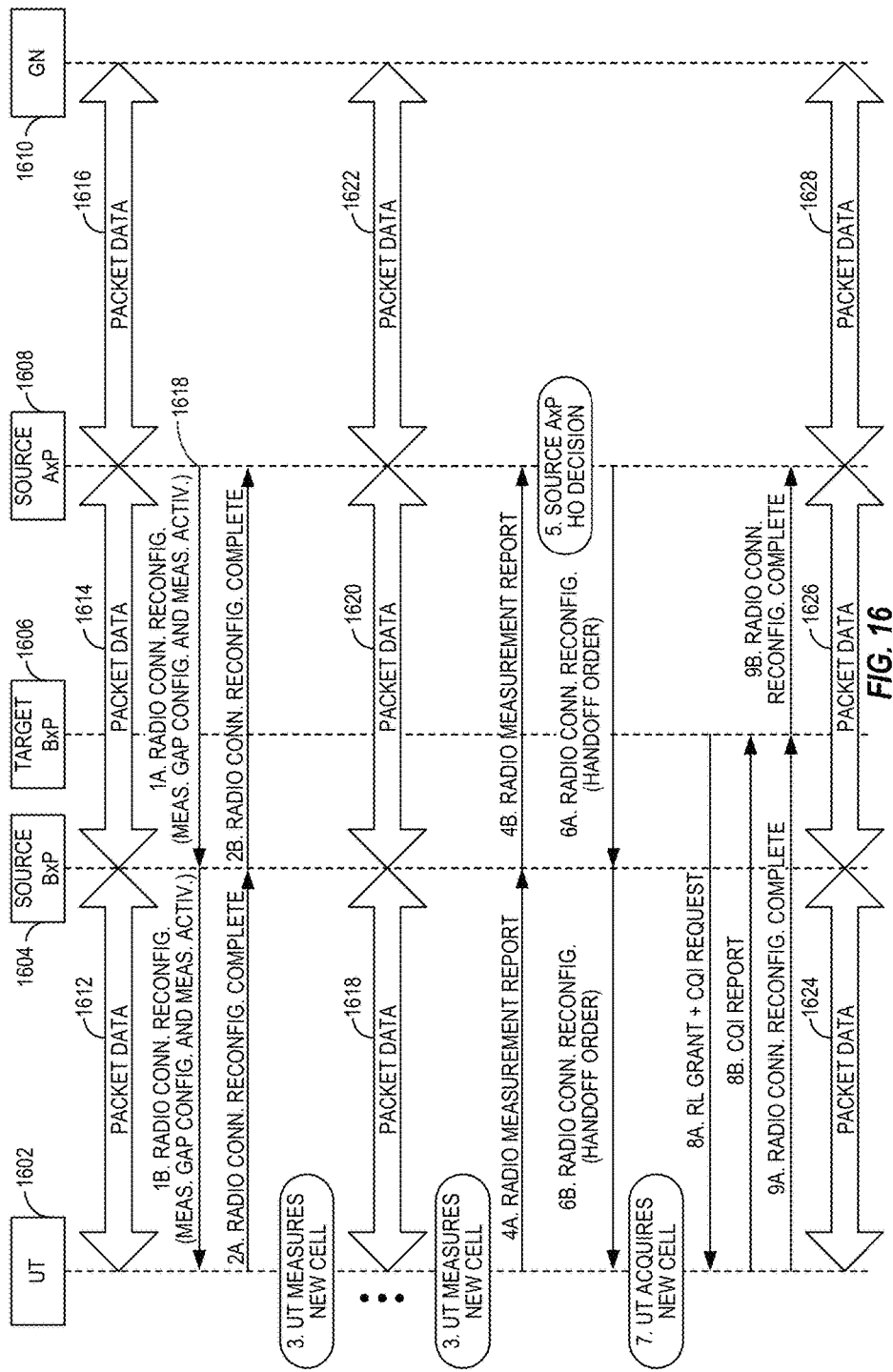
FIG. 16 is a diagram illustrating an example of a call flow for a non-random access-based B×P handoff with user terminal (UT) measurements in accordance with some aspects of the disclosure.

FIG. 16 illustrates a non-Random Access-based BxP handoff call flow with UT measurements and measurement reporting. A typical use-case is an intra-satellite BxP handoff. The call flow is between a UT 1602, a source BxP 1604, a target BxP 1606, a source AxP 1608, and a GN 1610.

A description of the steps in the non-Random Access-based BxP handoff call flow with UT measurements and measurement reporting follows. Initial packet data flow is represented by lines 1612, 1614, and 1616.

A Radio Connection Reconfiguration message sent to the UT 1602 while the UT 1602 is served by a given source cell may instruct the UT 1602 when to conduct measurements for the next target cell. Thus, at point 1617, while in the previous cell, the source A×P 1608 may configure the UT 1602 with measurement gap information (e.g., a gap pattern) corresponding to a measurement time. The source A×P 1608 may send this information because satellite pointing error may require satellite handoff to occur at the ideal handoff time +/−Δ, thereby necessitating measurements by the UT 1602. At steps 1A and 1B, the source A×P 1608 sends a Radio Connection Reconfiguration message to the UT 1602. The message includes measurement gap configuration information and measurement activation/deactivation time (in addition to handoff activation time and other IEs described herein). At step 3, the UT 1602 measures the signal strength of the target cell according to the measurement gap configuration information that it received from the source A×P 1608. Packet data flow continues as represented by lines 1618, 1620, and 1622.

At steps 4A and 4B, the UT 1602 sends a Measurement Report to the source A×P 1608 indicating the signal strength (e.g., RSRP) of both the source cell and target cell using event-based reporting of the signal strength. The source A×P 1608 configures the UT 1602 to use an Event 1 (source cell becomes better than a threshold) as the criteria to trigger a measurement report. The source A×P 1608 sets the threshold low enough so that the signal strength of the source cell is always greater than the threshold, thereby triggering the UT 1602 to send a measurement report to the source A×P 1608. Similarly, the source A×P 1608 configures the UT 1602 to use an Event 4 (target cell becomes better than a threshold) as the criteria to trigger a measurement report. The source A×P 1608 sets the threshold low enough so that the signal strength of the target cell is always greater than the threshold, thereby triggering the UT 1602 to send a measurement report to the source A×P 1608. Other reporting criteria can also be used.

At step 5, based upon the UT measurement report (see Step 4), the source A×P 1608 calculates a new handoff activation time (e.g., THO_recalc) and pre-configures the target B×P 1606 for handoff before the new handoff activation time (e.g., before THO_recalc). For example, based on satellite ephemeris information, beam patterns, and the UT measurement report, the source A×P 1608 may prepare for B×P handoff to occur at the ideal handoff time +/−Δ. At steps 6A and 6B, the source A×P 1608 sends a Radio Connection Reconfiguration message to the UT 1602. The contents of the message are described herein, including the new handoff activation time. Optionally, the message may also contain measurement gap configuration information and measurement activation/deactivation time. The message is sent to the UT 1602 sufficiently in advance of the new handoff activation time so that the UT 1602 has adequate time to receive the message. The UT 1602 starts timer T-4. If T-4 expires (e.g., a handoff failure occurs), then the UT 1602 performs the Radio Connection Re-establishment procedure. Also, if the source A×P 1608 does not receive the measurement report from the UT 1602 in a timely manner, then the source A×P 1608 uses the old handoff activation time (e.g., THO_a_priori) when configuring both the target B×P 1606 and the UT 1602 for handoff.

Based upon the single row of the satellite and cell transition table contained in the Radio Connection Reconfiguration message in Step 6, both the UT 1602 and source A×P 1608 simultaneously prepare for B×P handoff at the new handoff activation time (e.g., THO_recalc).

At step 7, the UT 1602 resets the MAC state. The UT 1602 acquires the new cell (e.g., FL synchronization).

At step 8A, after the handoff activation+Inter-Cell Tuneaway time, the target B×P 1606 sends to the UT 1602 an RL grant+CQI request. The RL grant is addressed to the UT-ID that the source A×P 1608 assigned to the UT 1602 in the Radio Connection Reconfiguration message (see Step 3).

Upon receiving the RL grant from the target B×P 1606, the UT 1602 stops timer T-4 (e.g., the handoff is successful) and sends a CQI report (step 8A) and Radio Connection Reconfiguration Complete message to the target B×P 1606/source A×P 1608 (steps 9A and 9B). The Radio Connection Reconfiguration Complete message contains no IEs and is integrity protected and encrypted with the old keys (e.g., Kint and Kenc, respectively). Final packet data flow is represented by lines 1624, 1626, and 1628.

B×P Handoff—Random Access

FIG. 17 illustrates a Random Access-based B×P handoff call flow without UT measurements and measurement reporting. A typical use-case is an inter-satellite B×P handoff. The call flow is between a UT 1702, a source B×P 1704, a target B×P 1706, a source A×P 1708, and a GN 1710.

A description of the steps in the Random Access-based B×P handoff call flow without UT measurements and measurement reporting follows. Initial packet data flow is represented by lines 1712, 1714, and 1716.

At steps 1A and 1B, the source A×P 1708 pre-configures the target B×P 1706 for handoff before the handoff activation time (e.g., before THO_a_priori). The source A×P 1708 sends a Radio Connection Reconfiguration message to the UT 1702. The contents of the message are described herein. The message is sent to the UT 1702 sufficiently in advance of the handoff activation time so that the UT 1702 has adequate time to receive the message. The UT 1702 starts timer T-4. If T-4 expires (e.g., a handoff failure occurs), then the UT 1702 performs the Radio Connection Re-establishment procedure.

At step 2, based upon the single row of the satellite and cell transition table contained in the Radio Connection Reconfiguration message in Step 1, both the UT 1702 and the source A×P 1708 simultaneously prepare for B×P handoff at the handoff activation time (e.g., at THO_a_priori). These operations may be similar to the corresponding operations discussed above in conjunction with FIG. 15.

At step 3, the UT 1702 resets the MAC state. The UT 1702 acquires the new cell (e.g., FL synchronization). As represented by bracket 1718, if step 1 does not include an RA procedure order, steps 4-7 are not required.

After the handoff activation+Inter-Satellite Tune-away time, the target B×P 1706 sends a FL control channel (FLCC) order to the UT 1702 containing a dedicated preamble signature in order to trigger the UT 1702 to perform a non-contention based Random Access procedure. This enables the UT 1702 to subsequently achieve RL synchronization.

At step 4, the UT 1702 sends a non-contention based Random Access Preamble on the Random Access to the target B×P 1706. Upon receiving the non-contention based Random Access Preamble from the UT 1702, the target B×P 1706 validates the received signature sequence.

At step 5, the target B×P 1706 sends a Random Access Response to the UT 1702 that is addressed to the appropriate group of UTs (e.g., RA-RNTI). The Random Access Response contains the paging area (PA), RL grant (which includes a CQI request), and temporary UT-ID.

If a dedicated preamble signature is used, the RL grant may include a CQI request. In this case, the process may skip from point 1720 to step 8B. Otherwise, the operations of block 1722, including steps 6 and 7, and the operations of step 8A may be performed.

Upon receiving the RL grant+CQI request from the target B×P 1706 (e.g., in step 8A), the UT 1702 stops timer T-4 (e.g., the handoff is successful) and sends a CQI report (step 8B) to the target B×P 1706. If a dedicated preamble signature is used, the UT 1702 also sends a Radio Connection Reconfiguration Complete message to the target B×P 1706 (step 9A) for forwarding to the source A×P 1708 (step 9B). The Radio Connection Reconfiguration Complete message contains no IEs and is integrity protected and encrypted with the old keys (e.g., Kint and Kenc, respectively). Final packet data flow is represented by lines 1724, 1726, and 1728.

Figure 18:
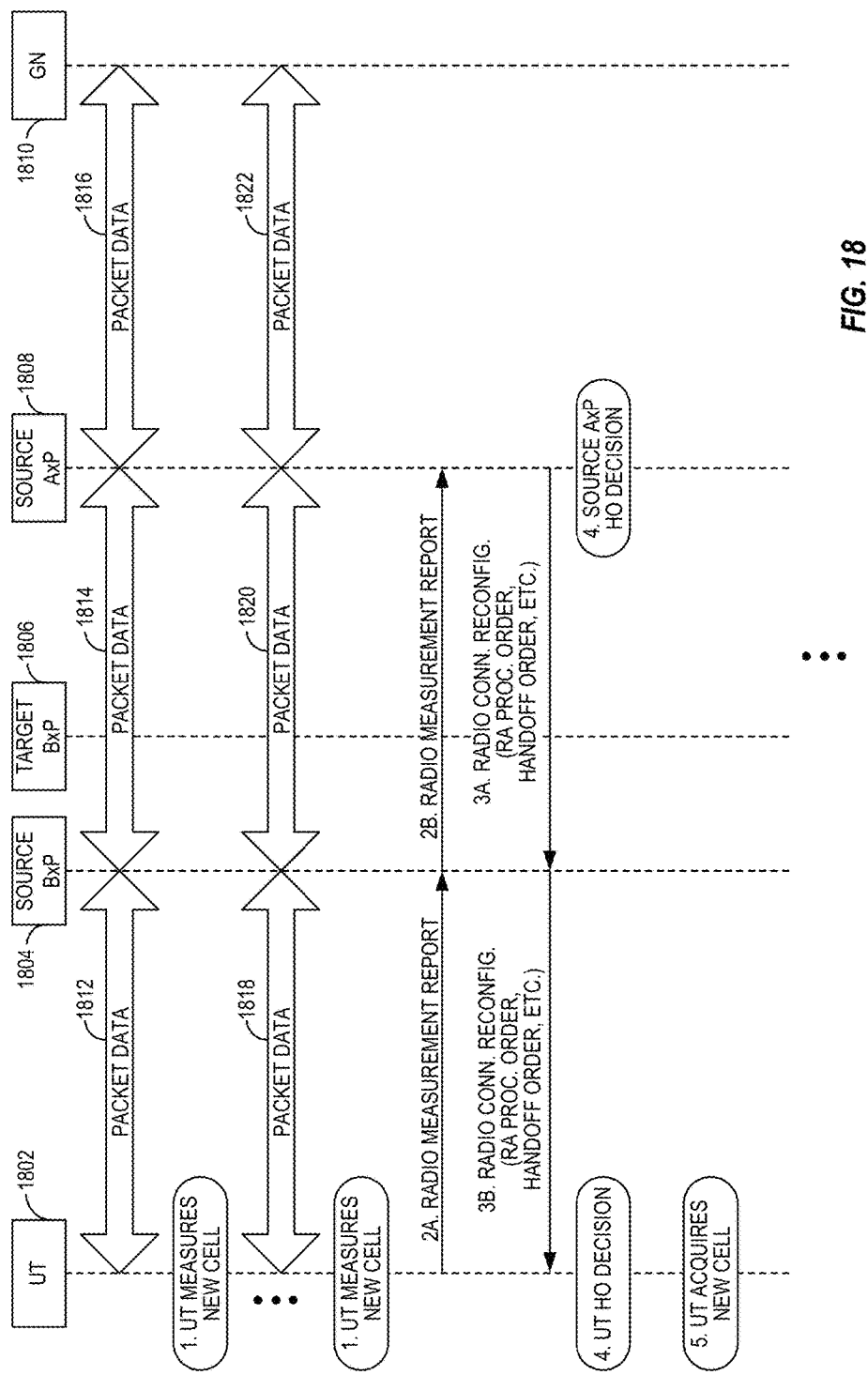
FIGS. 18 and 19 are diagrams illustrating an example of a call flow for a random access-based B×P handoff with UT measurements in accordance with some aspects of the disclosure.
Figure 19:
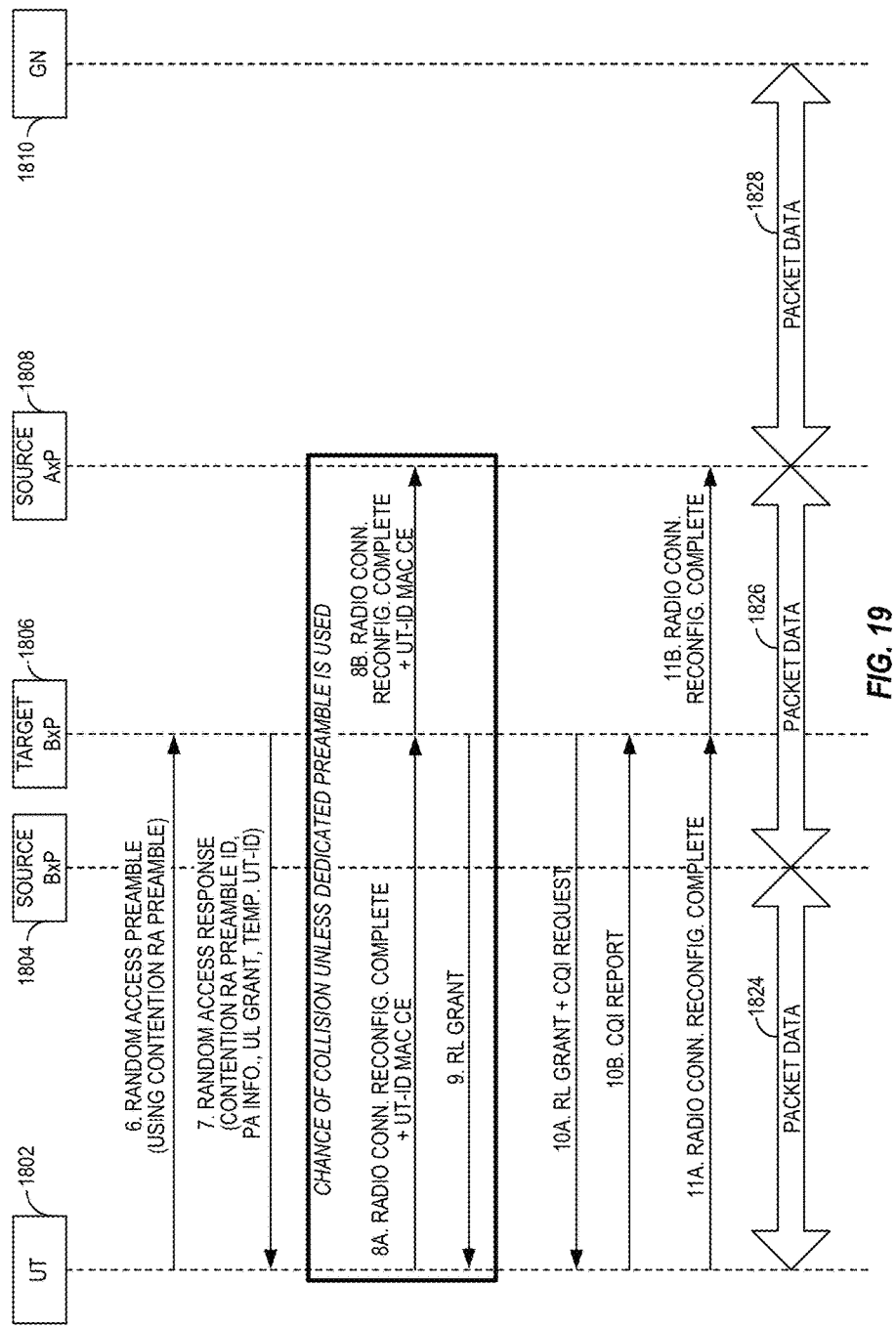

FIGS. 18 and 19 illustrate a random access-based B×P handoff call flow with UT measurements and measurement reporting. A typical use-case is an inter-satellite B×P handoff. The call flow is between a UT 1802, a source B×P 1804, a target B×P 1806, a source A×P 1808, and a GN 1810.

A description of the steps in the Random Access-based B×P handoff with UT measurements and measurement reporting follows. Initial packet data flow is represented by lines 1812, 1814, and 1816.

Referring initially to FIG. 18, while in the previous cell, the UT 1802 was configured by the source A×P 1808 in a Radio Connection Reconfiguration message with measurement gap configuration information and measurement activation/deactivation time (in addition to handoff activation time and other IEs described herein). At step 1, the UT 1802 measures the signal strength of the target cell according to the measurement gap configuration information that it received from the source A×P 1808. Packet data flow continues as represented by lines 1818, 1820, and 1822.

At step 2, the UT 1802 sends a Measurement Report to the source A×P 1808 indicating that the signal strength (e.g., RSRP) of both the source cell and target cell using event-based reporting of the signal strength. The source A×P 1808 configures the UT 1802 to use an Event 1 (source cell becomes better than a threshold) as the criteria to trigger a measurement report. The source A×P 1808 sets the threshold low enough so that the signal strength of the source cell is always greater than the threshold, thereby trigger the UT 1802 to send a measurement report to the source A×P 1808. Similarly, the source A×P 1808 configures the UT 1802 to use an Event 4 (target cell becomes better than a threshold) as the criteria to trigger a measurement report. The source A×P 1808 sets the threshold low enough so that the signal strength of the target cell is always greater than the threshold, thereby triggering the UT 1802 to send a measurement report to the source A×P 1808. Other reporting criteria can also be used.

Based upon the UT measurement report (see Step 2), the source A×P 1808 calculates a new handoff activation time (e.g., THO_recalc) and pre-configures the target B×P 1806 for handoff before the new handoff activation time (e.g., before THO_recalc).

The operations of steps 3-11 correspond to steps 1-9 of FIG. 17. Thus, these operations will be discussed briefly. At step 3, the source A×P 1808 sends a Radio Connection Reconfiguration message to the UT 1802. The contents of the message are described herein, including the handoff activation time. Optionally, the message may also contain measurement gap configuration information and measurement activation/deactivation time. The message is sent to the UT 1802 sufficiently in advance of the handoff activation time so that the UT 1802 has adequate time to receive the message. The UT 1802 starts timer T-4. If T-4 expires (e.g., a handoff failure occurs), then the UT 1802 performs the Radio Connection Re-establishment procedure. Also, if the source A×P 1808 does not receive the measurement report from the UT 1802 in a timely manner, then the source A×P 1808 uses the old handoff activation time (e.g., THO_a_priori) when configuring both the target B×P 1806 and UT 1802 for handoff.

At step 4, based upon the single row of the satellite and cell transition table contained in the Radio Connection Reconfiguration message in Step 3, both the UT 1802 and the source A×P 1808 simultaneously prepare for B×P handoff at the new handoff activation time (e.g., THO_recalc).

At step 5, the UT 1802 resets the MAC state. The UT 1802 acquires the new cell (e.g., FL synchronization).

Referring to FIG. 19, after the handoff activation+Inter-Cell Tune-away time, the target B×P 1806 sends an FLCC order to the UT 1802 containing a dedicated preamble signature in order to trigger the UT 1802 to perform a non-contention based Random Access procedure. This enables the UT 1802 to subsequently achieve RL synchronization.

At step 6, the UT 1802 sends a non-contention based Random Access Preamble on the Random Access to the target B×P 1806. Upon receiving the non-contention based Random Access Preamble from the UT 1802, the target B×P 1806 validates the received signature sequence.

At step 7, the target B×P 1806 sends a Random Access Response to the UT 1802 that is addressed to the appropriate RA-RNTI. The Random Access Response contains the paging area, RL grant (which includes a CQI request), and temporary UT-ID.

Upon receiving the RL grant+CQI request from the target B×P 1806 (step 10A), the UT 1802 stops timer T-4 (e.g., the handoff is successful) and sends a CQI report to the target B×P 1806 (step 10B) and a Radio Connection Reconfiguration Complete message to the target B×P 1806/source A×P 1808 (step 11). The Radio Connection Reconfiguration Complete message contains no IEs and is integrity protected and encrypted with the old keys (e.g., Kint and Kenc, respectively). Final packet data flow is represented by lines 1824, 1826, and 1828.

B×P Handoff—Failover

In an intra-GN, GN antenna failover, an antenna assembly serving the satellite has failed. This case, one of two scenarios are possible. In a first scenario, the UT experiences a brief interruption in connectivity and data service which is managed by the GN as a part of normal operation (e.g., scheduling of FL and RL resources for the UT by the GN, HARQ retransmissions and ARQ retransmissions). In a second scenario, the UT experiences a loss of FL synchronization or there is a significant interruption in connectivity and data service which results in a radio link failure (RLF).

A×P Handoff

Inter-A×P handoffs may be performed for load-balancing purposes or for non-stationary UTs that require an inter-A×P handoff due to a change in the UT's location resulting in a crossing of an Administrative Region boundary. An A×P handoff procedure comprises three distinct phases: A×P handoff preparation, A×P handoff execution, and A×P handoff completion.

The following procedures may be used for A×P Handoff Preparation.

For Radio Control (RC) acknowledged mobile (AM) data bearers, if direct forwarding of data applies, then tunnels may be established per RL-AM data bearer (one way from source A×P to target A×P) for both forward link and reverse link data forwarding. Conversely, if indirect forwarding of data applies, then tunnels may be established per RL-AM data bearer (one way from source A×P to target A×P via the GN) for both forward link and reverse link data forwarding.

For RC unacknowledged mobile (UM) data bearers, if direct forwarding of data applies, then tunnels may be established per RL-UM data bearer (one way from source A×P to target A×P) for forward link data forwarding only. Reverse link data is not forwarded from source A×P to target A×P but instead is sent by the source A×P to the GN. Conversely, if indirect forwarding of data applies, then tunnels may be established per RL-UM data bearer (one way from source A×P to target A×P) for forward link data forwarding only. Reverse link data is not forwarded from source A×P to target A×P but instead is sent by the source A×P to the GN.

The following procedures may be used for A×P Handoff Execution.

For RL-AM data bearers, the reverse link forwarded data contains sequence numbers (SNs). The forward link forwarded data may contain SNs or may not if the forward link data is received from the GN without having been assigned a SN by the source A×P yet. The source A×P sends both forward link and reverse link SN and frame number (FN) information to the target A×P. The MAC and RL states are reset.

For RL-UM data bearers, the forward link forwarded data may contain SNs or may not if the forward link data is received from the GN without having been assigned a SN by the source A×P yet. If the forward link forwarded data contains a SN, then the target A×P should send this data to the UT first (after resetting both the SN and FN). The state is reset (e.g., the forward link and reverse link SN and FN are reset). The MAC and RL states are reset.

The following procedures may be used for Handoff Completion.

For RL-AM data bearers, the UT may send a list of missing/received forward link protocol data units (PDUs) to the target A×P and the target A×P may send a list of missing/received reverse link PDUs to the UT. For both RL-AM and RL-UM data bearers, the forward link tunnels per data bearer are switched from the source A×P to the target A×P and UT resources are released at the source AP.

Figure 20:
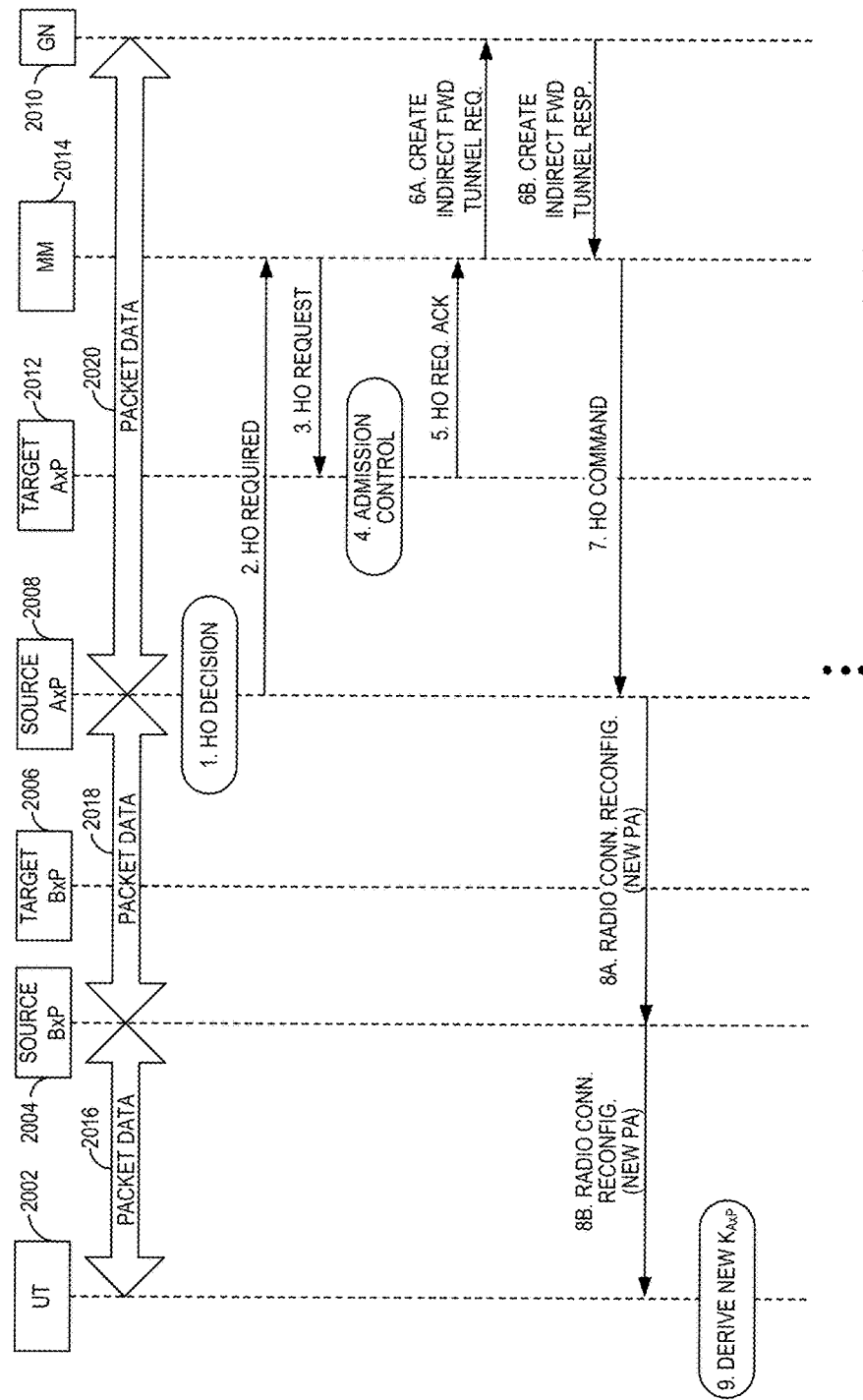
FIGS. 20, 21, and 22 are diagrams illustrating an example of a call flow for an A×P handoff in accordance with some aspects of the disclosure.
Figure 21:
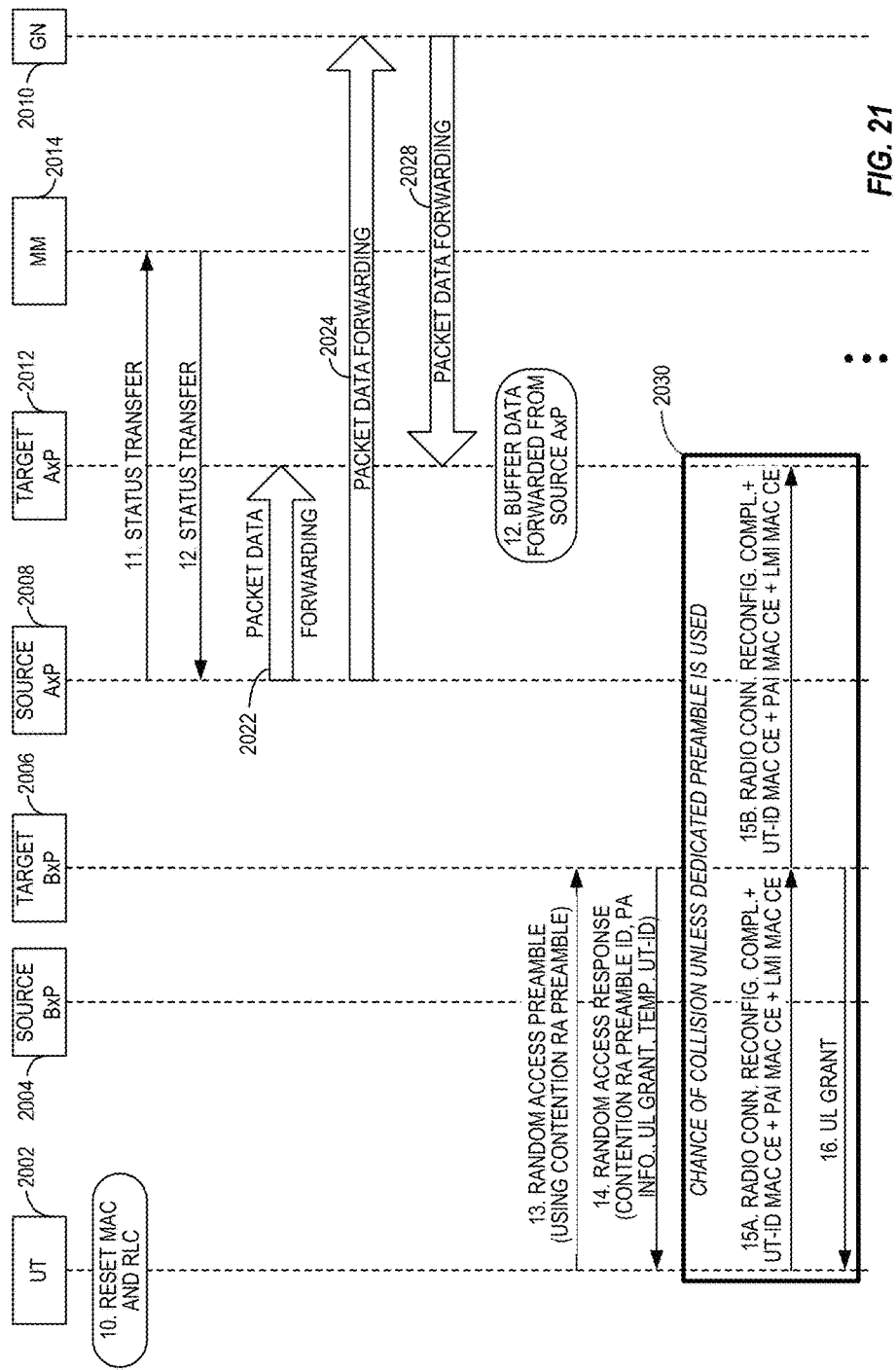
Figure 22:
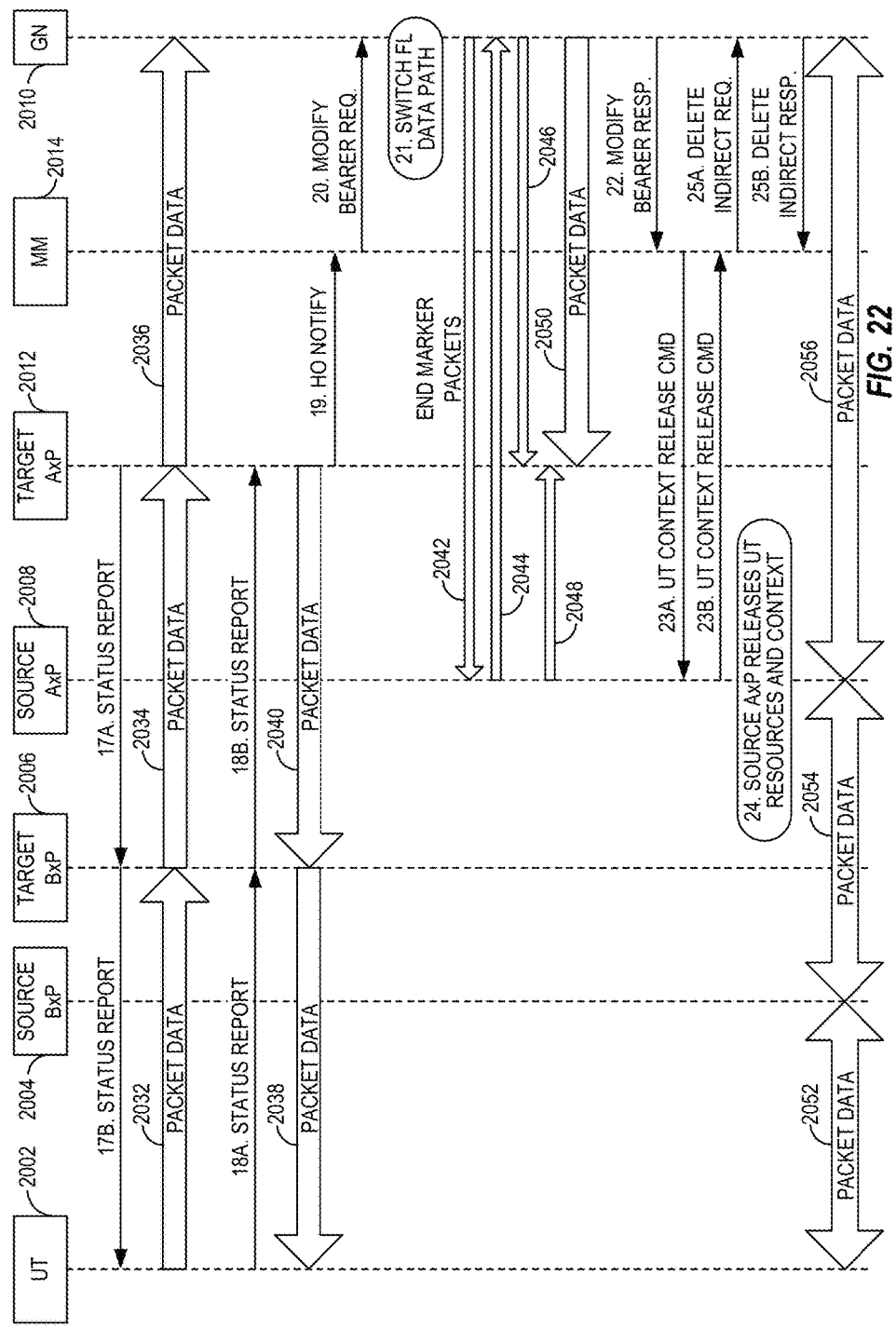

FIGS. 20-22 illustrate an A×P handoff call flow without mobility management (MM) relocation and without GN relocation. FIG. 20 depicts handoff preparation. FIG. 21 depicts handoff execution. FIG. 22 depicts handoff completion. A description of the steps in the A×P handoff call flow follows.

Referring initially to FIG. 18, the call flow is between a UT 2002, a source B×P 2004, a target B×P 2006, a source A×P 2008, a target A×P 2012, mobility management (MM) 2014 (e.g., a MM component), and a GN 2010. Initial packet data flow is represented by lines 2016, 2018, and 2020.

At step 1, the source A×P 2008 makes a decision to hand over the UT 2002 to a target cell and a target A×P 2012 based on the satellite ephemeris information and beam patterns.

At step 2, the source A×P 2008 sends a Handoff Required message to the MM 2014 in order to request the preparation of resources at the target A×P 2012. The message contains the paging area identifier (PAI) of the target A×P 2012 (so that the MM 2014 can determine to which target A×P 2012 it should send the Handoff Request message in step 3), whether or not a direct data forwarding path is available (e.g., via an appropriate interface), and a source-to-target transparent container (passed transparently through the MM 2014) that carries a Handoff Preparation Information message which comprises the following: the UT's radio resource configuration in the source A×P 2008, the UT's security configuration in the source A×P 2008, target cell ID (e.g., target B×P ID indicating the beam to be prepared), and radio bearer information (including whether or not the source A×P 2008 proposes to do forward link data forwarding).

In step 3, the MM 2014 sends a Handoff Request message to the target A×P 2012 in order to request the preparation of resources at the target A×P 2012. The message contains the source-to-target transparent container carried in the Handoff Required message (see Step 2), a list of data bearers to be set up (e.g., quality of service (QoS) information, GN tunneling protocol (TP) addressing information per data bearer), and security context information (e.g., one pair of NH, NCC for 1-hop security during the target A×P's derivation of new security keys for user plane traffic and radio signaling).

At step 4, upon receiving the Handoff Request message from the MM 2014, the target A×P 2012 decides that it can establish the UE context.

At step 5, the target A×P 2012 sends a Handoff Request Acknowledge message to the MM 2014 to inform the MM 2014 about the prepared resources at the target A×P 2012. The message contains a target-to-source transparent container (passed transparently through the MM 2014) that carries a Handoff Command message to be used by the source A×P 2008 when constructing the Radio Connection Reconfiguration message (see step 8). The Handoff Request Acknowledge message also contains a list of data bearers to be setup, which includes the target A×P downlink TP addressing information on a designated interface per data bearer (e.g., for data sent directly to the target A×P 2012 from the GN 2010, not via the source A×P 2008). The Handoff Request message may also include additional target A×P 2012 forward link TP addressing information per data bearer (if the source A×P 2008 proposed to do forward link data forwarding for a data bearer and the target A×P 2012 accepts the proposal) and target A×P reverse link TP addressing information per data bearer (if the target A×P 2012 requests the source A×P 2008 to do reverse link data forwarding for an RL-AM data bearer).

At step 6, if indirect forwarding of data applies (e.g., via the designated interface), the MM 2014 sends a Create Indirect Data Forwarding Tunnel Request message to the GN 2010. The message contains a list of data bearers which includes the following information per data bearer: data bearer ID, the target A×P's tunnel ID and IP address for the indirect forwarding of forward link data on a designated interface, and the target A×P's tunnel ID and IP address for the indirect forwarding of reverse link data on the designated interface, as applicable. Subsequently, the GN 2010 sends a Create Indirect Data Forwarding Tunnel Response message to the MM 2014. The message contains the following information per data bearer: data bearer ID, the GN's tunnel ID and IP address for the indirect forwarding of forward link data on the designated interface, and the GN's tunnel ID and IP address for the indirect forwarding of reverse link data on the designated interface, as applicable.

At step 7, the MM 2014 sends a Handoff Command message to the source A×P 2008 to inform the source A×P 2008 that resources for the handoff have been prepared at the target A×P 2012. The message contains the target-to-source transparent container carried in the Handoff Request Acknowledge message (see Step 5) to be used by the source A×P 2008 when constructing the Radio Connection Reconfiguration message (see Step 8). The Handoff Command message also contains a list of data bearers to be set up. If direct forwarding of data applies (e.g., via an appropriate interface), the message may contain the target A×P forward link TP addressing information per data bearer (if the source AxP 2008 proposed to do forward link data forwarding for a data bearer and the target AxP 2012 accepts the proposal), and target AxP reverse link TP addressing information per data bearer (if the target AxP 2012 requests the source AxP 2008 to do reverse link data forwarding for an RL-AM data bearer). If indirect forwarding of data applies (e.g., via the designated interface), the message may contain the GN forward link TP addressing information per data bearer (if the source AxP 2008 proposed to do forward link data forwarding for a data bearer and the target AxP 2012 accepts the proposal), and GN reverse link TP addressing information per data bearer (if the target AxP 2012 requests the source AxP 2008 to do reverse link data forwarding for an RL-AM data bearer). See Step 6. Also, the message contains a new satellite and cell transition table. Upon receiving the Handoff Command message, the source AxP 2008 freezes the transmitter/receiver status for the UT's data bearers.

At step 8, the source AxP 2008 sends a Radio Connection Reconfiguration message to the UT 2002. The message contains a new UT-ID, the PCI and frequency for the target BxP 2006, security information, radio resource common and dedicated configuration information as needed (e.g., Random Access information, CQI reporting information), and target data bearer configuration information (if there are any changes from the current configuration). The message also contains a new paging area identifier that uniquely identifies the target AxP 2012. Upon receiving the Radio Connection Reconfiguration message from the source AxP 2008, the UE starts timer T-4. If T-4 expires (e.g., a handoff failure occurs), then the UT 2002 performs the Radio Connection Re-establishment procedure.

At step 9, the UT 2002 derives the new KAxP, KUPenc, Kint, and Kenc to be used when the UT 2002 performs the handoff to the target AxP 2012.

Referring to FIG. 21, for RL-AM data bearers, the UT 2002 resets the MAC and RL states (step 10). For RL-UM data bearers, the UT 2002 resets the MAC, RL, and states. The UT 2002 subsequently acquires the new cell (e.g., FL synchronization).

At steps 11 and 12, the source AxP 2008 sends a UT Status Transfer message to the target AxP 2012 via the MM 2014. The source AxP 2008 sends this message to the target AxP 2012 only if at least one data bearer is configured for RL-AM operation. The message contains the following information per RL-AM data bearer: reverse link SN and FN receiver status, forward link SN and FN transmitter status, and (optionally) the receive status of reverse link service data units (SDUs) (if the target AxP 2012 requested the source AxP 2008 to do reverse link data forwarding for an RL-AM data bearer and the source AxP 2008 accepted the request). Also, for RL-AM and RL-UM data bearers, the source AxP 2008 begins to forward in order forward link data (stored in the source AxP 2008 data bearer buffers) to the target AxP 2012. For RL-AM data bearers, this includes all forward link SDUs with their SN for which successful delivery of the corresponding PDU was not confirmed by the UT 2002 (e.g., via RL Status PDU). For RL-AM and RL-UM data bearers, this also includes new forward link data arriving on the designated interface from the GN 2010. For RL-AM data bearers for which reverse link data forwarding applies, the source AxP 2008 begins to forward reverse link SDUs with their SN that have been received out-of-sequence to the target AxP 2012. For RL-AM data bearers for which reverse link data forwarding does not apply, the source AxP 2008 discards reverse link SDUs that have been received out-of-sequence. For RL-UM data bearers, the source AxP 2008 sends reverse link SDUs that have been received out-of-sequence to the GN 2010 via the designated interface. Note: If direct forwarding of data applies, the source AxP 2008 forwards data to the target AxP 2012 on an appropriate interface.

If indirect forwarding of data applies, the source AxP 2008 forwards data 2022 to the target AxP 2012 on the designated interface via the GN 2010. The forwarded data is stored in the target AxP data bearer buffers (step 12).

At step 12, the UT 2002 sends a contention-based Random Access Preamble on the Random Access to the target BxP 2006 (where the source BxP 2004 and the target BxP 2006 may be the same entity). Upon receiving the Random Access Preamble from the UT 2002, the target BxP 2006 validates the received signature sequence. If a dedicated preamble signature is available in the target BxP 2006 and the UT 2002 is assigned a dedicated preamble signature in Step 8, then the UT 2002 sends a contention-free Random Access Preamble on the Random Access to the target BxP 2006 and, consequently, there is no chance of a collision.

At step 14, the target BxP 2006 sends a Random Access Response to the UT 2002 that is addressed to the appropriate RA-RNTI. The Random Access Response contains the paging area, RL grant, and temporary UT-ID.

In the operations of block 2030, the UT 2002 sends a Radio Connection Reconfiguration Complete message to the target AxP 2012 (step 15). The message contains no IEs. The Radio Connection Reconfiguration Complete message is integrity protected and encrypted with the new Kint and Kenc, respectively, and sent in conjunction with a UT-ID MAC control element (CE) and two new MAC control elements: a PAI MAC control element and a location management information (LMI) MAC control element. The UT-ID MAC control element contains the UT-ID assigned to the UT 2002 by the target AxP 2012 in the Radio Connection Reconfiguration message (see Step 8). The PAI MAC control element contains the PAI assigned to the UT 2002 by the target AxP 2012 in Step 8. The LMI MAC control element contains the UT's latest location information. The target BxP 2006 parses the PAI MAC control element in order to determine to which AxP it should forward the Radio Connection Reconfiguration Complete message. The target BxP 2006 may send a Handoff Notify message to the MM 2014 at this time (e.g., instead of at step 19). The UT 2002 starts the Contention Resolution Timer.

At step 16, the target BxP 2006 sends to the UT 2002 an RL grant for a new transmission. The RL grant is addressed to the UT-ID that the target AxP 2012 assigned to the UT 2002 in the Radio Connection Reconfiguration message (see Step 8). Upon receiving the RL grant from the target BxP 2006, the UT 2002 stops the Contention Resolution Timer and timer T-4. The UT 2002 may begin to send reverse link signaling on signaling radio bearers (e.g., SRB1 and SRB2) and reverse link data on all data radio bearers (DRBs). The UT 2002 may also begin to receive forward link signaling on SRB1 and SRB2 and forward link forwarded data on all DRBs.

Referring now to FIG. 22, for RL-AM data bearers for which reverse link data forwarding applies, the target AxP 2012 sends a Status Report message to the UT 2002 containing a list of missing and received reverse link PDUs (step 17). The target AxP 2012 uses the information in the UT Status Transfer message from the source AxP 2008 via the MM 2014 (see Step 11) to construct the Status Report. Upon receiving the Status Report message from the target AxP 2012, the UT 2002 does not perform retransmission of any PDU whose successful delivery is confirmed by the Status Report message. After the reverse link PDU retransmissions have been successfully completed, the UT 2002 begins to send new RL-AM reverse link PDUs to the target A×P 2012. Since the reverse link SN is maintained on an RL-AM data bearer basis, the target A×P 2012 uses a windows-based mechanism for in-sequence delivery and duplication avoidance. For RL-UM data bearers, the UT 2002 begins to send new RL-UM reverse link PDUs to the target A×P 2012. The above packet data flow is represented by the arrows 2032, 2034, and 2036.

For all RL-AM data bearers for which the source A×P 2008 has configured the UT 2002 to send a Status Report on the reverse link during re-establishment, the UT 2002 sends a Status Report message to the target A×P 2012 containing a list of missing and received forward link PDUs (step 18). Upon receiving this message, the target A×P 2012 begins to send forward link PDUs to the UE that have been forwarded to the target A×P 2012 by the source A×P 2008 with and without their SNs. This packet data flow is represented by the arrows 2038 and 2040. The target A×P 2012 continues to do this until it receives one or more TP End Marker packets from the source A×P 2008 for that RL-AM data bearer. The target A×P 2012 does not perform retransmission of any PDU whose successful delivery is confirmed by the Status Report message from the UT 2002. Since the forward link SN is maintained on an RL-AM data bearer basis, the UT 2002 uses a windows-based mechanism for in-sequence delivery and duplication avoidance. For RL-UM data bearers, the target A×P 2012 begins to send forward link PDUs to the UT 2002 that have been forwarded to the target A×P 2012 by the source A×P 2008 (without continuing their original SNs because the SN is not maintained on an RL-UM data bearer basis). The target A×P 2012 continues to do this until it receives one or more TP End Marker packets from the source A×P 2008 for each RL-UM data bearer.

Step 19 may occur immediately after Step 15. At step 19, the target A×P 2012 sends a Handoff Notify message to the MM 2014 to inform the MM 2014 that the UT 2002 has been identified in the target cell and the handoff has been completed. The message contains the PAI of the target A×P 2012 and the target cell ID (e.g., target B×P ID indicating the beam in which the UT 2002 has been identified).

At step 20, the MM 2014 sends a Modify Bearer Request message to the GN 2010. The message contains a list of data bearers which includes the follow information per data bearer: data bearer ID and the target A×P's tunnel ID and IP address for the forward link user plane (in order to uniquely identify the UT's data bearers).

At step 21, the GN 2010 switches the forward link data path from the source A×P 2008 to the target A×P 2012 and sends one or more TP End Marker packets 2042 per data bearer to the source A×P 2008. The GN 2010 also begins to send forward link data intended for the UT 2002 directly to the target A×P 2012 (arrows 2044 and 2046). The source A×P 2008 forwards the TP End Marker packet(s) per data bearer to the target A×P 2012. Upon receiving the TP End Marker packet(s) per data bearer from the source A×P 2008, the target A×P 2012 may begin to send forward link data received directly from the GN 2010 to the UT 2002. Note: If direct forwarding of data applies, the source A×P 2008 forwards the TP End Marker packet(s) 2048 to the target A×P 2012 on an appropriate interface. If indirect forwarding of data applies, the source A×P 2008 forwards data to the target A×P 2012 via the GN 2010 (arrow 2050).

At step 22, the GN 2010 sends a Modify Bearer Response message to the MM 2014. The message contains a list of data bearers which includes the following information per data bearer: data bearer ID and cause (e.g., request accepted).

At step 23A, the MM 2014 sends a UE Context Release Command message to the source A×P 2008 to request the release of the UT-associated S1-logical connection over the S1 interface. Subsequently, at step 23B, the source A×P 2008 sends a UE Context Release Command message to the MM 2014 to confirm the release of the UT-associated logical connection over the appropriate interface. At step 24, the source A×P 2008 releases the UT radio resources and context. At step 25, the indirect data forwarding tunnel request (from step 6) is deleted. Final packet data flow is represented by lines 2052, 2054, and 2056.

Use of Satellite and Cell Transition Table

In some implementations, an A×P may generate and/or update a satellite and cell transition table, as needed, using one or more of: UT location and/or speed, satellite location, satellite beam/cell patterns, satellite beam/cell turn on/off schedules, or satellite pointing error. The location and/or of a UT, if specified, may be sent by the UT via Radio signaling messages. The locations of a satellite over time may be obtained from the ephemeris data. For example, in a given satellite access network (SAN) that includes multiple GNs, the NOC/SOC in the SAN may provide the updated satellite ephemeris information to all A×Ps in the SAN.

In some implementations, the system provides to a UT a single row of the satellite and cell transition table (e.g., a row of Table 2 set forth above) to be used for connected mode handoffs. For example, the source A×P/B×P could include the single row of the satellite and cell transition table in an information element (IE) of a Radio Connection Reconfiguration message that is sent to the UT while the UT is still on the serving cell. Thus, while a UT is being served by one cell/beam, the UT may receive satellite and cell transition information that the UT is to use to transition to another cell/beam.

Configuration Messages at B×P Handoff

As mentioned above, each satellite beam may be regarded as a separate cell with its own data and control channels, and signals. When a UT is handing over from one to another cell, some of the radio configuration parameters that were valid for the source cell may change and need to be updated for UT operation on the target cell.

The radio message used for radio reconfiguration of the radio parameters for the serving cell is also used to deliver the updated configuration parameters for the target cell.

The A×P communicates the reconfiguration parameters for the target cell to the source cell (step 1 in FIG. 15, and also applicable to the Radio Connection Reconfiguration delivery in FIG. 16, FIG. 17, and FIG. 18). The reconfiguration message for the target cell is delivered to a UT by the source cell before the handoff occurs, as depicted in the step 1 in FIG. 15. The transmission of the message needs to be done sufficiently in advance of the handoff, so the UT has time to receive the message in a timely manner to allow for reliable transmission. Upon receiving the reconfiguration message for the target cell, the UT stores it and applies the reconfiguration once it starts the communication on the target cell.

The handoff is performed based on the handoff transition table (Table 3), and follows the procedures defined for B×P handoff. The new configuration is applied at the handoff time, so that the UT is appropriately configured for the new serving cell before the data and control exchange starts.

The Radio Reconfiguration message for the target beam may include the radio parameters that are UT specific (dedicated) and cell specific (common). Those can be the following: Dedicated, MAC configuration, Parameters related to discontinuous reception (DRX), Power headroom reporting (PHR), Buffer status reporting (BSR) scheduling request (SR), HARQ, SPS configuration, Parameters for semi-persistent scheduling (periodicity, resources), PHY configuration, Dedicated PHY parameters related to the power control of data and control channels, CQI reporting, sounding reference signal (SRS), and SR, Random Access configuration, UT-ID, PCI, Common Radio resource configuration, Common parameters for Random Access (such as preamble info, power control, supervision info), Physical Random Access (such as root sequence info and Physical Random Access configuration index), reference signal power and power control, RL reference signals, ACK/NACK and CQI mapping, SRS (such as bandwidth and sub-frame configuration), p-Max (used to limit UTs' RL transmission power in the cell). Note that since the UT-ID is provided to a UT for each serving cell, the 16 bit UT-ID may be sufficient to uniquely address the provisioned number of about 5000 UTs per cell.

Radio Link Failure

During normal operation, when a UT is handed-off from one satellite or cell/beam to another satellite or cell/beam, the signaling for the handoff is completed between the GN entity supporting the handoff and the UT. If the UT loses communication with the GN before the handoff signaling is completed, a radio link failure (RLF) may be declared (e.g., at the UT). RLF can occur in the system because of a UT losing connection to a cell for various possible reasons—for example, fading effects due to rain or snow, or due to blocking by a building or a tree. In this case, the UT may employ an RLF recovery mechanism to re-establish communication with the GN. The RLF procedure tries to re-connect the UT to the same source cell or to a different (e.g., target) cell.

Figure 23:
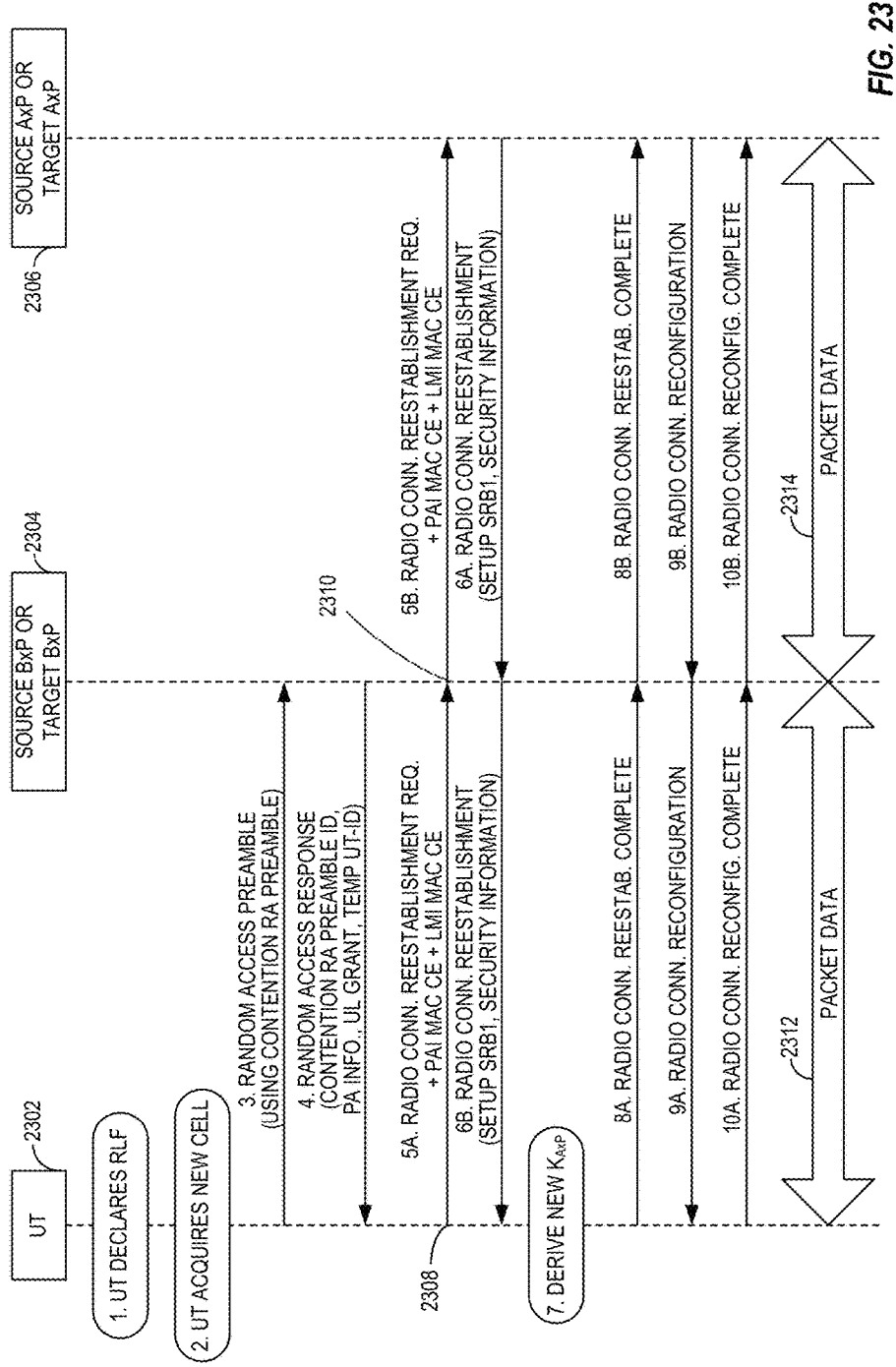
FIG. 23 is a diagram illustrating an example of a call flow for radio link failure in accordance with some aspects of the disclosure.

FIG. 23 illustrates an example of a call flow for an RLF procedure. The call flow is between a UT 2302, a source B×P a target B×P 2304, and a source A×P or a target A×P 2306. A description of the steps of the call flow follows.

At step 1, radio link detection procedures are used to detect RLF (e.g., problems with the radio link connection). This can be done either at the physical layer (example: if SNR is lower than a certain threshold), or at the MAC layer (example: if a certain number of packets are decoded in error), or at the RL layer (example: if maximum number of RL retransmissions has been reached for a message). The UT 2302 initiates a Radio Connection Re-establishment procedure by starting a target satellite and cell search and selection procedure.

After the UT 2302 acquires a suitable target satellite and cell (step 2), the UT 2302 sends a contention-based Random Access Preamble on the Random Access to the target B×P 2304 (step 3). Upon receiving the Random Access Preamble from the UT 2302, the target B×P 2304 validates the received signature sequence. The target B×P 2304 could be the same as the source B×P (e.g., the UT 2302 chooses the same cell that it was connected to before RLF occurred).

At step 4, the target B×P 2304 sends a Random Access Response to the UT 2302 that is addressed to the appropriate UT-ID. The Random Access Response contains the paging area, an RL grant, and a temporary UT-ID.

At step 5, the UT 2302 sends a Radio Connection Reestablishment Request message in conjunction with two new MAC control elements (PAI MAC control element and LMI MAC control element) to the appropriate target A×P 2306. The Radio Connection Reestablishment message contains the UT's old UT-ID, old PCI and a MAC-I for verification during the Radio Connection Re-establishment procedure. The PAI MAC control element contains the most recent PAI assigned to the UT 2302 by the source A×P. The PAI belongs to the target A×P if the handoff was in progress before RLF; otherwise, the PAI belongs to the source A×P. The LMI MAC control element contains the UT's latest location information. The target B×P 2304 parses the PAI MAC control element and LMI MAC control element to determine to which A×P it should forward the Radio Connection Reestablishment Request message. If the LMI MAC control element indicates an Administrative Region not handled by the A×P mapped to the PAI MAC control element, then the target B×P 2304 forwards the Radio Connection Reestablishment Request message to the appropriate target A×P (which will result in a Radio Connection Re-establishment procedure failure and cause the UT 2302 to initiate a NAS recover procedure (e.g., a Service Request procedure)). The UT 2302 starts timer T-3. If T-3 expires (e.g., the Radio Connection Re-establishment procedure fails), then the UT 2302 performs the NAS Service Request procedure.

At step 6, the target A×P 2306 sends a Radio Connection Reestablishment message in conjunction with a UE Contention Resolution Identity MAC control element (in order to provide contention resolution) to the UT 2302. The Radio Connection Reestablishment message contains security configuration information that is used by the UT 2302 to derive new control plane and user plane keys (see Step 7). The message may also contain SRB1 configuration information.

At step 7, the UT 2302 derives the new KA×P, KUPenc, Kint, and Kenc to be used with the re-established radio connection.

At step 8, the UT 2302 sends a Radio Connection Reestablishment Complete message to the target A×P 2306. The message contains no IEs and is integrity protected and encrypted with the new Kint and Kenc, respectively.

At step 9, the target A×P 2306 sends a Radio Connection Reconfiguration message to the UT 2302. The message contains SRB2 and DRB configuration information.

At step 10, the UT 2302 sends a Radio Connection Reconfiguration Complete message to the target A×P 2306. The message contains no IEs. Final packet data flow is represented by lines 2312 and 2314.

Example Operations

With the above in mind, additional examples of operations that may be performed by a UT and/or a GN in support of handoff of the UT will now be described with respect to FIGS. 24-38.

Figure 24:
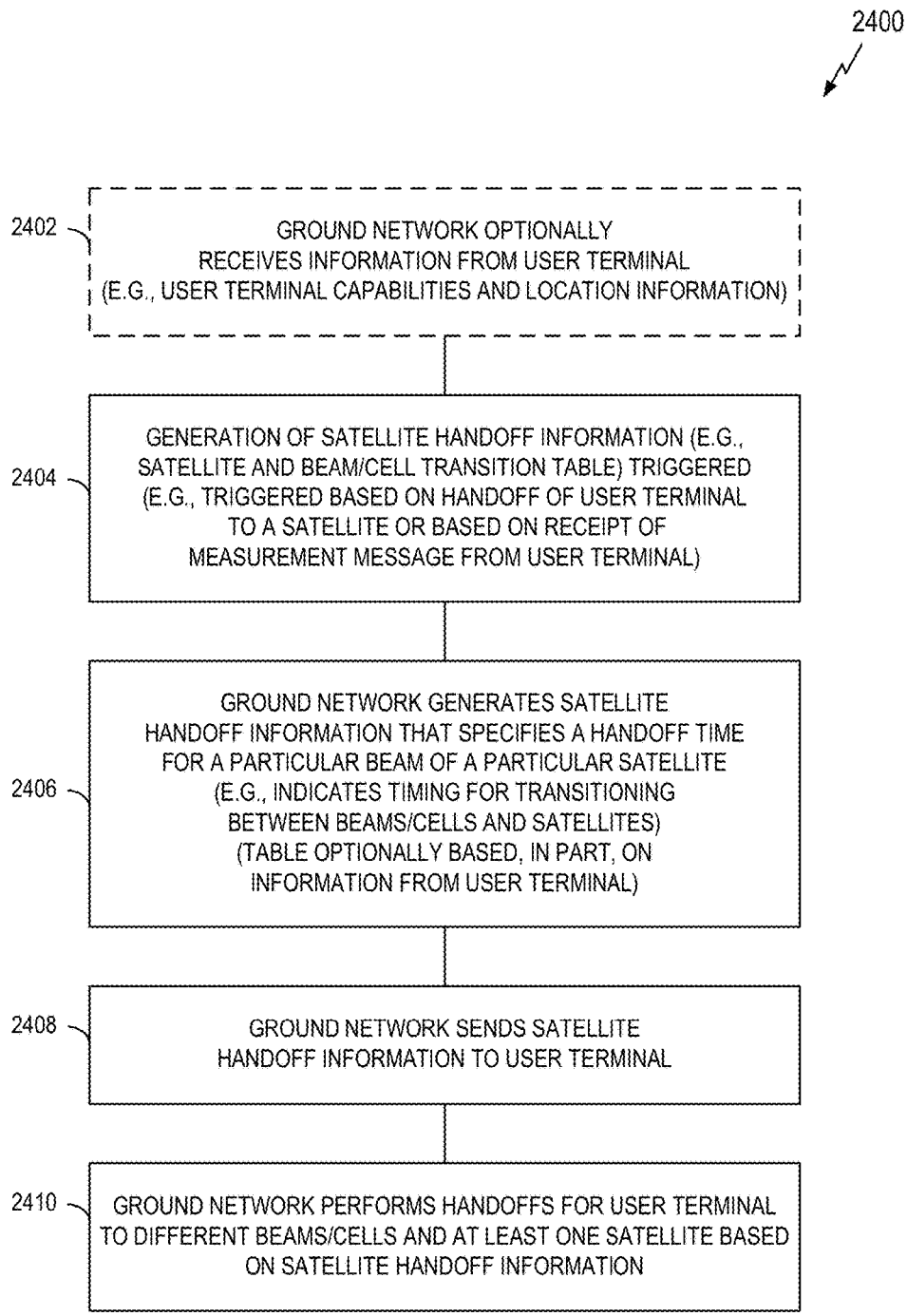
FIG. 24 is a diagram illustrating an example of generating and using a satellite and cell transition table in accordance with some aspects of the disclosure.

FIG. 24 is a diagram illustrating an example of a process 2400 for generating and using satellite handoff information in accordance with some aspects of the disclosure. The process 2400 may take place within a processing circuit which may be located in a GN or some other suitable apparatus (device). In some implementations, the process 2400 represents operations performed by the GN controller 250 of FIG. 2. In some implementations, the process 2400 represents operations performed by the apparatus 4600 of FIG. 46 (e.g., by the processing circuit 4610). Of course, in various aspects within the scope of the disclosure, the process 2400 may be implemented by any suitable apparatus capable of supporting communication-related operations.

At block 2402, a GN (or other suitable apparatus) optionally receives information from a user terminal. For example, the GN may receive user terminal capabilities and location information.

At block 2404, the generation of satellite handoff information is triggered at the GN (or other suitable apparatus).

This information may comprise some or all of a satellite and beam/cell transition table. For example, the generation of the table may be triggered based on handoff of a user terminal to a satellite or based on receipt of a measurement message from the user terminal.

At block 2406, the GN (or other suitable apparatus) generates satellite handoff information that specifies a handoff time for a particular beam of a particular satellite. For example, the information may be a table that indicates timing for transitioning between cells/beams and satellites. In some aspects, the table is optionally based, in part, on information received from the user terminal at block 2402.

At block 2408, the GN (or other suitable apparatus) sends the satellite handoff information to the user terminal.

At block 2410, the GN (or other suitable apparatus) performs handoffs for the user terminal to different cells/beams and at least one satellite based on the satellite handoff information.

Figure 25:
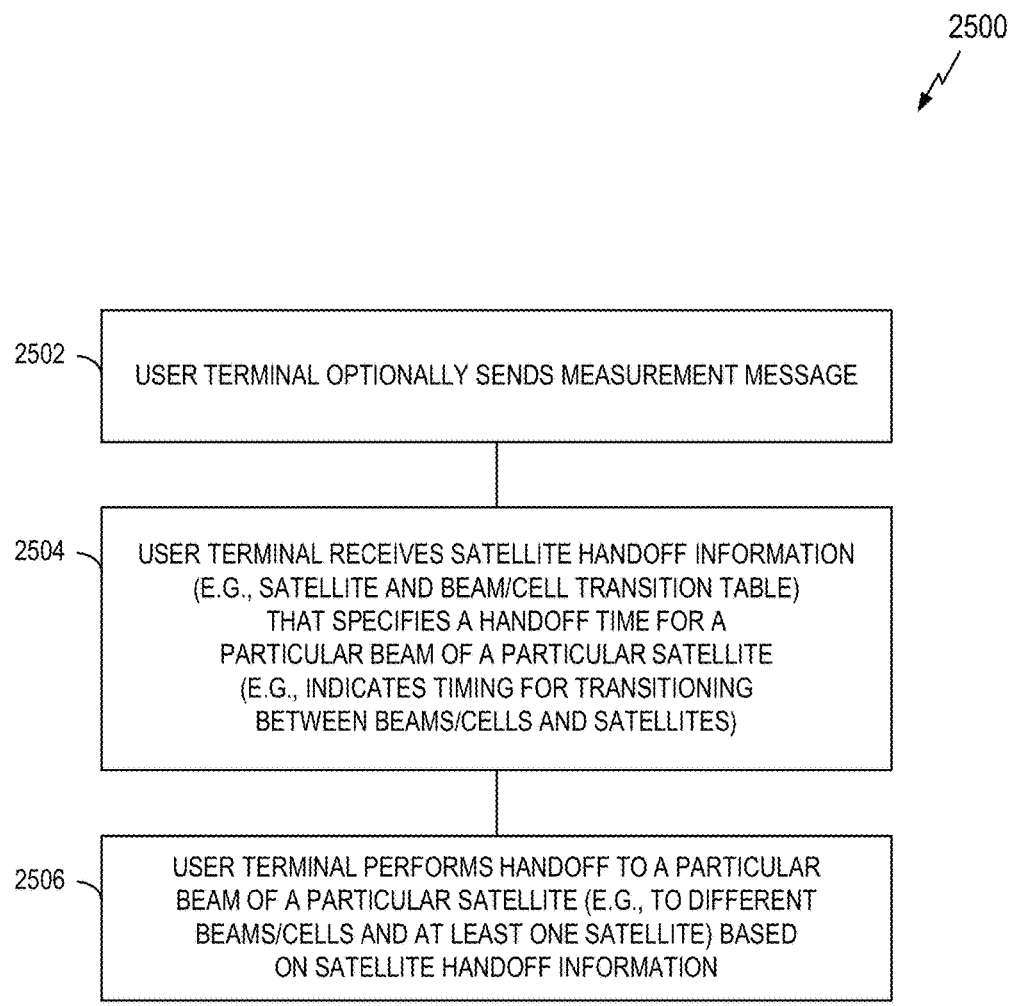
FIG. 25 is a diagram illustrating an example of using a satellite and cell transition table in accordance with some aspects of the disclosure.

FIG. 25 is a diagram illustrating an example of a process 2500 for using satellite handoff information in accordance with some aspects of the disclosure. The process 2500 may take place within a processing circuit which may be located in a user terminal or some other suitable apparatus (device). In some implementations, the process 2500 represents operations performed by the control processor 420 of FIG. 4. In some implementations, the process 2500 represents operations performed by the apparatus 4900 of FIG. 49 (e.g., by the processing circuit 4910). Of course, in various aspects within the scope of the disclosure, the process 2500 may be implemented by any suitable apparatus capable of supporting communication-related operations.

At block 2502, a user terminal (or other suitable apparatus) optionally sends a measurement message.

At block 2504, the user terminal (or other suitable apparatus) receives satellite handoff information that specifies a handoff time for a particular beam of a particular satellite. For example, the information may be a table that indicates timing for transitioning between cells/beams and satellites.

At block 2506, the user terminal (or other suitable apparatus) performs handoffs to a particular beam of a particular satellite (e.g., to different cells/beams and at least one satellite) based on the satellite handoff information.

Figure 26:
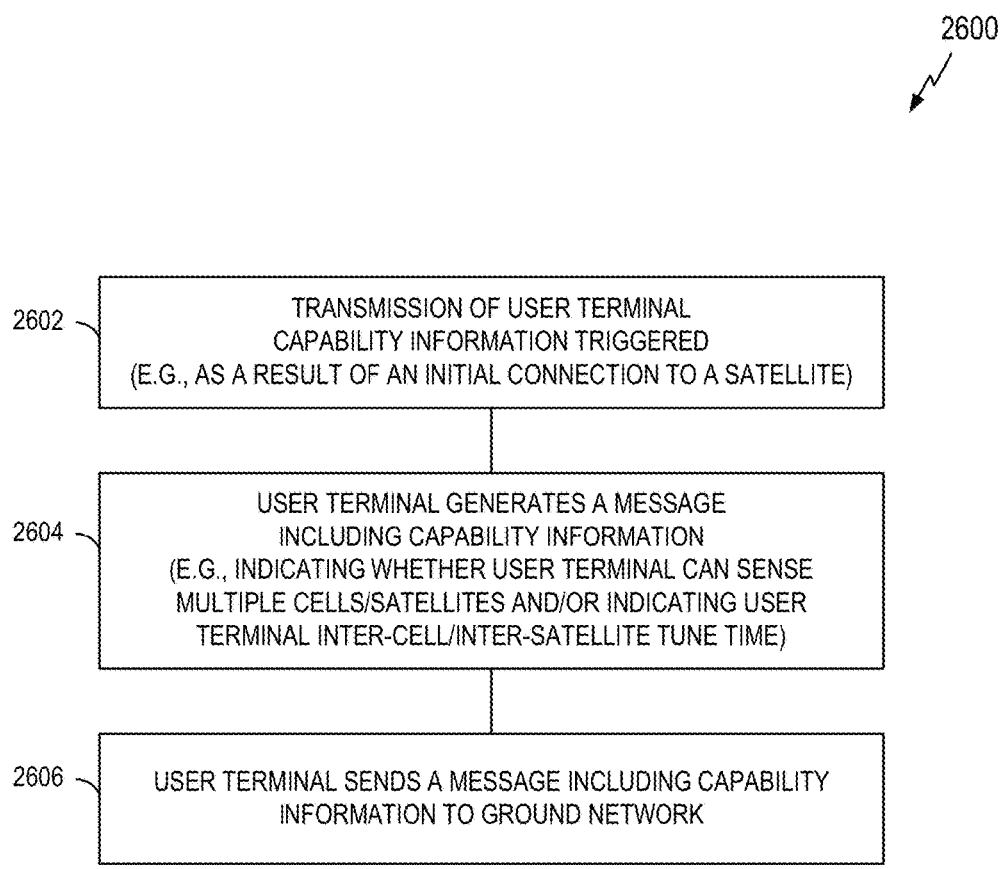
FIG. 26 is a diagram illustrating an example of signaling user terminal capabilities in accordance with some aspects of the disclosure.

FIG. 26 is a diagram illustrating an example of a process 2600 for signaling user terminal capability information in accordance with some aspects of the disclosure. The process 2600 may take place within a processing circuit which may be located in a user terminal or some other suitable apparatus (device). In some implementations, the process 2600 represents operations performed by the control processor 420 of FIG. 4. In some implementations, the process 2600 represents operations performed by the apparatus 4900 of FIG. 49 (e.g., by the processing circuit 4910). Of course, in various aspects within the scope of the disclosure, the process 2600 may be implemented by any suitable apparatus capable of supporting communication-related operations.

At block 2602, the transmission of user terminal capability information is triggered at a user terminal (or other suitable apparatus). For example, the transmission may be triggered as a result of an initial connection to a satellite.

At block 2604, the user terminal (or other suitable apparatus) generates a capabilities message. In some aspects, the message indicates whether the UT can sense multiple cells/beams and/or satellites and/or the message indicates UT inter-cell/beam and/or inter-satellite tune time.

At block 2606, the user terminal (or other suitable apparatus) sends the capabilities message to a GN.

Figure 27:
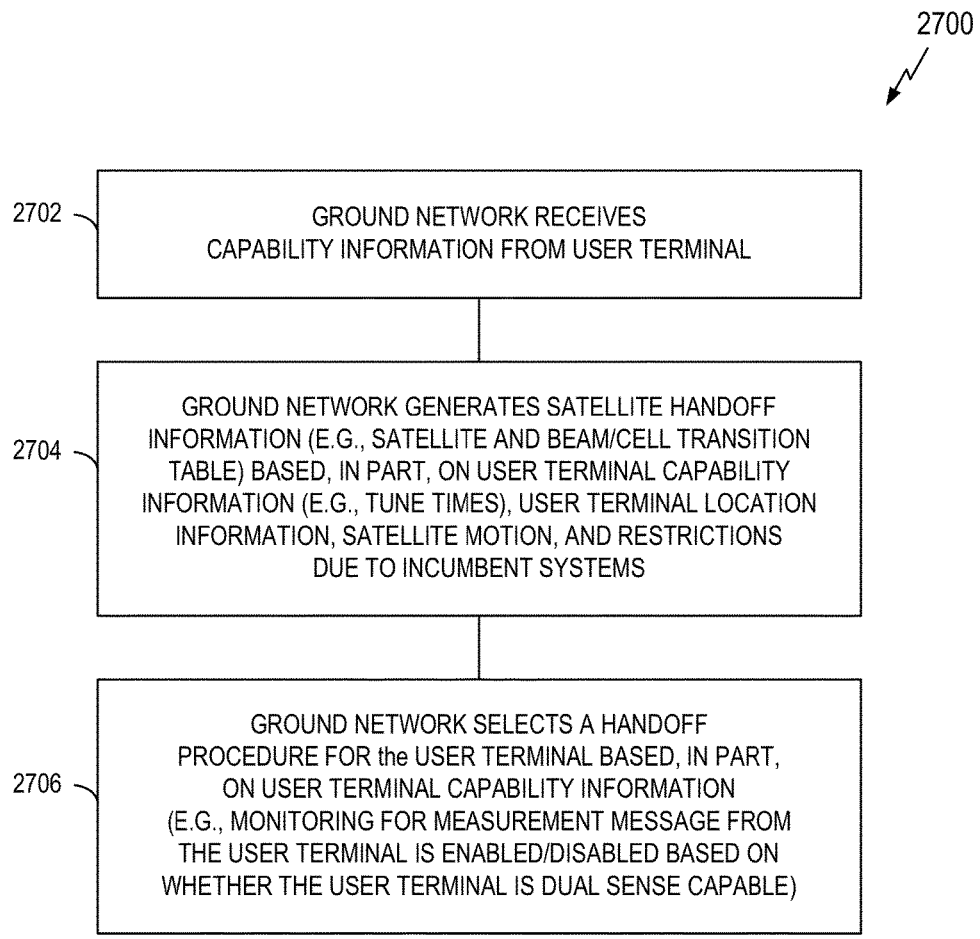
FIG. 27 is a diagram illustrating an example of using user terminal capabilities in accordance with some aspects of the disclosure.

FIG. 27 is a diagram illustrating an example of a process 2700 for using user terminal capabilities in accordance with some aspects of the disclosure. The process 2700 may take place within a processing circuit which may be located in a GN or some other suitable apparatus (device). In some implementations, the process 2700 represents operations performed by the GN controller 250 of FIG. 2. In some implementations, the process 2700 represents operations performed by the apparatus 4600 of FIG. 46 (e.g., by the processing circuit 4610). Of course, in various aspects within the scope of the disclosure, the process 2700 may be implemented by any suitable apparatus capable of supporting communication-related operations.

At block 2702, a GN (or other suitable apparatus) receives a capabilities message from a user terminal. This capabilities message includes user terminal capability information.

At block 2704, the GN (or other suitable apparatus) generates satellite handoff information. For example, a table or a portion of a table may be generated based, in part, on the user terminal capability information (e.g., tune times), user terminal location information, satellite motion, ephemeris information, and a restriction due to incumbent systems.

At block 2706, the GN (or other suitable apparatus) selects a handoff procedure for the user terminal based, in part, on the user terminal capability information. For example, monitoring for a measurement message from a user terminal may be enabled or disabled based on whether the user terminal is dual sense capable. Thus, an apparatus may enable or disable whether the apparatus monitors for a measurement message based on the user terminal capability information.

Figure 28:
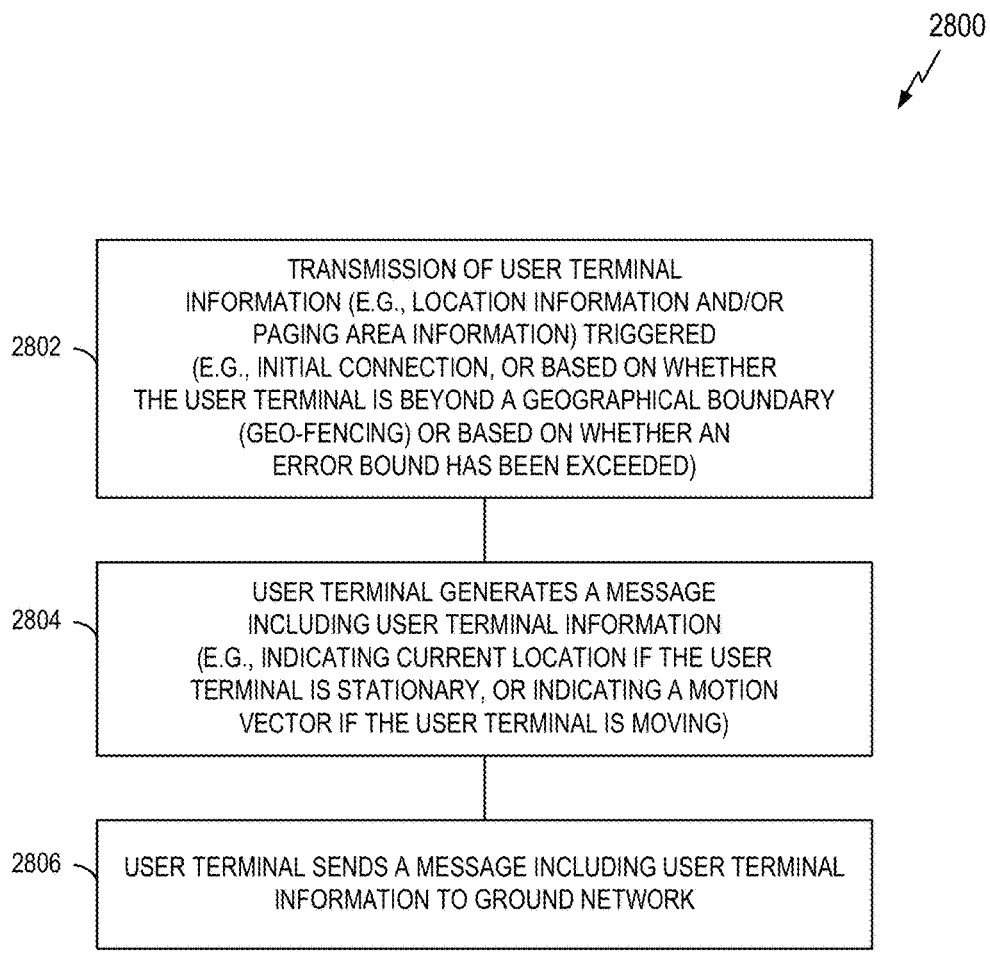
FIG. 28 is a diagram illustrating an example of signaling user terminal location information in accordance with some aspects of the disclosure.

FIG. 28 is a diagram illustrating an example of a process 2800 for signaling user terminal location information in accordance with some aspects of the disclosure. The process 2800 may take place within a processing circuit which may be located in a user terminal or some other suitable apparatus (device). In some implementations, the process 2800 represents operations performed by the control processor 420 of FIG. 4. In some implementations, the process 2800 represents operations performed by the apparatus 4900 of FIG. 49 (e.g., by the processing circuit 4910). Of course, in various aspects within the scope of the disclosure, the process 2800 may be implemented by any suitable apparatus capable of supporting communication-related operations.

At block 2802, the transmission of user terminal location information is triggered at a user terminal (or other suitable apparatus). This may be the result of an initial connection, or based on whether the UT is beyond a geographical boundary (geo-fencing), or based on whether an error bound has been exceeded.

At block 2804, the user terminal (or other suitable apparatus) generates a location message. In some aspects, the message may indicate the current location if the UT is stationary, or indicate a motion vector if the UT is moving.

At block 2806, the user terminal (or other suitable apparatus) sends the location message to a GN.

Figure 29:
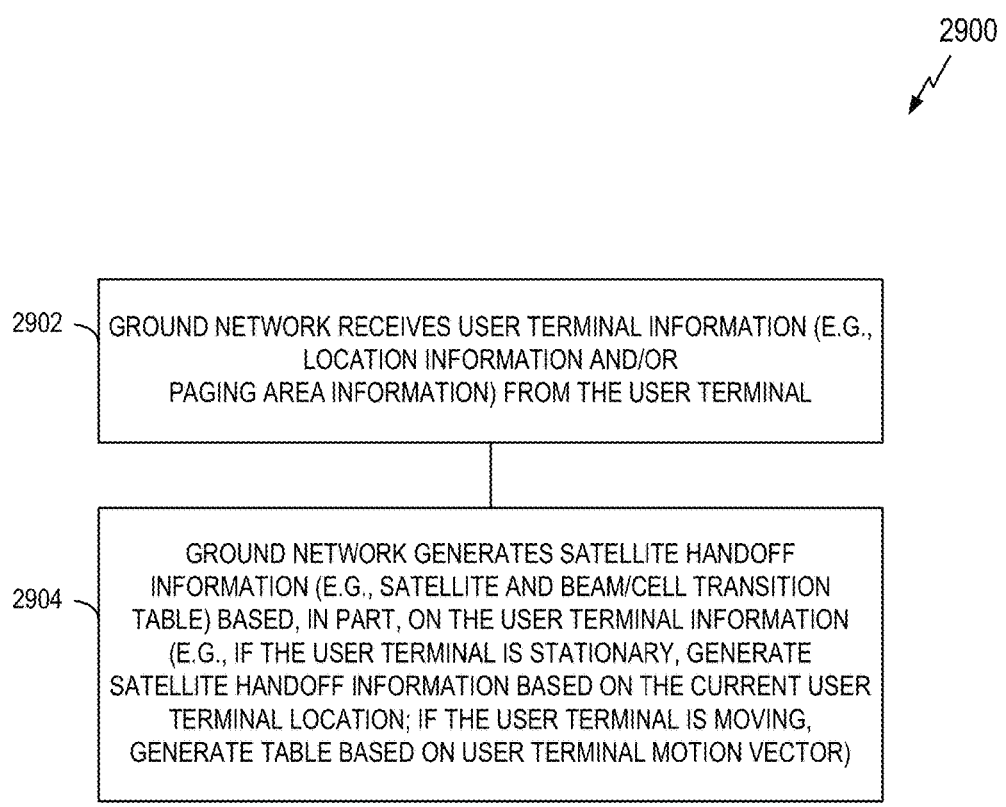
FIG. 29 is a diagram illustrating an example of using user terminal location information in accordance with some aspects of the disclosure.

FIG. 29 is a diagram illustrating an example of a process 2900 for using user terminal location information in accordance with some aspects of the disclosure. The process 2900 may take place within a processing circuit which may be located in a GN or some other suitable apparatus (device). In some implementations, the process 2900 represents operations performed by the GN controller 250 of FIG. 2. In some implementations, the process 2900 represents operations performed by the apparatus 4600 of FIG. 46 (e.g., by the processing circuit 4610). Of course, in various aspects within the scope of the disclosure, the process 2900 may be implemented by any suitable apparatus capable of supporting communication-related operations.

At block 2902, a GN (or other suitable apparatus) receives a location message from a user terminal. This location message includes user terminal location information.

At block 2904, the GN (or other suitable apparatus) generates satellite handoff information based, in part, on user terminal location information. For example, if the UT is stationary, the GN may generate a table or a portion of a table based on the current UT location. As another example, if the UT is moving, the GN may generate the table (or portion) based on a UT motion vector.

Figure 30:
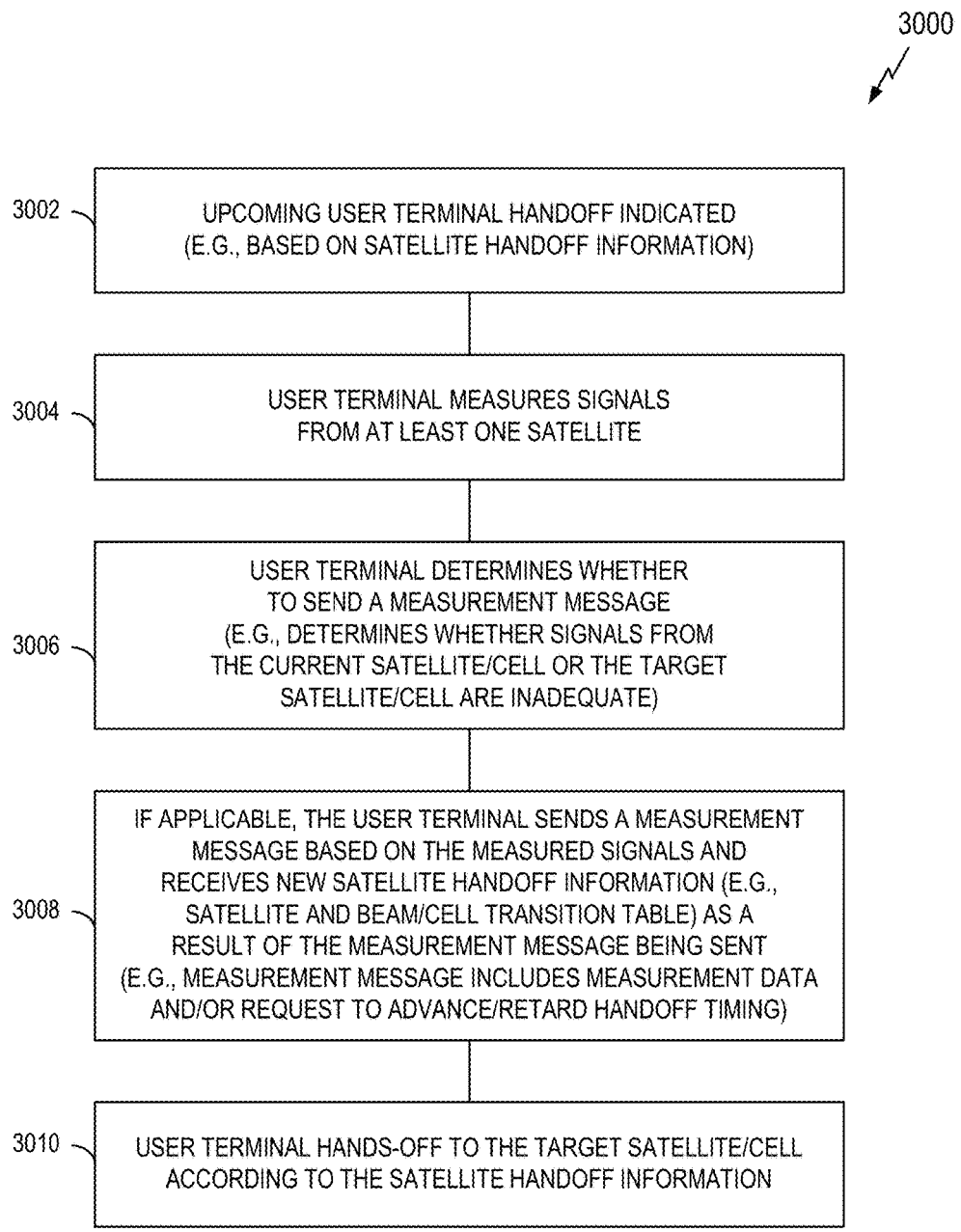
FIG. 30 is a diagram illustrating an example of user terminal handoff operations in accordance with some aspects of the disclosure.

FIG. 30 is a diagram illustrating an example of a user terminal handoff process 3000 in accordance with some aspects of the disclosure. The process 3000 may take place within a processing circuit which may be located in a user terminal or some other suitable apparatus (device). In some implementations, the process 3000 represents operations performed by the control processor 420 of FIG. 4. In some implementations, the process 3000 represents operations performed by the apparatus 4900 of FIG. 49 (e.g., by the processing circuit 4910). Of course, in various aspects within the scope of the disclosure, the process 3000 may be implemented by any suitable apparatus capable of supporting communication-related operations.

At block 3002, an upcoming user terminal handoff is indicated at a user terminal (or other suitable apparatus). For example, the handoff may be indicated based on satellite handoff information.

At block 3004, the user terminal (or other suitable apparatus) measures satellite signals (e.g., signals from the satellites indicated in the satellite handoff information).

At block 3006, the user terminal (or other suitable apparatus) determines whether to send a measurement message. In some aspects, this determination may involve determining whether signals from the current cell/beam and/or satellite or whether signals from the target cell/beam and/or satellite are inadequate.

At block 3008, if applicable, the user terminal (or other suitable apparatus) sends a measurement message and receives new satellite handoff information. In some aspects, the message may include measurement data and/or a request to advance/retard handoff timing. Thus, in some aspects, the user terminal may send a measurement message based on the signals measured at block 3004 and receive the satellite handoff information as a result of sending the measurement message.

At block 3010, the user terminal (or other suitable apparatus) hands-off to the target cell/beam and/or satellite according to the satellite handoff information.

Figure 31:
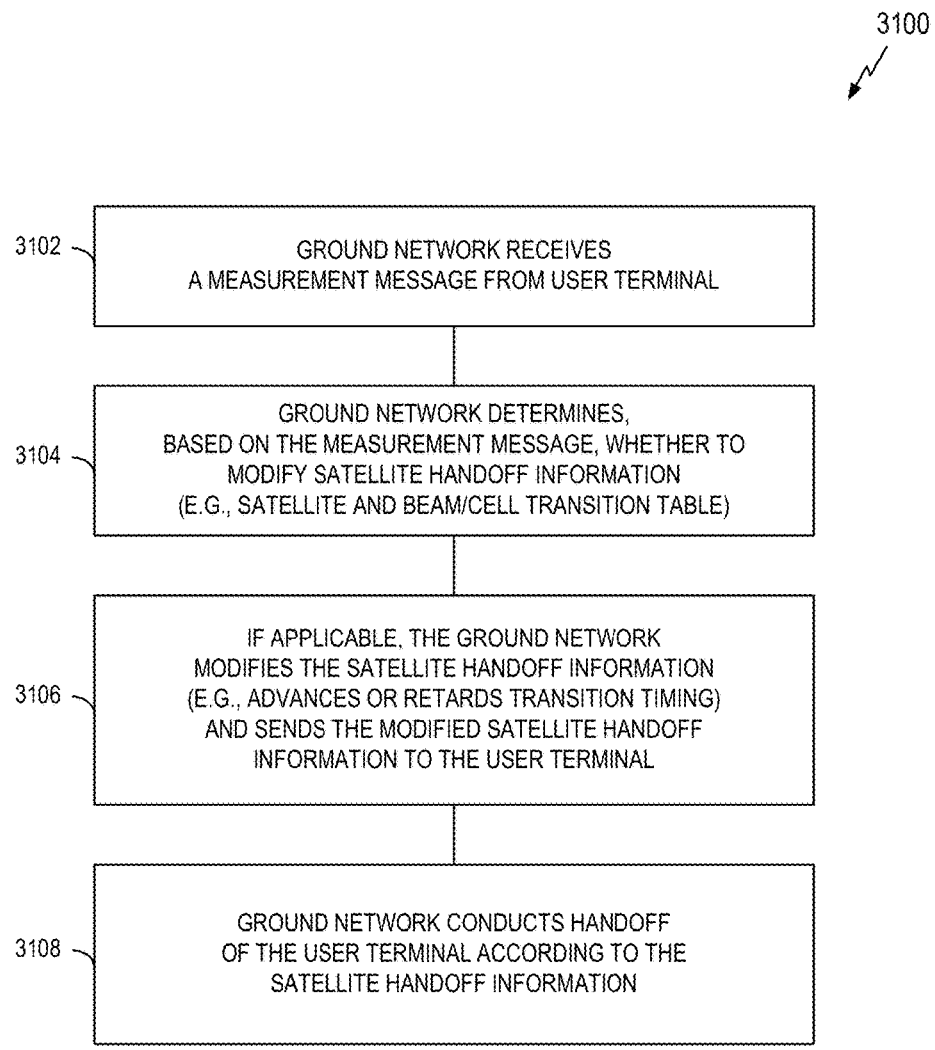
FIG. 31 is a diagram illustrating an example of GN handoff operations in accordance with some aspects of the disclosure.

FIG. 31 is a diagram illustrating an example of a GN handoff process 3100 in accordance with some aspects of the disclosure. The process 3100 may take place within a processing circuit which may be located in a GN or some other suitable apparatus (device). In some implementations, the process 3100 represents operations performed by the GN controller 250 of FIG. 2. In some implementations, the process 3100 represents operations performed by the apparatus 4600 of FIG. 46 (e.g., by the processing circuit 4610). Of course, in various aspects within the scope of the disclosure, the process 3100 may be implemented by any suitable apparatus capable of supporting communication-related operations.

At block 3102, a GN (or other suitable apparatus) receives a measurement message from a user terminal.

At block 3104, the GN (or other suitable apparatus) determines, based on the measurement message, whether to modify the satellite handoff information.

At block 3106, if applicable, the GN (or other suitable apparatus) modifies the satellite handoff information (e.g., advances or retards transition timing) and sends the modified satellite handoff information to the user terminal.

At block 3108, the GN (or other suitable apparatus) conducts a handoff of the user terminal according to the satellite handoff information.

Figure 32:
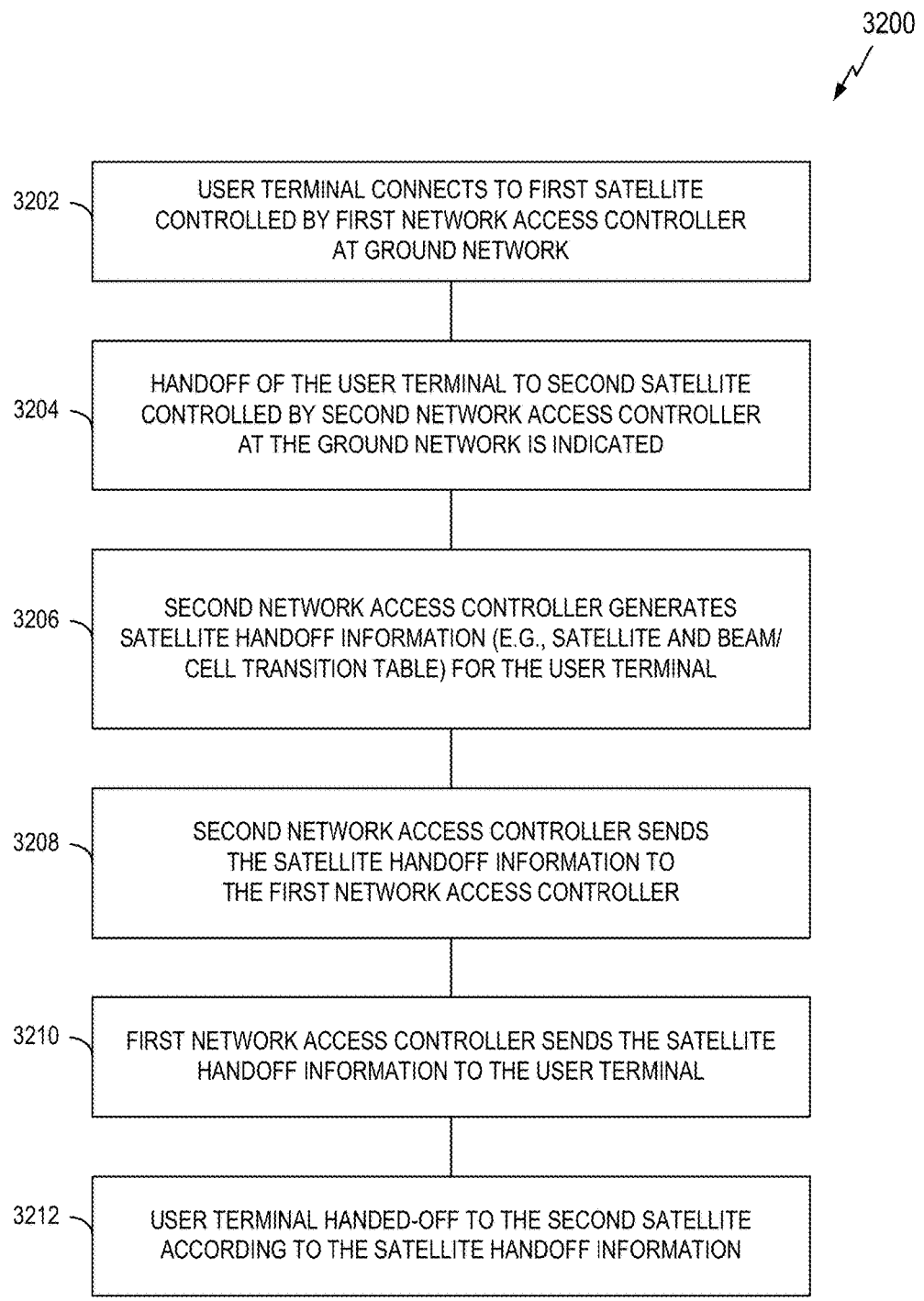
FIG. 32 is a diagram illustrating another example of inter-satellite handoff signaling in accordance with some aspects of the disclosure.

FIG. 32 is a diagram illustrating another example of an inter-satellite handoff signaling process 3200 in accordance with some aspects of the disclosure. The process 3200 may take place within a processing circuit which may be located in a GN, a user terminal, or some other suitable apparatuses (devices). In some implementations, the process 3200 represents one or more operations performed by the GN controller 250 of FIG. 2. In some implementations, the process 3200 represents one or more operations performed by the control processor 420 of FIG. 4. In some implementations, the process 3200 represents one or more operations performed by the apparatus 4600 of FIG. 46 (e.g., by the processing circuit 4610). In some implementations, the process 3200 represents one or more operations performed by the apparatus 4900 of FIG. 49 (e.g., by the processing circuit 4910). Of course, in various aspects within the scope of the disclosure, the process 3200 may be implemented by any suitable apparatuses capable of supporting communication-related operations.

At block 3202, a user terminal (or other suitable apparatus) connects to a first satellite controlled by a first NAC at a GN.

At block 3204, handoff of the user terminal (or other suitable apparatus) to a second satellite controlled by a second NAC at the GN is indicated.

At block 3206, the second NAC (or other suitable apparatus) generates satellite handoff information for the user terminal.

At block 3208, the second NAC (or other suitable apparatus) sends the satellite handoff information to the first NAC.

At block 3210, the first NAC (or other suitable apparatus) sends the satellite handoff information to the user terminal.

At block 3212, the user terminal (or other suitable apparatus) is handed-off to a second satellite according to the satellite handoff information.

Figure 33:
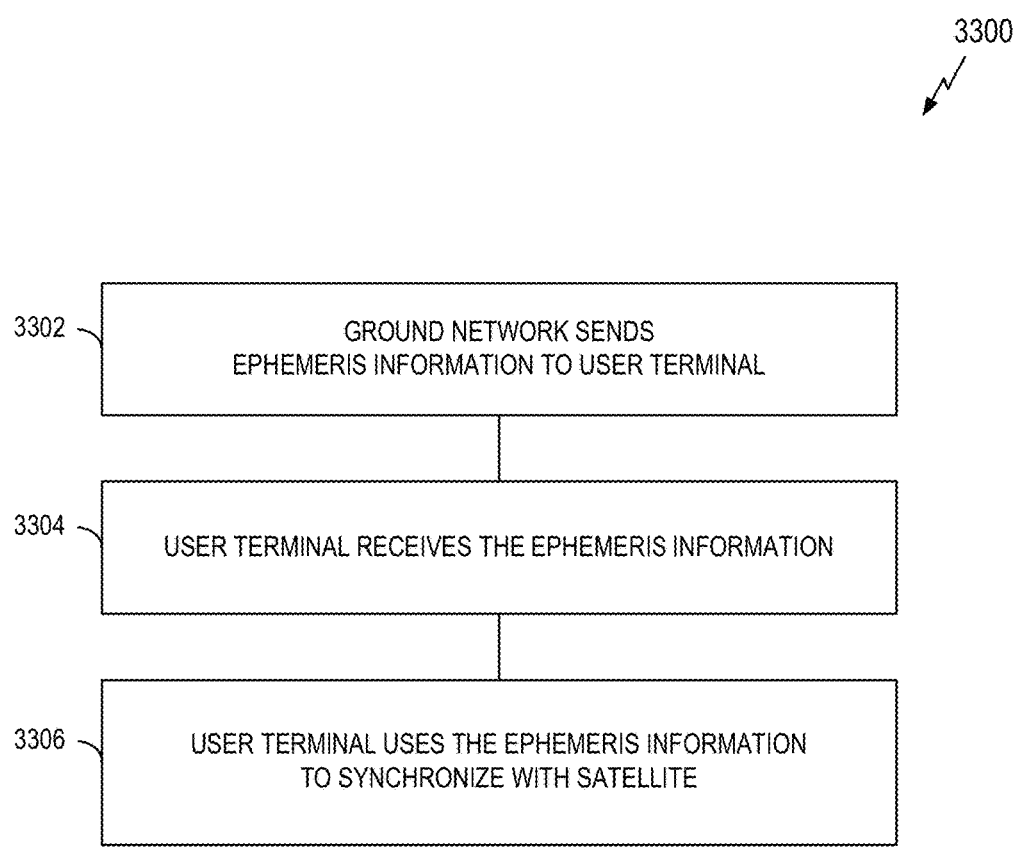
FIG. 33 is a diagram illustrating an example of signaling ephemeris information in accordance with some aspects of the disclosure.

FIG. 33 is a diagram illustrating an example of a process 3300 for signaling ephemeris information in accordance with some aspects of the disclosure. The process 3300 may take place within a processing circuit which may be located in a GN, a user terminal, or some other suitable apparatuses (devices). In some implementations, the process 3300 represents one or more operations performed by the GN controller 250 of FIG. 2. In some implementations, the process 3300 represents one or more operations performed by the control processor 420 of FIG. 4. In some implementations, the process 3300 represents one or more operations performed by the apparatus 4600 of FIG. 46 (e.g., by the processing circuit 4610). In some implementations, the process 3300 represents one or more operations performed by the apparatus 4900 of FIG. 49 (e.g., by the processing circuit 4910). Of course, in various aspects within the scope of the disclosure, the process 3300 may be implemented by any suitable apparatuses capable of supporting communication-related operations.

At block 3302, a GN (or other suitable apparatus) sends ephemeris information to a user terminal.

At block 3304, the user terminal (or other suitable apparatus) receives the ephemeris information.

At block 3306, the user terminal (or other suitable apparatus) uses the ephemeris information to synchronize with a satellite.

Figure 34:
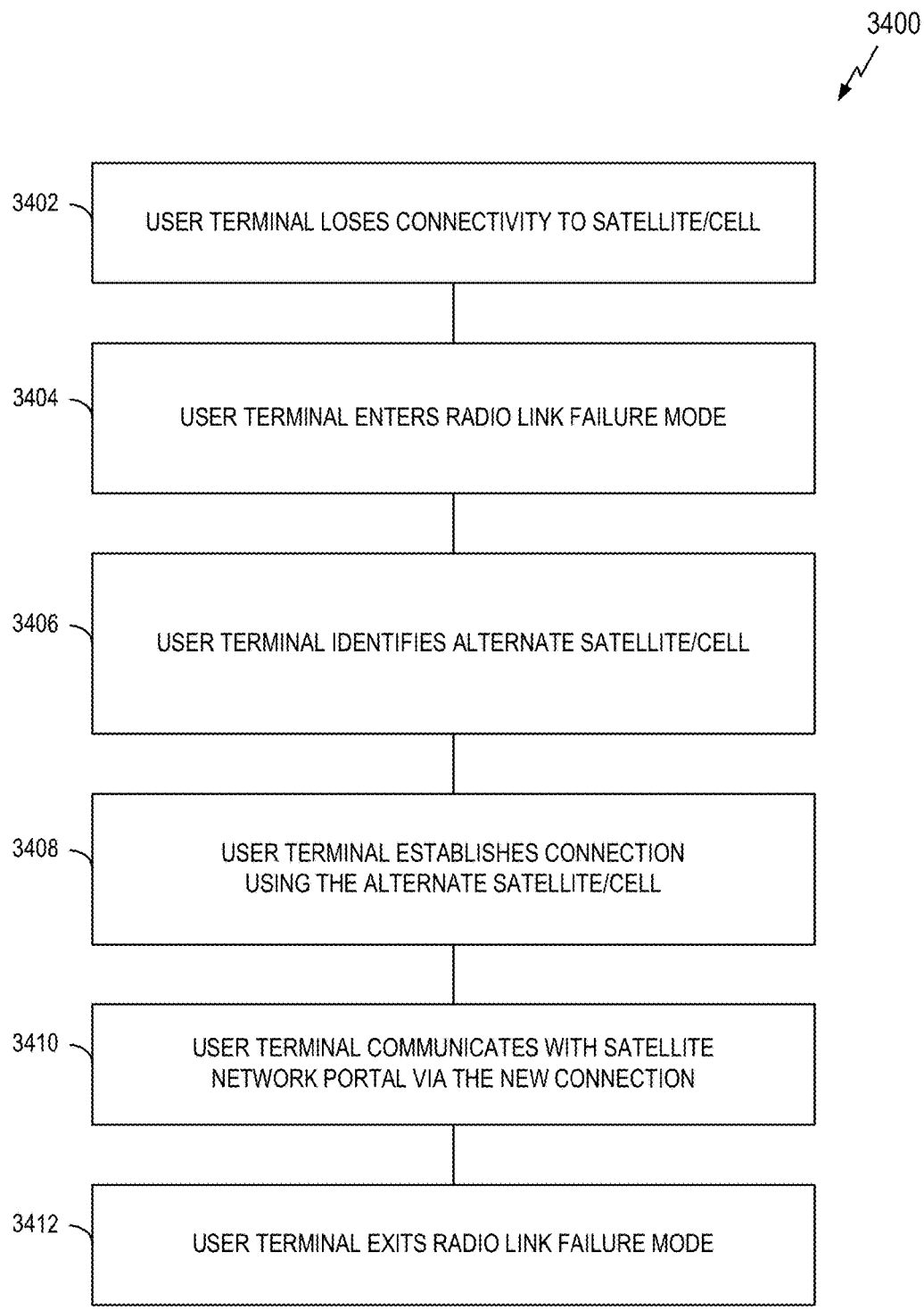
FIG. 34 is a diagram illustrating an example of radio link failure operations in accordance with some aspects of the disclosure.

FIG. 34 is a diagram illustrating an example of a radio link failure process 3400 in accordance with some aspects of the disclosure. The process 3400 may take place within a processing circuit which may be located in a user terminal or some other suitable apparatus (device). In some implementations, the process 3400 represents operations performed by the control processor 420 of FIG. 4. In some implementations, the process 3400 represents operations performed by the apparatus 4900 of FIG. 49 (e.g., by the processing circuit 4910). Of course, in various aspects within the scope of the disclosure, the process 3400 may be implemented by any suitable apparatus capable of supporting communication-related operations.

At block 3402, a user terminal (or other suitable apparatus) loses connectivity to a cell/beam or a satellite.

At block 3404, the user terminal (or other suitable apparatus) enters radio link failure mode.

At block 3406, the user terminal (or other suitable apparatus) identifies an alternate cell/beam and/or satellite (e.g., based on ephemeris information stored at the user terminal).

At block 3408, the user terminal (or other suitable apparatus) establishes a connection using the alternate cell/beam and/or satellite.

At block 3410, the user terminal (or other suitable apparatus) communicates with a GN via the new connection.

At block 3412, the user terminal (or other suitable apparatus) exits radio link failure mode.

Figure 35:
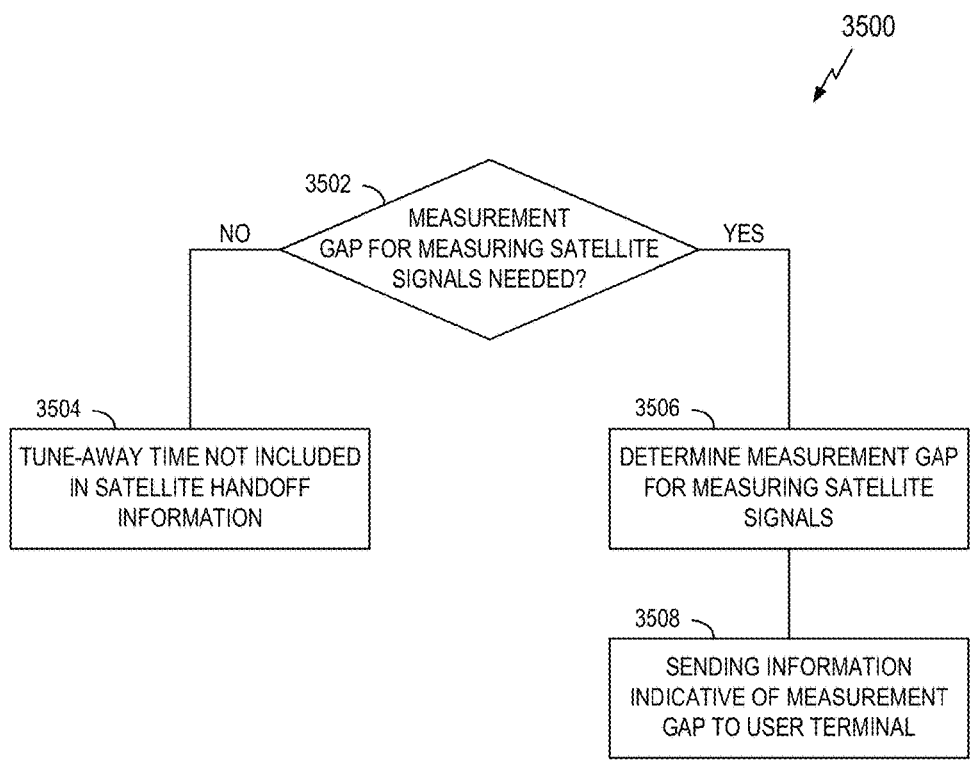
FIG. 35 is a diagram illustrating an example of measurement gap-related operations in accordance with some aspects of the disclosure.

FIG. 35 is a diagram illustrating an example of a measurement gap-related process 3500 in accordance with some aspects of the disclosure. The process 3500 may take place within a processing circuit which may be located in a GN or some other suitable apparatus (device). In some implementations, the process 3500 represents operations performed by the GN controller 250 of FIG. 2. In some implementations, the process 3500 represents operations performed by the apparatus 4600 of FIG. 46 (e.g., by the processing circuit 4610). Of course, in various aspects within the scope of the disclosure, the process 3500 may be implemented by any suitable apparatus capable of supporting communication-related operations.

At block 3502, a GN (or other suitable apparatus) determines whether a measurement gap is needed for measuring satellite signals.

At block 3504, if a measurement gap is not needed, the GN (or other suitable apparatus) does not include a tune-away time in the satellite handoff information.

At block 3506, if a measurement gap is needed, the GN (or other suitable apparatus) determines the measurement gap to be used for measuring satellite signals.

At block 3508, the GN (or other suitable apparatus) sends information indicative of the measurement gap to a user terminal.

Figure 36:
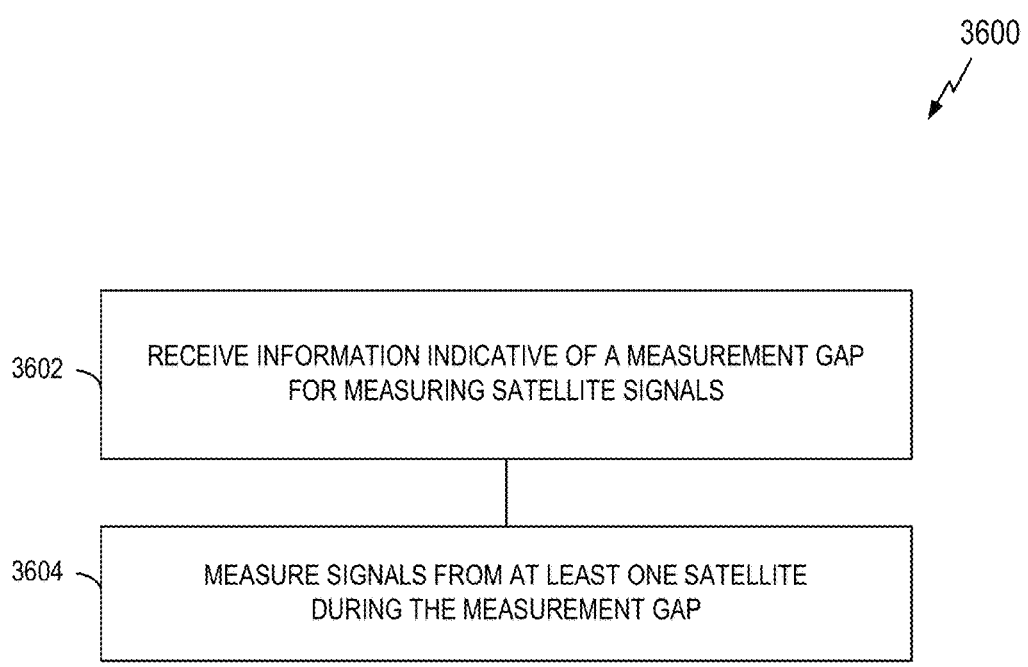
FIG. 36 is a diagram illustrating another example of measurement gap-related operations in accordance with some aspects of the disclosure.

FIG. 36 is a diagram illustrating an example of a measurement gap-related process 3600 in accordance with some aspects of the disclosure. The process 3600 may take place within a processing circuit which may be located in a user terminal or some other suitable apparatus (device). In some implementations, the process 3600 represents operations performed by the control processor 420 of FIG. 4. In some implementations, the process 3600 represents operations performed by the apparatus 4900 of FIG. 49 (e.g., by the processing circuit 4910). Of course, in various aspects within the scope of the disclosure, the process 3600 may be implemented by any suitable apparatus capable of supporting communication-related operations.

At block 3602, a user terminal (or other suitable apparatus) receives information indicative of a measurement gap for measuring satellite signals (e.g., from a GN).

At block 3604, the user terminal (or other suitable apparatus) measures signals from at least one satellite during the measurement gap (indicated by the received information).

Figure 37:
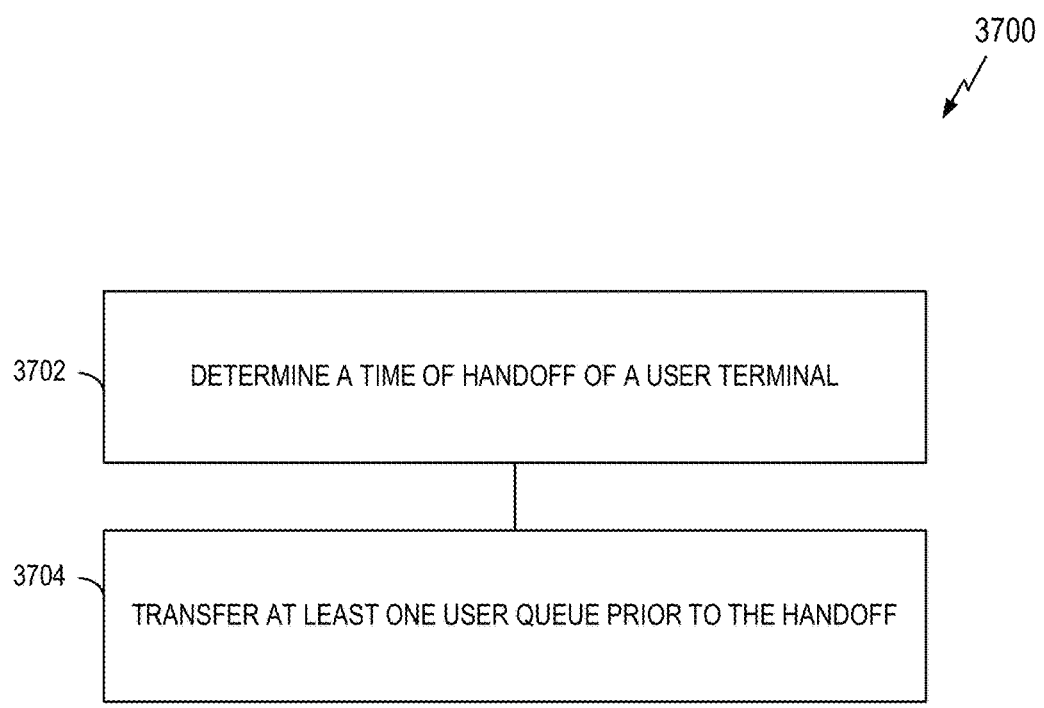
FIG. 37 is a diagram illustrating an example of user queue-related operations in accordance with some aspects of the disclosure.

FIG. 37 is a diagram illustrating an example of a user queue process 3700 in accordance with some aspects of the disclosure. The process 3700 may take place within a processing circuit which may be located in a GN or some other suitable apparatus (device). In some implementations, the process 3700 represents operations performed by the GN controller 250 of FIG. 2. In some implementations, the process 3700 represents operations performed by the apparatus 4600 of FIG. 46 (e.g., by the processing circuit 4610). Of course, in various aspects within the scope of the disclosure, the process 3700 may be implemented by any suitable apparatus capable of supporting communication-related operations.

At block 3702, a GN (or other suitable apparatus) determines a time of handoff of a user terminal.

At block 3704, the GN (or other suitable apparatus) transfers at least one user queue prior to the handoff.

Figure 38:
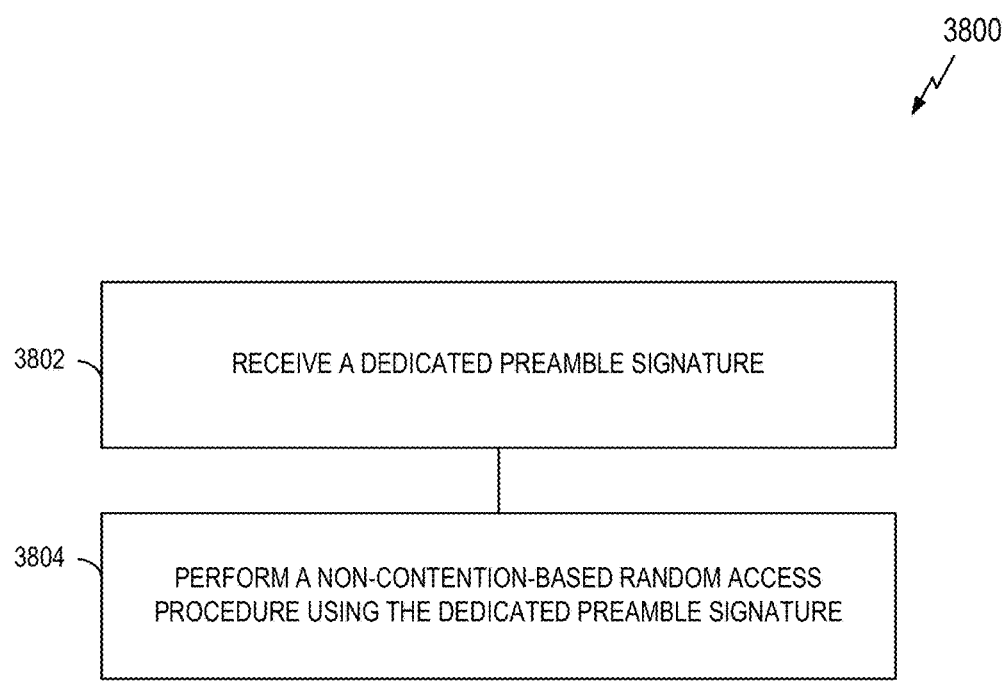
FIG. 38 is a diagram illustrating an example of random access-related operations in accordance with some aspects of the disclosure.

FIG. 38 is a diagram illustrating an example of a random access process 3800 in accordance with some aspects of the disclosure. The process 3800 may take place within a processing circuit which may be located in a user terminal or some other suitable apparatus (device). In some implementations, the process 3800 represents operations performed by the control processor 420 of FIG. 4. In some implementations, the process 3800 represents operations performed by the apparatus 4900 of FIG. 49 (e.g., by the processing circuit 4910). Of course, in various aspects within the scope of the disclosure, the process 3800 may be implemented by any suitable apparatus capable of supporting communication-related operations.

At block 3802, a user terminal (or other suitable apparatus) receives a dedicated preamble signature (e.g., a UT receives a dedicated preamble signature from a GN in a control channel order).

At block 3804, the user terminal (or other suitable apparatus) performs a non-contention-based random access procedure using the dedicated preamble signature.

First Example Apparatus

Figure 39:
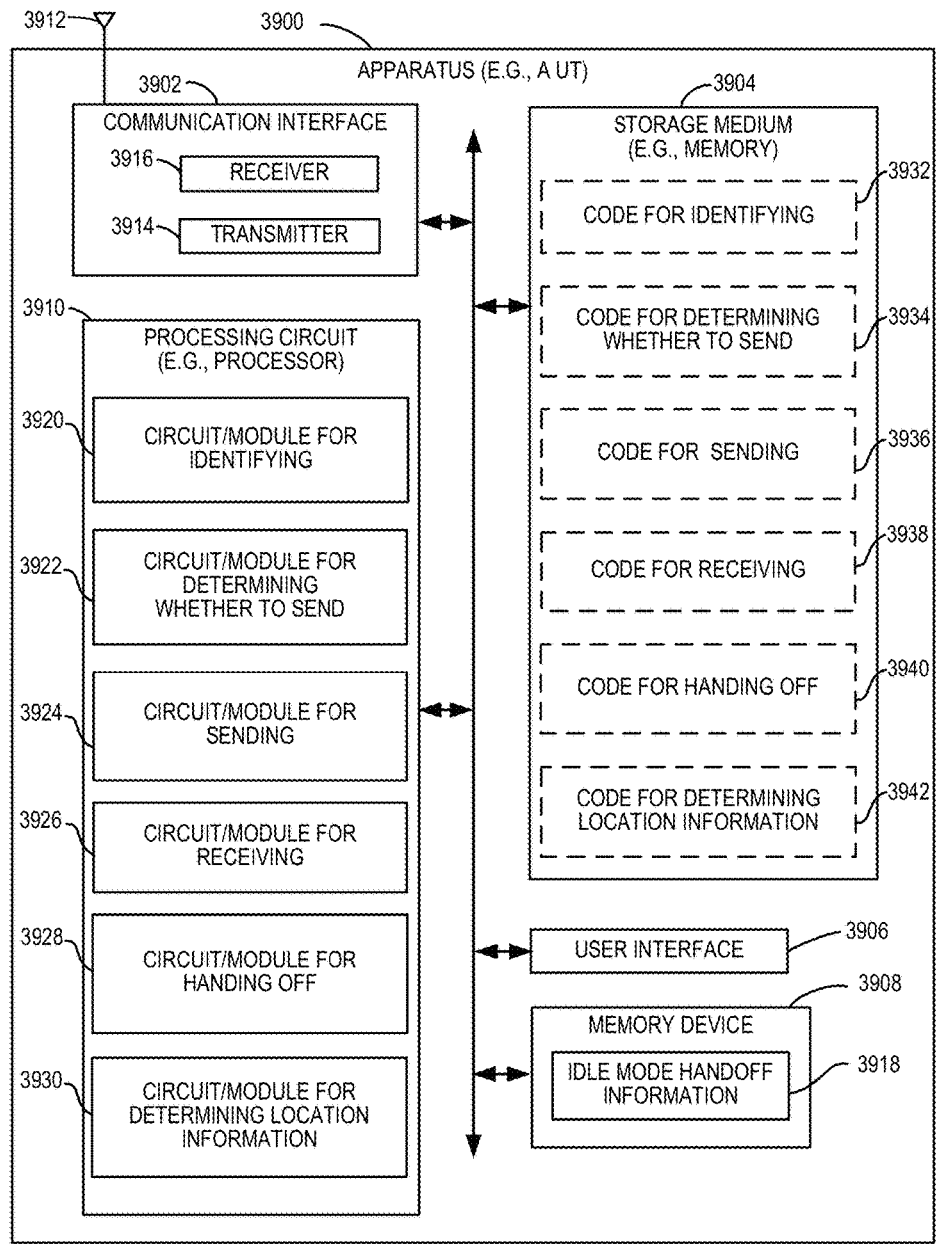
FIG. 39 is a block diagram illustrating an example hardware implementation for an apparatus (e.g., an electronic device) that can support communication in accordance with some aspects of the disclosure.

FIG. 39 illustrates a block diagram of an example hardware implementation of an apparatus 3900 configured to communicate according to one or more aspects of the disclosure. For example, the apparatus 3900 could embody or be implemented within a UT or some other type of device that supports satellite communication. Thus, in some aspects, the apparatus 3900 could be an example of the UT 400 or the UT 401 of FIG. 1. In various implementations, the apparatus 3900 could embody or be implemented within a satellite system component, a vehicular component, or any other electronic device having circuitry.

The apparatus 3900 includes a communication interface 3902 (e.g., at least one transceiver), a storage medium 3904, a user interface 3906, a memory device (e.g., a memory circuit) 3908, and a processing circuit 3910 (e.g., at least one processor). In various implementations, the user interface 3906 may include one or more of: a keypad, a display, a speaker, a microphone, a touchscreen display, of some other circuitry for receiving an input from or sending an output to a user.

These components can be coupled to and/or placed in electrical communication with one another via a signaling bus or other suitable component, represented generally by the connection lines in FIG. 39. The signaling bus may include any number of interconnecting buses and bridges depending on the specific application of the processing circuit 3910 and the overall design constraints. The signaling bus links together various circuits such that each of the communication interface 3902, the storage medium 3904, the user interface 3906, and the memory device 3908 are coupled to and/or in electrical communication with the processing circuit 3910. The signaling bus may also link various other circuits (not shown) such as timing sources, peripherals, voltage regulators, and power management circuits, which are well known in the art, and therefore, will not be described any further.

The communication interface 3902 provides a means for communicating with other apparatuses over a transmission medium. In some implementations, the communication interface 3902 includes circuitry and/or programming adapted to facilitate the communication of information bi-directionally with respect to one or more communication devices in a network. In some implementations, the communication interface 3902 is adapted to facilitate wireless communication of the apparatus 3900. In these implementations, the communication interface 3902 may be coupled to one or more antennas 3912 as shown in FIG. 39 for wireless communication within a wireless communication system. The communication interface 3902 can be configured with one or more standalone receivers and/or transmitters, as well as one or more transceivers. In the illustrated example, the communication interface 3902 includes a transmitter 3914 and a receiver 3916. The communication interface 3902 serves as one example of a means for receiving and/or means transmitting.

The memory device 3908 may represent one or more memory devices. As indicated, the memory device 3908 may maintain idle mode handoff information 3918 along with other information used by the apparatus 3900. In some implementations, the memory device 3908 and the storage medium 3904 are implemented as a common memory component. The memory device 3908 may also be used for storing data that is manipulated by the processing circuit 3910 or some other component of the apparatus 3900.

The storage medium 3904 may represent one or more computer-readable, machine-readable, and/or processor-readable devices for storing programming, such as processor executable code or instructions (e.g., software, firmware), electronic data, databases, or other digital information. The storage medium 3904 may also be used for storing data that is manipulated by the processing circuit 3910 when executing programming. The storage medium 3904 may be any available media that can be accessed by a general purpose or special purpose processor, including portable or fixed storage devices, optical storage devices, and various other mediums capable of storing, containing or carrying programming.

By way of example and not limitation, the storage medium 3904 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 3904 may be embodied in an article of manufacture (e.g., a computer program product). By way of example, a computer program product may include a computer-readable medium in packaging materials. In view of the above, in some implementations, the storage medium 3904 may be a non-transitory (e.g., tangible) storage medium.

The storage medium 3904 may be coupled to the processing circuit 3910 such that the processing circuit 3910 can read information from, and write information to, the storage medium 3904. That is, the storage medium 3904 can be coupled to the processing circuit 3910 so that the storage medium 3904 is at least accessible by the processing circuit 3910, including examples where at least one storage medium is integral to the processing circuit 3910 and/or examples where at least one storage medium is separate from the processing circuit 3910 (e.g., resident in the apparatus 3900, external to the apparatus 3900, distributed across multiple entities, etc.).

Programming stored by the storage medium 3904, when executed by the processing circuit 3910, causes the processing circuit 3910 to perform one or more of the various functions and/or process operations described herein. For example, the storage medium 3904 may include operations configured for regulating operations at one or more hardware blocks of the processing circuit 3910, as well as to utilize the communication interface 3902 for wireless communication utilizing their respective communication protocols.

The processing circuit 3910 is generally adapted for processing, including the execution of such programming stored on the storage medium 3904. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 3910 is arranged to obtain, process and/or send data, control data access and storage, issue commands, and control other desired operations. The processing circuit 3910 may include circuitry configured to implement desired programming provided by appropriate media in at least one example. For example, the processing circuit 3910 may be implemented as one or more processors, one or more controllers, and/or other structure configured to execute executable programming Examples of the processing circuit 3910 may include a general purpose processor, a digital signal processor (DSP), an application-specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 3910 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 3910 are for illustration and other suitable configurations within the scope of the disclosure are also contemplated.

According to one or more aspects of the disclosure, the processing circuit 3910 may be adapted to perform any or all of the features, processes, functions, operations and/or routines for any or all of the apparatuses described herein. For example, the processing circuit 3910 may be configured to perform any of the steps, functions, and/or processes described with respect to FIGS. 1-9 and 40-42. As used herein, the term "adapted" in relation to the processing circuit 3910 may refer to the processing circuit 3910 being one or more of configured, used, implemented, and/or programmed to perform a particular process, function, operation and/or routine according to various features described herein.

The processing circuit 3910 may be a specialized processor, such as an application-specific integrated circuit (ASIC) that serves as a means for (e.g., structure for) carrying out any one of the operations described in conjunction with FIGS. 1-9 and 40-42. The processing circuit 3910 serves as one example of a means for transmitting and/or a means for receiving. In some implementations, the processing circuit 3910 may provide and/or incorporate, at least in part, the functionality of the control processor 420 of FIG. 4.

According to at least one example of the apparatus 3900, the processing circuit 3910 may include one or more of a circuit/module for identifying 3920, a circuit/module for determining whether to send 3922, a circuit/module for sending 3924, a circuit/module for receiving 3926, a circuit/module for handing off 3928, or a circuit/module for determining location information 3930. In various implementations, the circuit/module for identifying 3920, the circuit/module for determining whether to send 3922, the circuit/module for sending 3924, the circuit/module for receiving 3926, the circuit/module for handing off 3928, or the circuit/module for determining location information 3930 may provide and/or incorporate, at least in part, the functionality of the control processor 420 of FIG. 4.

As mentioned above, programming stored by the storage medium 3904, when executed by the processing circuit 3910, causes the processing circuit 3910 to perform one or more of the various functions and/or process operations described herein. For example, the programming may cause the processing circuit 3910 to perform the various functions, steps, and/or processes described herein with respect to FIGS. 1-9 and 40-42 in various implementations. As shown in FIG. 39, the storage medium 3904 may include one or more of code for identifying 3932, code for determining whether to send 3934, code for sending 3936, code for receiving 3938, code for handing off 3940, or code for determining location information 3942. In various implementations, the code for identifying 3932, the code for determining whether to send 3934, the code for sending 3936, the code for receiving 3938, the code for handing off 3940, or the code for determining location information 3942 may be executed or otherwise used to provide the functionality described herein for the circuit/module for identifying 3920, the circuit/module for determining whether to send 3922, the circuit/module for sending 3924, the circuit/module for receiving 3926, the circuit/module for handing off 3928, or the circuit/module for determining location information 3930.

The circuit/module for identifying 3920 may include circuitry and/or programming (e.g., code for identifying 3932 stored on the storage medium 4604) adapted to perform several functions relating to, for example, identifying information associated with at least one handoff entry. In some aspects, the circuit/module for identifying 3920 (e.g., a means for identifying) may correspond to, for example, a processing circuit.

In some implementations, the circuit/module for identifying 3920 identifies a time associated with a handoff entry. For example, the circuit/module for identifying 3920 may identify a time based on an idle mode handoff table (e.g., Table 1). Here, the idle mode handoff table may include entries that indicate a start time for a handoff to a particular satellite. To this end, the circuit/module for identifying 3920 acquires the entry information (e.g., from the memory device 3908, the circuit/module for receiving 3926, or some other component of the apparatus 3900). The circuit/module for identifying 3920 may then process the information to determine a time (e.g., a frame number) associated with the entry. The circuit/module for identifying 3920 then generates an indication of this determination (e.g., indicative of the time) and sends the indication to a component of the apparatus 3900 (e.g., the circuit/module for determining whether to send 3922, the memory device 3908, or some other component).

In some implementations, the circuit/module for identifying 3920 identifies a quantity of valid entries in a set of handoff entries. For example, the circuit/module for identifying 3920 may determine how many valid entries remain in an idle mode handoff table (e.g., Table 1). To this end, the circuit/module for identifying 3920 acquires the handoff entry information (e.g., from the memory device 3908, the circuit/module for receiving 3926, or some other component of the apparatus 3900). In some scenarios, the circuit/module for identifying 3920 may process the information to determine the number of valid entries remaining in a table (e.g., in the case where entries remain in the table after they expire). For example, the circuit/module for identifying 3920 may compare a time value (e.g., a handoff time) for each entry with the current time and thereby determine which entries correspond to a time that has not yet passed. In some scenarios, the circuit/module for identifying 3920 may process the information to determine the total number of entries remaining (e.g., in the case where entries are removed from the table as they expire). In either case, the circuit/module for identifying 3920 generates an indication of this determination (e.g., a count indicative of the determined quantity) and sends the indication to a component of the apparatus 3900 (e.g., the circuit/module for determining whether to send 3922, the memory device 3908, or some other component).

The circuit/module for determining whether to send 3922 may include circuitry and/or programming (e.g., code for determining whether to send 3934 stored on the storage medium 3904) adapted to perform several functions relating to, for example, determining whether to send information. In some aspects, the circuit/module for determining whether to send 3922 (e.g., a means for determining whether to send) may correspond to, for example, a processing circuit.

In some implementations, the information to be sent may include a request for an updated set of handoff entries. In some scenarios, the circuit/module for determining whether to send 3922 obtains information that is used to make a send decision (e.g., from the circuit/module for identifying 3920, the memory device 3908, or some other component).

In some scenarios, the circuit/module for determining whether to send 3922 may obtain an indication of a time associated with a particular entry of a set of handoff entries. In this case, the circuit/module for determining whether to send 3922 may determine whether to send a request based on whether the time indicates that the set of handoff entries should be updated (e.g., due to the number of valid entries in the table running low). For example, the sending of a request may be triggered if the difference between the current time and the indicated time is less than a threshold period of time.

In some scenarios, the circuit/module for determining whether to send 3922 may obtain an indication of the quantity of valid entries in a set of handoff entries. In this case, the circuit/module for determining whether to send 3922 may determine whether to send a request based on whether the quantity indicates that the set of handoff entries should be updated (e.g., due to the number of valid entries in the table running low). For example, the sending of a request may be triggered if the number of valid entries is less than a threshold count (e.g., 1 or 2 or some other quantity).

In either scenario, the circuit/module for determining whether to send 3922 generates an indication of the above determination and sends the indication to the circuit/module for sending 3924, the memory device 3908, or some other component of the apparatus 3900.

The circuit/module for sending 3924 may include circuitry and/or programming (e.g., code for sending 3936 stored on the storage medium 3904) adapted to perform several functions relating to, for example, sending (e.g., outputting or transmitting) information. In some implementations, the circuit/module for sending 3924 may obtain an indication that triggers sending (e.g., from the circuit/module for determining whether to send 3922, the memory device 3908, or some other component of the apparatus 3900). In some implementations, the circuit/module for sending 3924 may obtain information to be sent (e.g., a request message, an indication, location information, etc.) from the circuit/module for identifying 3920, the circuit/module for determining location information 3930, the memory device 3908 or some other component of the apparatus 3900 and process the information (e.g., encode the information for transmission). In some scenarios, the circuit/module for sending 3924 provides the information to another component (e.g., the transmitter 3914, the communication interface 3902, or some other component) that will send the information to another device. In some scenarios (e.g., if the circuit/module for sending 3924 includes a transmitter), the circuit/module for sending 3924 transmits the information directly to another device (e.g., the ultimate destination) via radio frequency signaling or some other type of signaling suitable for the applicable communication medium.

The circuit/module for sending 3924 (e.g., a means for sending) may take various forms. In some aspects, the circuit/module for sending 3924 may correspond to, for example, a processing circuit as discussed herein. In some aspects, the circuit/module for sending 3924 may correspond to, for example, an interface (e.g., a bus interface, a send interface, or some other type of signal interface), a communication device, a transceiver, a transmitter, or some other similar component as discussed herein. In some implementations, the communication interface 3902 includes the circuit/module for sending 3924 and/or the code for sending 3936. In some implementations, the circuit/module for sending 3924 and/or the code for sending 3936 is configured to control the communication interface 3902 (e.g., a transceiver or a transmitter) to transmit information.

The circuit/module for receiving 3926 may include circuitry and/or programming (e.g., code for receiving 3938 stored on the storage medium 3904) adapted to perform several functions relating to, for example, receiving information. The information may include, without limitation, an indication, a set of handoff entries, a handoff table, etc. In some scenarios, the circuit/module for receiving 3926 may obtain information (e.g., from the communication interface 3902, the memory device, or some other component of the apparatus 3900) and process (e.g., decode) the information. In some scenarios (e.g., if the circuit/module for receiving 3926 is or includes an RF receiver), the circuit/module for receiving 3926 may receive information directly from a device that transmitted the information. In either case, the circuit/module for receiving 3926 may output the obtained information to another component of the apparatus 3900 (e.g., the circuit/module for handing off 3928, the memory device 3908, or some other component).

The circuit/module for receiving 3926 (e.g., a means for receiving) may take various forms. In some aspects, the circuit/module for receiving 3926 may correspond to, for example, an interface (e.g., a bus interface, a send/receive interface, or some other type of signal interface), a communication device, a transceiver, a receiver, or some other similar component as discussed herein. In some implementations, the communication interface 3902 includes the circuit/module for receiving 3926 and/or the code for receiving 3938. In some implementations, the circuit/module for receiving 3926 and/or the code for receiving 3938 is configured to control the communication interface 3902 (e.g., a transceiver or a receiver) to receive information.

The circuit/module for handing off 3928 may include circuitry and/or programming (e.g., code for handing off 3940 stored on the storage medium 3904) adapted to perform several functions relating to, for example, performing a handoff for a user terminal to a target cell, beam, or satellite. In some aspects, the circuit/module for handing off 3928 (e.g., a means for handing off) may correspond to, for example, a processing circuit.

In some implementations, the circuit/module for handing off 3928 identifies one or more of a target satellite, a target cell, or a target beam based on a set of handoff entries (e.g., Table 1). To this end, the circuit/module for handing off 3928 may collect this information, process the information to identify the target (and, optionally, at least one carrier frequency of the target), and reconfigure communication parameters of the apparatus 3900 to cause the user terminal to communicate with the target. For example, the circuit/module for handing off 3928 can determine whether to handoff to a particular cell of a particular satellite at a particular time based on timing information in the set of handoff entries. As another example, the circuit/module for handing off 3928 can determine whether to handoff to a particular cell of a particular satellite on a particular carrier frequency based on frequency information in the set of handoff entries. If handoff is indicated, the circuit/module for handing off 3928 can commence handoff signaling accordingly.

The circuit/module for determining location information 3930 may include circuitry and/or programming (e.g., code for determining location information 3942 stored on the storage medium 3904) adapted to perform several functions relating to, for example, determining location information for an apparatus. In some aspects, the circuit/module for determining location information 3930 (e.g., a means for determining location information) may correspond to, for example, a processing circuit.

In some scenarios, the circuit/module for determining location information 3930 obtains information that relates to at least one location of the apparatus. For example, the circuit/module for determining location information 3930 may obtain global positioning system (GPS) coordinates from a GPS receiver indicative of a current location of the apparatus. As another example, the circuit/module for determining location information 3930 may obtain a set of global positioning system (GPS) coordinates from a GPS receiver indicative of movement of the apparatus (e.g., a path along which the apparatus has traveled). In some scenarios, this obtained information may constitute the location information. In some scenarios, the circuit/module for determining location information 3930 may process this obtained information to generate the location information (e.g., by generating an indication of speed or a vector indicative of movement). Finally, the circuit/module for determining location information 3930 outputs the location information to the circuit/module for sending 3924, the memory device 3908, or some other component of the apparatus 3900.

First Example Process

Figure 40:
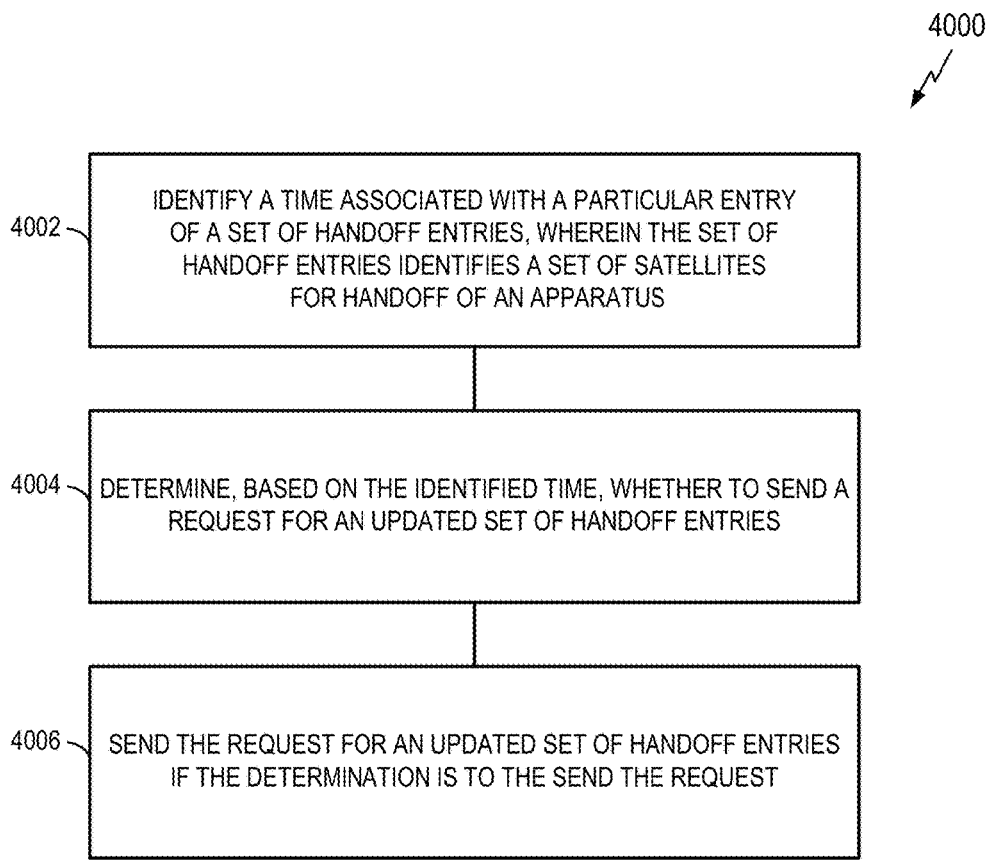
FIG. 40 is a flowchart illustrating an example communication process in accordance with some aspects of the disclosure.

FIG. 40 illustrates a process 4000 for communication in accordance with some aspects of the disclosure. The process 4000 may take place within a processing circuit (e.g., the processing circuit 3910 of FIG. 39), which may be located in a UT or some other suitable apparatus. Of course, in various aspects within the scope of the disclosure, the process 4000 may be implemented by any suitable apparatus capable of supporting communication-related operations.

At block 4002, an apparatus (e.g., a UT) identifies a time associated with a particular entry of a set of handoff entries. In some aspects, the set of handoff entries may identify a set of satellites for handoff of the apparatus. In some aspects, the time may include a start time for a handoff to one satellite of the set of satellites. In some aspects, the particular entry may include a last entry of the set of handoff entries.

The set of handoff entries may take different forms in different implementations. In some aspects, the set of handoff entries may include an idle mode handoff table. In some aspects, the time may indicate when the apparatus is to handoff to one satellite of the set of satellites while the apparatus is in an idle mode. In some aspects, the idle mode handoff table may include, for each satellite, a time for the apparatus when in idle mode to handoff to the satellite. In some aspects, the set of satellites may be for an idle mode operation of the apparatus. In some aspects, the set of handoff entries may include, for each satellite, a time for the apparatus when in idle mode to handoff to the satellite.

At block 4004, the apparatus determines, based on the identified time of block 4002, whether to send a request for an updated set of handoff entries.

At block 4006, the apparatus sends the request for an updated set of handoff entries if the determination is to send the request. In some aspects, the request may be communicated when the apparatus establishes a Radio connection with a ground network (GN).

In some aspects, an apparatus may perform any of the operations discussed above for FIG. 40, or any combination thereof.

Second Example Process

Figure 41:
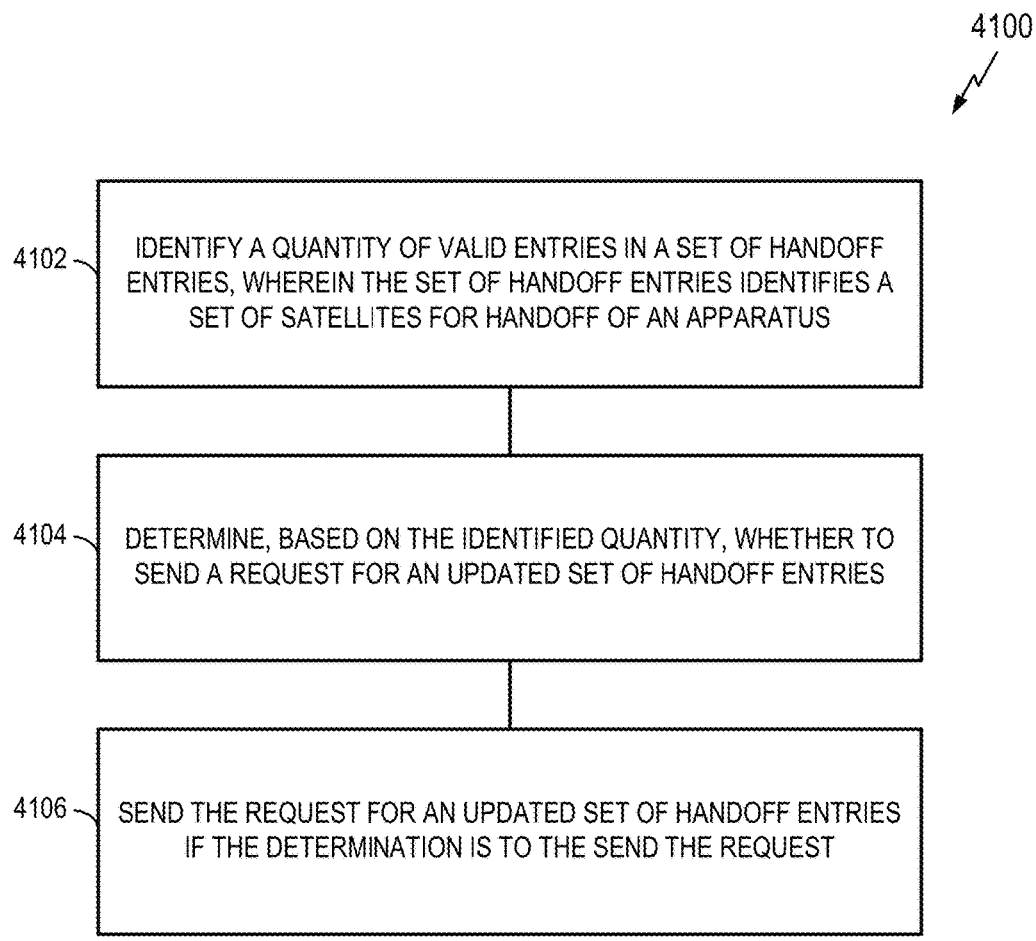
FIG. 41 is a flowchart illustrating an example communication process in accordance with some aspects of the disclosure.

FIG. 41 illustrates a process 4100 for communication in accordance with some aspects of the disclosure. The process 4100 may take place within a processing circuit (e.g., the processing circuit 3910 of FIG. 39), which may be located in a UT or some other suitable apparatus. Of course, in various aspects within the scope of the disclosure, the process 4100 may be implemented by any suitable apparatus capable of supporting communication-related operations.

At block 4102, an apparatus (e.g., a UT) identifies a quantity of valid entries in a set of handoff entries. In some aspects, the set of handoff entries may identify a set of satellites for handoff of the apparatus.

The set of handoff entries may take different forms in different implementations. In some aspects, the set of handoff entries may include an idle mode handoff table. In some aspects, the set of satellites may be for an idle mode operation of the apparatus. In some aspects, the set of handoff entries may identify times at which the apparatus when in idle mode is to handoff to each satellite of the set of satellites. In some aspects, the set of handoff entries may include, for each satellite, a time for the apparatus when in idle mode to handoff to the satellite.

At block 4104, the apparatus determines, based on the identified quantity, whether to send a request for an updated set of handoff entries. In some aspects, the determination of whether to send the request for an updated set of handoff entries may include determining whether the set of handoff entries includes only one valid entry.

At block 4106, the apparatus sends the request for an updated set of handoff entries if the determination is to send the request. In some aspects, the request may be communicated when the apparatus establishes a Radio connection with a ground network (GN).

In some aspects, an apparatus may perform any of the operations discussed above for FIG. 41, or any combination thereof.

Third Example Process

Figure 42:
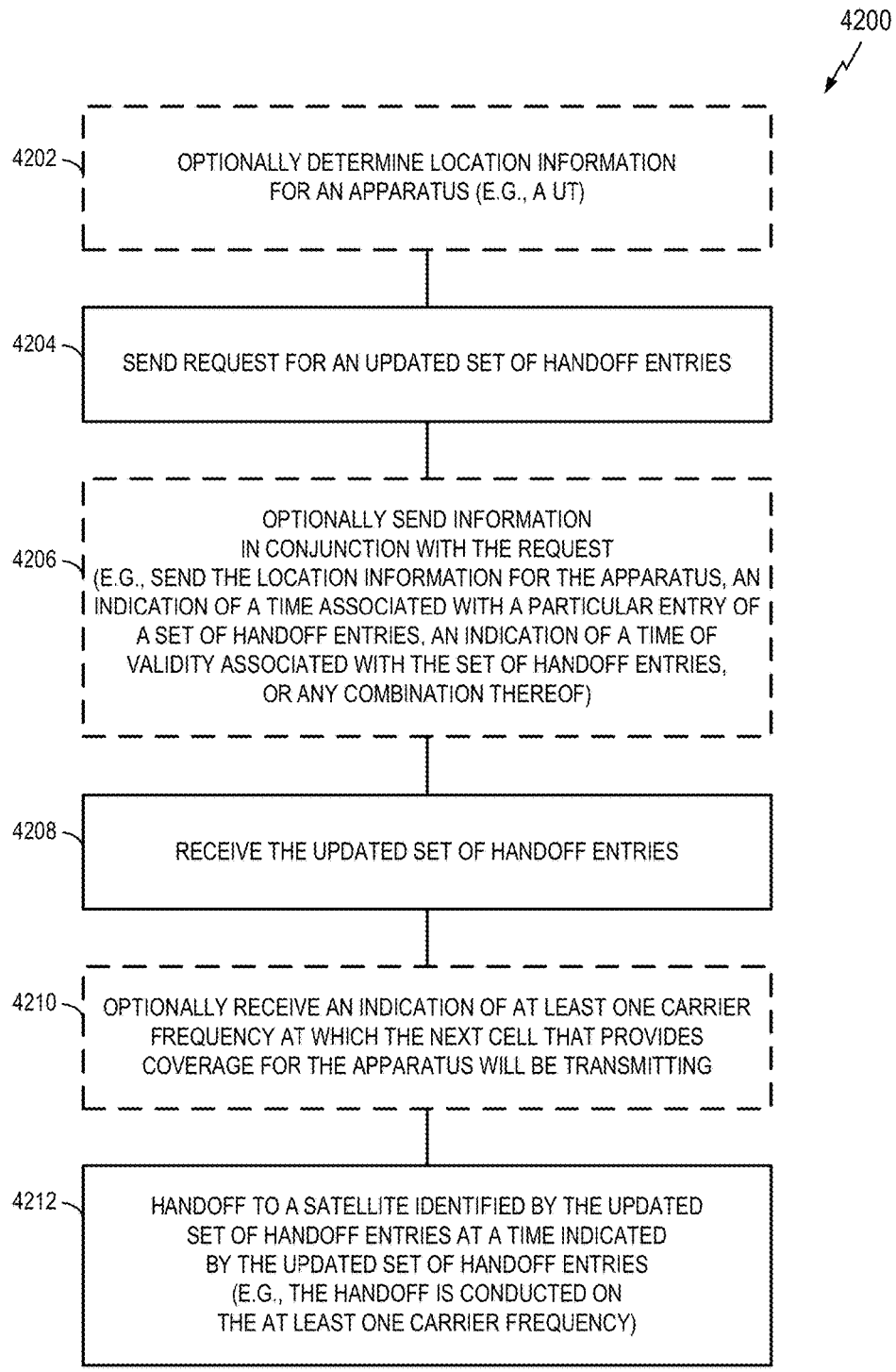
FIG. 42 is a flowchart illustrating an example communication process in accordance with some aspects of the disclosure.

FIG. 42 illustrates a process 4200 for communication in accordance with some aspects of the disclosure. One or more aspects of the process 4200 may be used in conjunction with (e.g., in addition to or as part of) the process 4000 of FIG. 40 or the process 4100 of FIG. 41. The process 4200 may take place within a processing circuit (e.g., the processing circuit 3910 of FIG. 39), which may be located in a UT or some other suitable apparatus. Of course, in various aspects within the scope of the disclosure, the process 4200 may be implemented by any suitable apparatus capable of supporting communication-related operations.

At optional block 4202, an apparatus (e.g., a UT) may determine location information for an apparatus (e.g., for the UT).

At block 4204, the apparatus sends a request for an updated set of handoff entries (e.g., to a GN).

At optional block 4206, the apparatus may send information in conjunction with the request. For example, the apparatus may send the location information for the apparatus, an indication of a time associated with a particular entry of a set of handoff entries, an indication of a time of validity associated with the set of handoff entries, or any combination thereof.

At block 4208, the apparatus receives the updated set of handoff entries (e.g. after sending the request at block 4202).

At optional block 4210, the apparatus may receive an indication of at least one carrier frequency at which a next cell that provides coverage for the apparatus will be transmitting. For example, a UT may receive from a GN a nextCellTransmitFreq parameter (e.g., via a BIB message). As discussed above, this parameter may include a list of possible frequencies, a single frequency, and so on.

At block 4212, the apparatus hands-off to a satellite identified by the updated set of handoff entries at a time indicated by the updated set of handoff entries. In scenarios that use block 4210, this handoff may be conducted on the indicated at least one carrier frequency.

In some aspects, an apparatus may perform any of the operations discussed above for FIG. 42, or any combination thereof.

Second Example Apparatus

Figure 43:
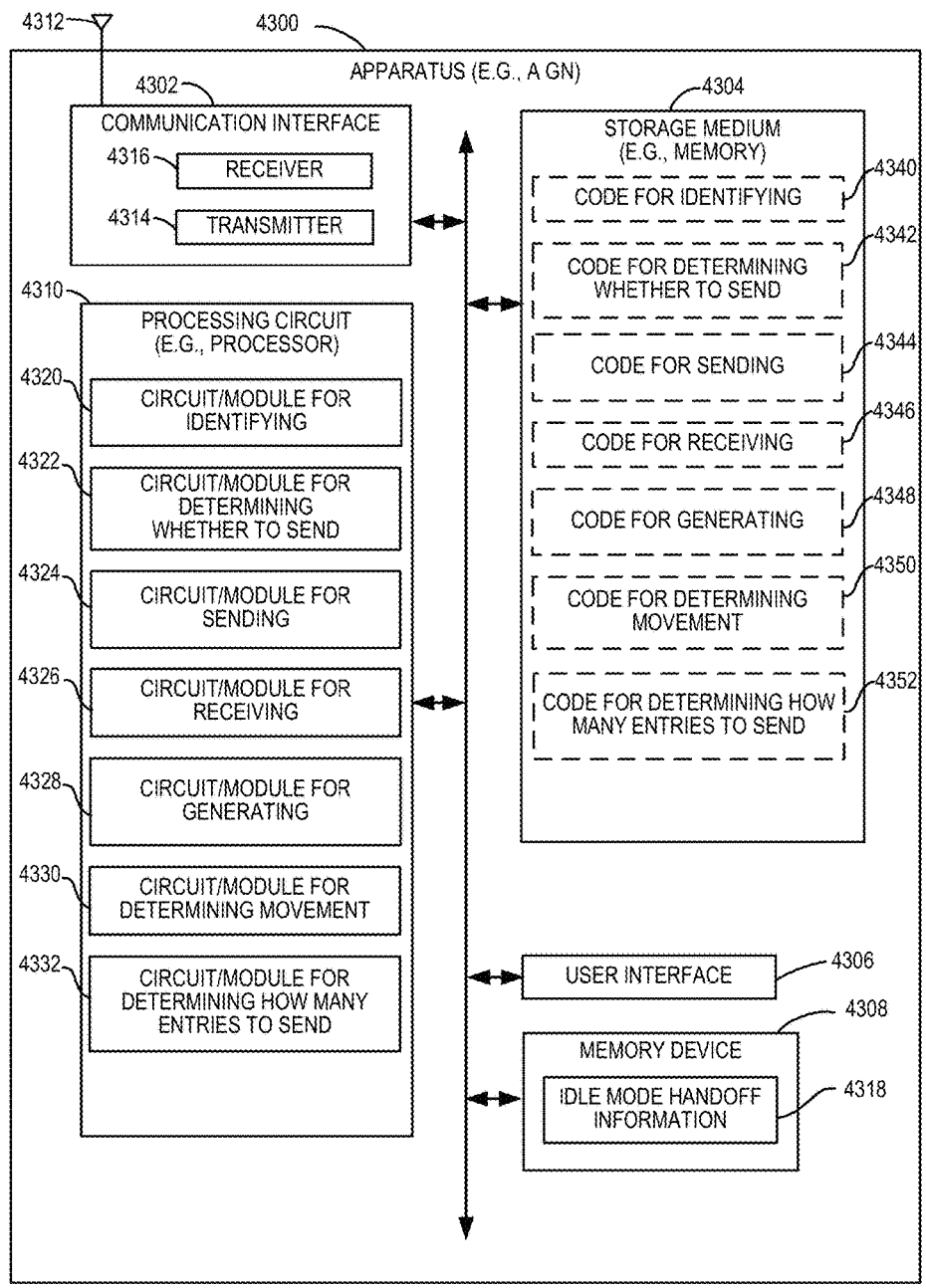
FIG. 43 is a block diagram illustrating an example hardware implementation for an apparatus (e.g., an electronic device) that can support communication in accordance with some aspects of the disclosure.

FIG. 43 illustrates a block diagram of an example hardware implementation of another apparatus 4300 configured to communicate according to one or more aspects of the disclosure. For example, the apparatus 4300 could embody or be implemented within a GN or some other type of device that supports wireless communication. Thus, in some aspects, the apparatus 4300 could be an example of the GN 200 or the GN 201 of FIG. 1. In various implementations, the apparatus 4300 could embody or be implemented within a gateway, a ground station, a vehicular component, or any other electronic device having circuitry.

The apparatus 4300 includes a communication interface (e.g., at least one transceiver) 4302, a storage medium 4304, a user interface 4306, a memory device 4308 (e.g., storing idle mode handoff information 4318), and a processing circuit (e.g., at least one processor) 4310. In various implementations, the user interface 4306 may include one or more of: a keypad, a display, a speaker, a microphone, a touchscreen display, of some other circuitry for receiving an input from or sending an output to a user. The communication interface 4302 may be coupled to one or more antennas 4312, and may include a transmitter 4314 and a receiver 4316. In general, the components of FIG. 43 may be similar to corresponding components of the apparatus 3900 of FIG. 39.

According to one or more aspects of the disclosure, the processing circuit 4310 may be adapted to perform any or all of the features, processes, functions, operations and/or routines for any or all of the apparatuses described herein. For example, the processing circuit 4310 may be configured to perform one or more of the steps, functions, and/or processes described with respect to FIGS. 1-9, 44, and 45. As used herein, the term "adapted" in relation to the processing circuit 4310 may refer to the processing circuit 4310 being one or more of configured, employed, implemented, and/or programmed to perform a particular process, function, operation and/or routine according to various features described herein.

The processing circuit 4310 may be a specialized processor, such as an application specific integrated circuit (ASIC) that serves as a means for (e.g., structure for) carrying out one or more of the operations described in conjunction with FIGS. 1-9, 44, and 45. The processing circuit 4310 serves as one example of a means for transmitting and/or a means for receiving. In various implementations, the processing circuit 4310 may provide and/or incorporate, at least in part, the functionality of the GN controller 250 of FIG. 2.

According to at least one example of the apparatus 4300, the processing circuit 4310 may include one or more of a circuit/module for identifying 4320, a circuit/module for determining whether to send 4322, a circuit/module for sending 4324, a circuit/module for receiving 4326, a circuit/module for generating 4328, a circuit/module determining movement 4330, or a circuit/module for determining how many entries to send 4332. In various implementations, the circuit/module for identifying 4320, the circuit/module for determining whether to send 4322, the circuit/module for sending 4324, the circuit/module for receiving 4326, the circuit/module for generating 4328, the circuit/module determining movement 4330, or the circuit/module for determining how many entries to send 4332 may provide and/or incorporate, at least in part, the functionality of the GN controller 250 of FIG. 2.

As mentioned above, programming stored by the storage medium 4304, when executed by the processing circuit 4310, causes the processing circuit 4310 to perform one or more of the various functions and/or process operations described herein. For example, the programming may cause the processing circuit 4310 to perform one or more of the various functions, steps, and/or processes described herein with respect to FIGS. 1-9, 44, and 45 in various implementations. As shown in FIG. 43, the storage medium 4304 may include one or more of code for identifying 4340, code for determining whether to send 4342, code for sending 4344, code for receiving 4346, code for generating 4348, code for determining movement 4350, or code for determining how many entries to send 4352. In various implementations, the code for identifying 4340, the code for determining whether to send 4342, the code for sending 4344, the code for receiving 4346, the code for generating 4348, the code for determining movement 4350, or the code for determining how many entries to send 4352 may be executed or otherwise used to provide the functionality described herein for the circuit/module for identifying 4320, the circuit/module for determining whether to send 4322, the circuit/module for sending 4324, the circuit/module for receiving 4326, the circuit/module for generating 4328, the circuit/module determining movement 4330, or the circuit/module for determining how many entries to send 4332.

The circuit/module for identifying 4320 may include circuitry and/or programming (e.g., code for identifying 4340 stored on the storage medium 4604) adapted to perform several functions relating to, for example, identifying information associated with at least one handoff entry. In some aspects, the circuit/module for identifying 4320 (e.g., a means for identifying) may correspond to, for example, a processing circuit.

In some implementations, the circuit/module for identifying 4320 identifies a time of validity associated with a set of handoff entries. For example, the circuit/module for identifying 4320 may identify a time of validity for an idle mode handoff table (e.g., Table 1). To this end, the circuit/module for identifying 4320 may acquires time information from the memory device 4308, the circuit/module for receiving 4326, or some other component of the apparatus 4300. In some scenarios, the identification of the time of validity may include receiving an indication of the time of validity (e.g., from another apparatus such as a UT). In some scenarios, the identification of the time of validity may include receiving an indication of a time associated with a particular entry (e.g., a last entry) of a set of handoff entries. In some cases, the circuit/module for identifying 4320 processes the acquired information to determine a time of validity associated with the set of handoff entries. For example, the circuit/module for identifying 4320 may identify the handoff time associated with the last entry in an idle mode handoff table. In any of these scenarios, the circuit/module for identifying 4320 thereby generates an indication of the time of validity and sends the indication to a component of the apparatus 4300 (e.g., the circuit/module for determining whether to send 4322, the memory device 4308, or some other component).

The circuit/module for determining whether to send 4322 may include circuitry and/or programming (e.g., code for determining whether to send 4342 stored on the storage medium 4304) adapted to perform several functions relating to, for example, determining whether to send information. In some aspects, the circuit/module for determining whether to send 4322 (e.g., a means for determining whether to send) may correspond to, for example, a processing circuit.

In some implementations, the information to be sent may include a request for an updated set of handoff entries. In some scenarios, the circuit/module for determining whether to send 4322 obtains information that is used to make a send decision (e.g., from the circuit/module for identifying 4320, the circuit/module for determining movement 4330, the memory device 4308, or some other component). In some scenarios, the circuit/module for determining whether to send 4322 may obtain an indication of a time of validity associated with a set of handoff entries. In this case, the circuit/module for determining whether to send 4322 may determine whether to send a request based on whether the time of validity indicates that the set of handoff entries should be updated. For example, the sending of a request may be triggered if the time of validity indicates that the handoff entries have expired or will soon expire. In some scenarios, the circuit/module for determining whether to send 4322 may obtain an indication of movement of another apparatus (e.g., a UT). In this case, the circuit/module for determining whether to send 4322 may determine whether to send a request based on, for example, how fast the other apparatus is moving. In either case, the circuit/module for determining whether to send 4322 generates an indication of the determination and outputs the indication (e.g., to the circuit/module for sending 4324, the memory device 4308, or some other component of the apparatus 4300).

The circuit/module for sending 4324 may include circuitry and/or programming (e.g., code for sending 4344 stored on the storage medium 4304) adapted to perform several functions relating to, for example, sending (e.g., outputting or transmitting) information. In some implementations, the circuit/module for sending 4324 may obtain an indication that triggers sending (e.g., from the circuit/module for determining whether to send 4322, the memory device 4308, or some other component of the apparatus 4300). In some implementations, the circuit/module for sending 4324 may obtain information to be sent (e.g., a request message, an indication, location information, etc.) from the circuit/module for identifying 4320, the circuit/module for determining movement 4330, the memory device 4308 or some other component of the apparatus 4300 and process the information (e.g., encode the information for transmission). In some scenarios, the circuit/module for sending 4324 provides the information to another component (e.g., the transmitter 4314, the communication interface 4302, or some other component) that will send the information to another device. In some scenarios (e.g., if the circuit/module for sending 4324 includes a transmitter), the circuit/module for sending 4324 transmits the information directly to another device (e.g., the ultimate destination) via radio frequency signaling or some other type of signaling suitable for the applicable communication medium.

The circuit/module for sending 4324 (e.g., a means for sending) may take various forms. In some aspects, the circuit/module for sending 4324 may correspond to, for example, a processing circuit as discussed herein. In some aspects, the circuit/module for sending 4324 may correspond to, for example, an interface (e.g., a bus interface, a send interface, or some other type of signal interface), a communication device, a transceiver, a transmitter, or some other similar component as discussed herein. In some implementations, the communication interface 4302 includes the circuit/module for sending 4324 and/or the code for sending 4344. In some implementations, the circuit/module for sending 4324 and/or the code for sending 4344 is configured to control the communication interface 4302 (e.g., a transceiver or a transmitter) to transmit information.

The circuit/module for receiving 4326 may include circuitry and/or programming (e.g., code for receiving 4346 stored on the storage medium 4304) adapted to perform several functions relating to for example, receiving information. The information may include, without limitation, an indication, location information, etc. In some scenarios, the circuit/module for receiving 4326 may obtain information (e.g., from the communication interface 4302, the memory device, or some other component of the apparatus 4300) and process (e.g., decode) the information. In some scenarios (e.g., if the circuit/module for receiving 4326 is or includes an RF receiver), the circuit/module for receiving 4326 may receive information directly from a device that transmitted the information. In either case, the circuit/module for receiving 4326 may output the obtained information to another component of the apparatus 4300 (e.g., the circuit/module for generating 4328, the memory device 4308, or some other component).

The circuit/module for receiving 4326 (e.g., a means for receiving) may take various forms. In some aspects, the circuit/module for receiving 4326 may correspond to, for example, an interface (e.g., a bus interface, a send/receive interface, or some other type of signal interface), a communication device, a transceiver, a receiver, or some other similar component as discussed herein. In some implementations, the communication interface 4302 includes the circuit/module for receiving 4326 and/or the code for receiving 4338. In some implementations, the circuit/module for receiving 4326 and/or the code for receiving 4338 is configured to control the communication interface 4302 (e.g., a transceiver or a receiver) to receive information.

The circuit/module for generating 4328 may include circuitry and/or programming (e.g., code for generating 4348 stored on the storage medium 4304) adapted to perform several functions relating to, for example, generating a set of handoff entries. In some aspects, the circuit/module for generating 4328 (e.g., a means for generating) may correspond to, for example, a processing circuit.

In some implementations, the circuit/module for generating 4328 generates a set of handoff entries based on location information for another apparatus (e.g., a UT). To this end, the circuit/module for generating 4328 may obtain this location information from the circuit/module for receiving 4326, the communication interface 4302, the memory device, or some other component of the apparatus 4300. The circuit/module for generating 4328 may thereby create an updated set of handoff entries (e.g., Table 1) based on satellite ephemeris information and the location information. In some scenarios, the circuit/module for generating 4328 receives an indication of the number of handoff entries to send (e.g., from the circuit/module for determining how many entries to send 4332). The circuit/module for generating 4328 then outputs this information (e.g., to the circuit/module for sending 4324, the memory device 4308, or some other component of the apparatus 4300).

The circuit/module for determining movement 4330 may include circuitry and/or programming (e.g., code for determining movement 4350 stored on the storage medium 4304) adapted to perform several functions relating to, for example, determining movement of an apparatus. In some aspects, the circuit/module for determining movement 4330 (e.g., a means for determining movement) may correspond to, for example, a processing circuit.

In some scenarios, the circuit/module for determining movement 4330 generates an indication of movement of another apparatus (e.g., a UT) based on location information for the other apparatus. To this end, the circuit/module for determining movement 4330 may obtain this location information from the circuit/module for receiving 4326, the communication interface 4302, the memory device, or some other component of the apparatus 4300. The circuit/module for determining movement 4330 may thereby process this obtained information to generate the indication of movement (e.g., by generating an indication of speed or a vector indicative of the movement). The circuit/module for determining movement 4330 then outputs the indication (e.g., to the circuit/module for determining whether to send 4324, the memory device 4308, or some other component of the apparatus 4300).

The circuit/module for determining how many entries to send 4332 may include circuitry and/or programming (e.g., code for determining how many entries to send 4352 stored on the storage medium 4304) adapted to perform several functions relating to, for example, determining how many updated handoff entries should be sent to another apparatus. In some aspects, the circuit/module for determining how many entries to send 4332 (e.g., a means for determining how many entries to send) may correspond to, for example, a processing circuit.

In some scenarios, the circuit/module for determining how many entries to send 4332 determines the number of entries based on movement of the other apparatus. To this end, the circuit/module for determining how many entries to send 4332 may obtain movement information from the circuit/module for determining movement 4330, the memory device, or some other component of the apparatus 4300. The circuit/module for determining how many entries to send 4332 may thereby process this obtained information to determine how many entries to send. For example, as discussed herein, fewer entries may be sent to a relatively fast moving UT than are sent to a relatively slow moving or stationary UT. Thus, in some aspects, the determination of the number of entries may be based on at least one movement threshold, a mapping of movement to number of entries, or other decision criteria. The circuit/module for determining how many entries to send 4332 then outputs an indication of the number of entries to send (e.g., to the circuit/module for generating 4328, the memory device 4308, or some other component of the apparatus 4300).

Fourth Example Process

Figure 44:
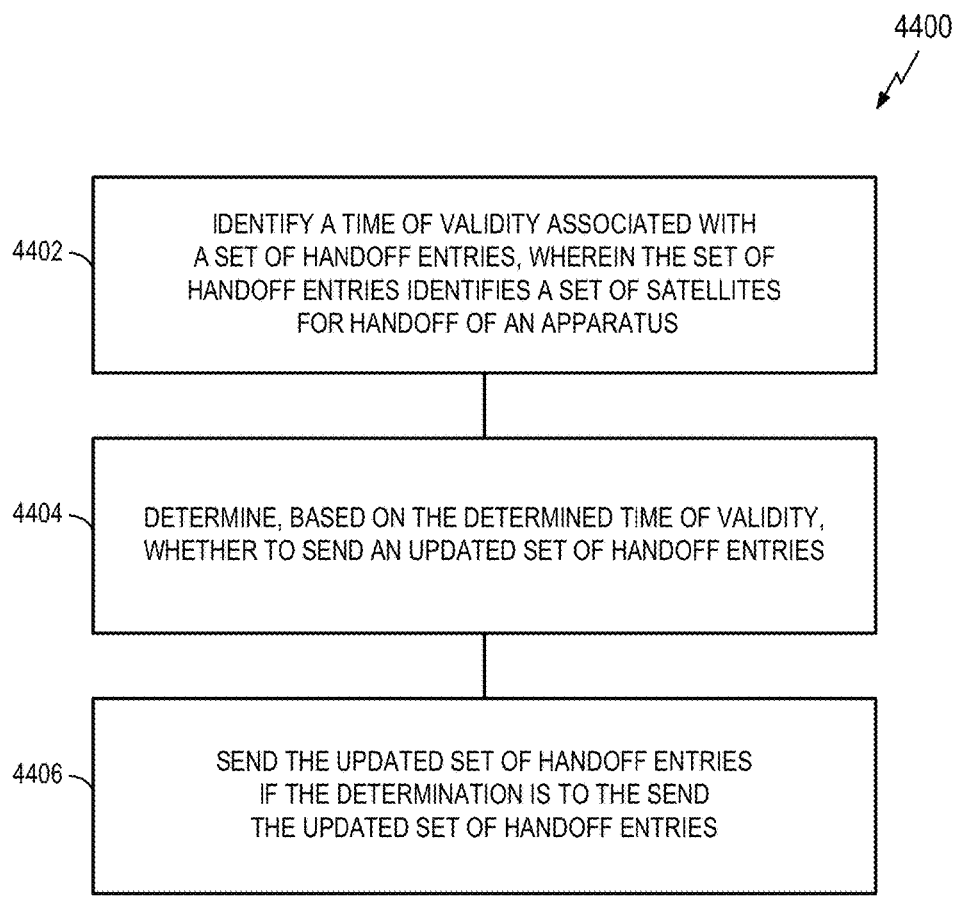
FIG. 44 is a flowchart illustrating an example communication process in accordance with some aspects of the disclosure.

FIG. 44 illustrates a process 4400 for communication in accordance with some aspects of the disclosure. The process 4400 may take place within a processing circuit (e.g., the processing circuit 4310 of FIG. 43), which may be located in a GN or some other suitable apparatus. Of course, in various aspects within the scope of the disclosure, the process 4400 may be implemented by any suitable apparatus capable of supporting communication-related operations.

At block 4402, an apparatus (e.g., a GN) identifies a time of validity associated with a set of handoff entries. In some aspects, the set of handoff entries may identify a set of satellites for handoff of another apparatus (e.g., a UT). In some aspects, the time of validity may indicate a duration of time that the set of handoff entries is valid.

The identification of the time of validity may take different forms in different implementations. In some aspects, the identification of the time of validity may include receiving an indication of the time of validity. In some aspects, the identification of the time of validity may include receiving an indication of a time associated with a particular entry of the set of handoff entries; and determining the time of validity based on the received indication. In some aspects, the identification of the time of validity may include determining a time associated with a last valid entry in the set of handoff entries.

The set of handoff entries may take different forms in different implementations. In some aspects, the set of handoff entries may include an idle mode handoff table. In some aspects, the set of handoff entries may identify at least one satellite for an idle mode operation of the other apparatus. In some aspects, the set of handoff entries may identify times at which the apparatus when in idle mode is to handoff to each satellite of the set of satellites. In some aspects, the set of handoff entries may include, for each satellite, a time for the apparatus when in idle mode to handoff to the satellite. In some aspects, the set of handoff entries may include a last set of handoff entries sent by the apparatus to the other apparatus.

At block 4404, the apparatus determines, based on the identified time of validity of block 4402, whether to send an updated set of handoff entries.

At block 4406, the apparatus sends the updated set of handoff entries if the determination is to send the updated set of handoff entries.

In some aspects, an apparatus may perform any of the operations discussed above for FIG. 44, or any combination thereof.

Fifth Example Process

Figure 45:
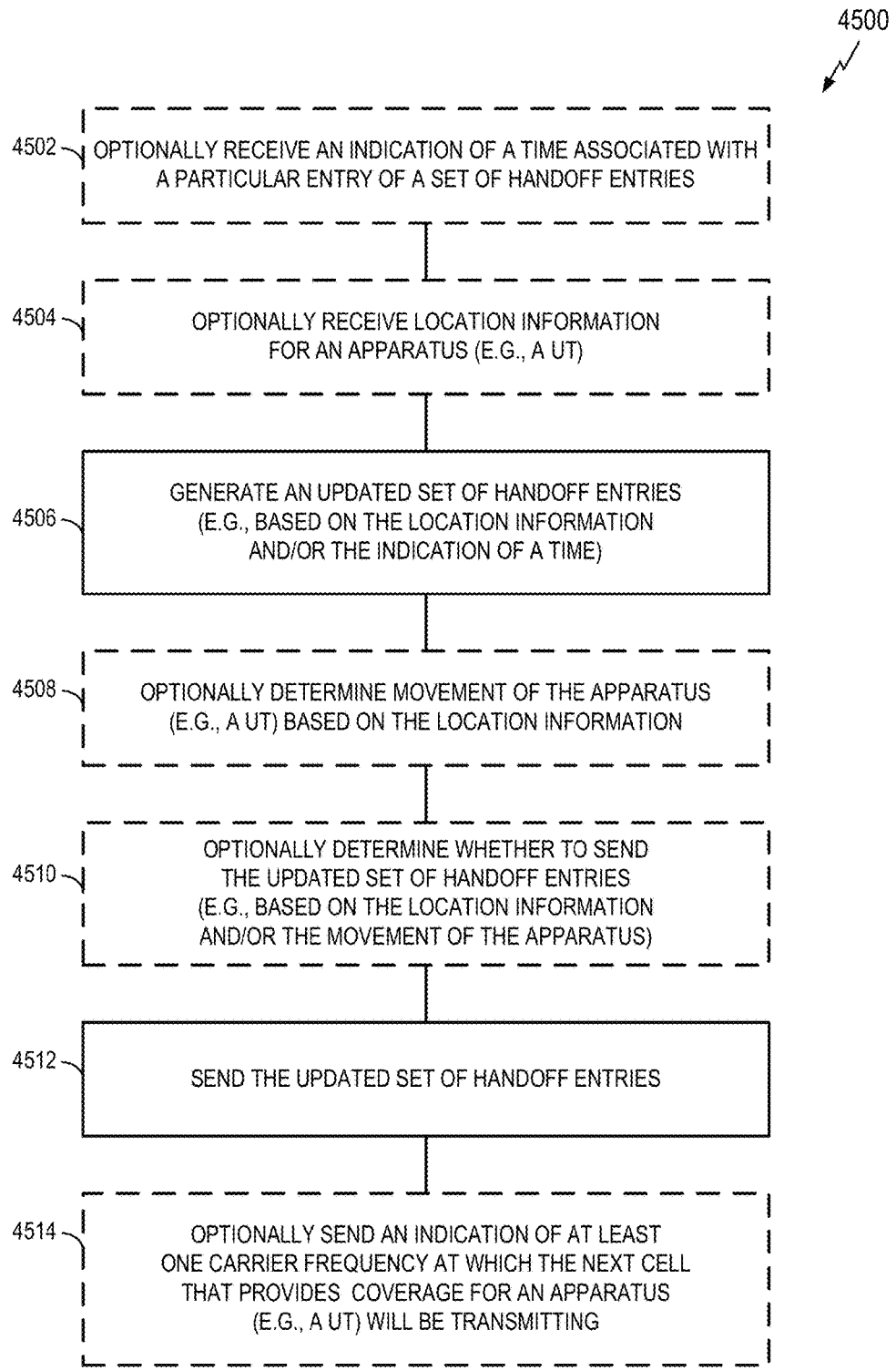
FIG. 45 is a flowchart illustrating an example communication process in accordance with some aspects of the disclosure.

FIG. 45 illustrates a process 4500 for communication in accordance with some aspects of the disclosure. One or more aspects of the process 4500 may be used in conjunction with (e.g., in addition to or as part of) the process 4400 of FIG. 44. The process 4500 may take place within a processing circuit (e.g., the processing circuit 4310 of FIG. 43), which may be located in a GN or some other suitable apparatus. Of course, in various aspects within the scope of the disclosure, the process 4500 may be implemented by any suitable apparatus capable of supporting communication-related operations.

At optional block 4502, an apparatus (e.g., a GN) may receive an indication of a time associated with a particular entry of a set of handoff entries.

At optional block 4504, the apparatus may receive location information for an apparatus (e.g., another apparatus such as a UT).

At block 4506, the apparatus generates an updated set of handoff entries (e.g., based on the location information and/or the indication of a time).

At optional block 4508, the apparatus may determine movement of an apparatus (e.g., another apparatus such as a UT) based on the location information.

At optional block 4510, the apparatus may determine whether to send the updated set of handoff entries (e.g., based on the location information and/or the movement of the other apparatus). In some aspects, the apparatus may determine how many updated handoff entries to send (e.g., based on the movement of the other apparatus).

At block 4512, the apparatus sends the updated set of handoff entries.

At optional block 4514, the apparatus may send an indication of at least one carrier frequency at which the next cell that provides coverage for the other apparatus (e.g., a UT) will be transmitting.

In some aspects, an apparatus may perform any of the operations discussed above for FIG. 45, or any combination thereof.

Third Example Apparatus

Figure 46:
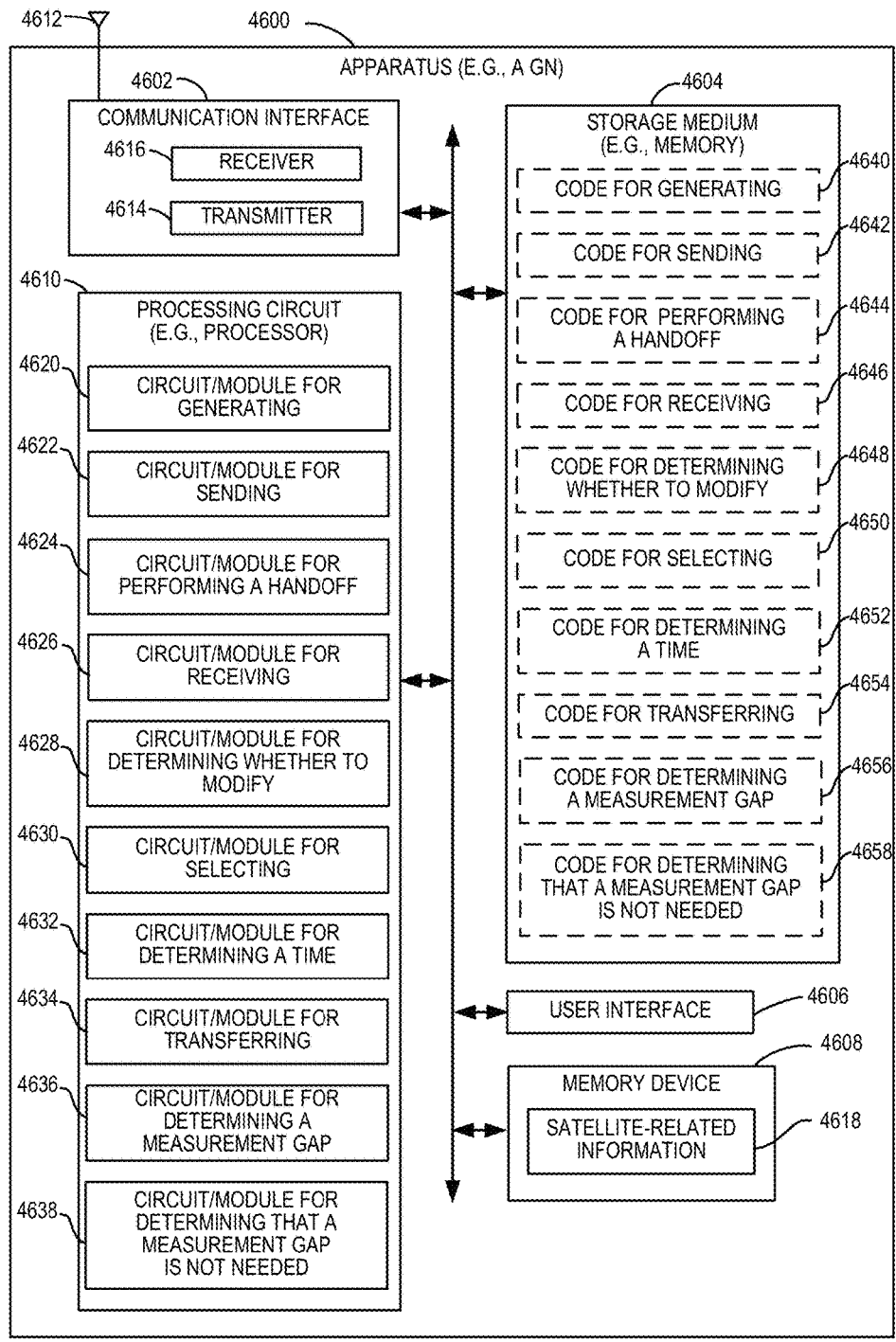
FIG. 46 is a block diagram illustrating an example hardware implementation for an apparatus (e.g., an electronic device) that can support satellite-related communication in accordance with some aspects of the disclosure.

FIG. 46 illustrates a block diagram of an example hardware implementation of an apparatus 4600 configured to communicate according to one or more aspects of the disclosure. For example, the apparatus 4600 could embody or be implemented within a GN or some other type of device that supports satellite communication. Thus, in some aspects, the apparatus 4600 could be an example of the GN 200 or the GN 201 of FIG. 1. In various implementations, the apparatus 4600 could embody or be implemented within a gateway, a ground station, a vehicular component, or any other electronic device having circuitry.

The apparatus 4600 includes a communication interface (e.g., at least one transceiver) 4602, a storage medium 4604, a user interface 4606, a memory device (e.g., a memory circuit) 4608, and a processing circuit (e.g., at least one processor) 4610. In various implementations, the user interface 4606 may include one or more of: a keypad, a display, a speaker, a microphone, a touchscreen display, of some other circuitry for receiving an input from or sending an output to a user.

These components can be coupled to and/or placed in electrical communication with one another via a signaling bus or other suitable component, represented generally by the connection lines in FIG. 46. The signaling bus may include any number of interconnecting buses and bridges depending on the specific application of the processing circuit 4610 and the overall design constraints. The signaling bus links together various circuits such that each of the communication interface 4602, the storage medium 4604, the user interface 4606, and the memory device 4608 are coupled to and/or in electrical communication with the processing circuit 4610. The signaling bus may also link various other circuits (not shown) such as timing sources, peripherals, voltage regulators, and power management circuits, which are well known in the art, and therefore, will not be described any further.

The communication interface 4602 provides a means for communicating with other apparatuses over a transmission medium. In some implementations, the communication interface 4602 includes circuitry and/or programming adapted to facilitate the communication of information bi-directionally with respect to one or more communication devices in a network. In some implementations, the communication interface 4602 is adapted to facilitate wireless communication of the apparatus 4600. In these implementations, the communication interface 4602 may be coupled to one or more antennas 4612 as shown in FIG. 46 for wireless communication within a wireless communication system. The communication interface 4602 can be configured with one or more standalone receivers and/or transmitters, as well as one or more transceivers. In the illustrated example, the communication interface 4602 includes a transmitter 4614 and a receiver 4616. The communication interface 4602 serves as one example of a means for receiving and/or means transmitting.

The memory device 4608 may represent one or more memory devices. As indicated, the memory device 4608 may maintain satellite-related information 4618 along with other information used by the apparatus 4600. In some implementations, the memory device 4608 and the storage medium 4604 are implemented as a common memory component. The memory device 4608 may also be used for storing data that is manipulated by the processing circuit 4610 or some other component of the apparatus 4600.

The storage medium 4604 may represent one or more computer-readable, machine-readable, and/or processor-readable devices for storing programming, such as processor executable code or instructions (e.g., software, firmware), electronic data, databases, or other digital information. The storage medium 4604 may also be used for storing data that is manipulated by the processing circuit 4610 when executing programming. The storage medium 4604 may be any available media that can be accessed by a general purpose or special purpose processor, including portable or fixed storage devices, optical storage devices, and various other mediums capable of storing, containing or carrying programming.

By way of example and not limitation, the storage medium 4604 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 4604 may be embodied in an article of manufacture (e.g., a computer program product). By way of example, a computer program product may include a computer-readable medium in packaging materials. In view of the above, in some implementations, the storage medium 4604 may be a non-transitory (e.g., tangible) storage medium.

The storage medium 4604 may be coupled to the processing circuit 4610 such that the processing circuit 4610 can read information from, and write information to, the storage medium 4604. That is, the storage medium 4604 can be coupled to the processing circuit 4610 so that the storage medium 4604 is at least accessible by the processing circuit 4610, including examples where at least one storage medium is integral to the processing circuit 4610 and/or examples where at least one storage medium is separate from the processing circuit 4610 (e.g., resident in the apparatus 4600, external to the apparatus 4600, distributed across multiple entities, etc.).

Programming stored by the storage medium 4604, when executed by the processing circuit 4610, causes the processing circuit 4610 to perform one or more of the various functions and/or process operations described herein. For example, the storage medium 4604 may include operations configured for regulating operations at one or more hardware blocks of the processing circuit 4610, as well as to utilize the communication interface 4602 for wireless communication utilizing their respective communication protocols.

The processing circuit 4610 is generally adapted for processing, including the execution of such programming stored on the storage medium 4604. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 4610 is arranged to obtain, process and/or send data, control data access and storage, issue commands, and control other desired operations. The processing circuit 4610 may include circuitry configured to implement desired programming provided by appropriate media in at least one example. For example, the processing circuit 4610 may be implemented as one or more processors, one or more controllers, and/or other structure configured to execute executable programming. Examples of the processing circuit 4610 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 4610 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 4610 are for illustration and other suitable configurations within the scope of the disclosure are also contemplated.

According to one or more aspects of the disclosure, the processing circuit 4610 may be adapted to perform any or all of the features, processes, functions, operations and/or routines for any or all of the apparatuses described herein. For example, the processing circuit 4610 may be configured to perform one or more of the steps, functions, and/or processes described with respect to FIGS. 11, 12, 15-24, 27, 29, 31-33, 35, 37, 47, and 48. As used herein, the term "adapted" in relation to the processing circuit 4610 may refer to the processing circuit 4610 being one or more of configured, employed, implemented, and/or programmed to perform a particular process, function, operation and/or routine according to various features described herein.

The processing circuit 4610 may be a specialized processor, such as an application specific integrated circuit (ASIC) that serves as a means for (e.g., structure for) carrying out one or more of the operations described in conjunction with FIGS. 11, 12, 15-24, 27, 29, 31-33, 35, 37, 47, and 48. The processing circuit 4610 serves as one example of a means for transmitting and/or a means for receiving. In some implementations, the processing circuit 4610 incorporates the functionality of the GN controller 250 of FIG. 2.

According to at least one example of the apparatus 4600, the processing circuit 4610 may include one or more of a circuit/module for generating 4620, a circuit/module for sending 4622, a circuit/module for performing handoffs 4624, a circuit/module for receiving 4626, a circuit/module for determining whether to modify 4628, a circuit/module for selecting 4630, a circuit/module for determining a time 4632, a circuit/module for transferring 4634, a circuit/module for determining a measurement gap 4636, or a circuit/module for determining that a measurement gap is not needed 4638. In various implementations, the circuit/module for generating 4620, the circuit/module for sending 4622, the circuit/module for performing handoffs 4624, the circuit/module for receiving 4626, the circuit/module for determining whether to modify 4628, the circuit/module for selecting 4630, the circuit/module for determining a time 4632, the circuit/module for transferring 4634, the circuit/module for determining a measurement gap 4636, and the circuit/module for determining that a measurement gap is not needed 4638 may correspond, at least in part, to the GN controller 250 of FIG. 2.

The circuit/module for generating 4620 may include circuitry and/or programming (e.g., code for generating 4640 stored on the storage medium 4604) adapted to perform several functions relating to, for example, generating satellite and cell transition information that specifies a time to start and a time to terminate communication with a particular cell of a particular satellite. In some implementations, the circuit/module for generating 4620 calculates the information (e.g., the data for Table 1) based on satellite ephemeris data and user terminal location data. To this end, the circuit/module for generating 4620 collects this data, processes the data to generate the information and sends the information to a component of the apparatus 4600 (e.g., the memory device 4608). For example, for a given location of a user terminal, the circuit/module for generating 4620 can determine when a particular cell of a particular satellite will provide coverage for the user terminal based on the location of the satellite and the directionality and coverage of the cells of the satellite over time.

The circuit/module for sending 4622 may include circuitry and/or programming (e.g., code for sending 4642 stored on the storage medium 4604) adapted to perform several functions relating to, for example, sending information (e.g., data) to another apparatus. Initially, the circuit/module for sending 4622 obtains the information to be sent (e.g., from the memory device 4608, the circuit/module for generating 4620, or some other component). In various implementations, the information to be sent may include satellite and cell transition information to be sent to a user terminal. In various implementations, the information to be sent may include information indicative of a measurement gap. The circuit/module for sending 4622 may then format the information for sending (e.g., in a message, according to a protocol, etc.). The circuit/module for sending 4622 then causes the information to be sent via a wireless communication medium (e.g., via satellite signaling). To this end, the circuit/module for sending 4622 may send the data to the communication interface 4602 (e.g., a digital subsystem or an RF subsystem) or some other component for transmission. In some implementations, the communication interface 4602 includes the circuit/module for sending 4622 and/or the code for sending 4642.

The circuit/module for performing a handoff 4624 may include circuitry and/or programming (e.g., code for performing a handoff 4644 stored on the storage medium 4604) adapted to perform several functions relating to, for example, performing handoffs for a user terminal to different cells and at least one satellite. In some implementations, the circuit/module for performing a handoff 4624 identifies the target satellite and/or the target cell based on the satellite and cell transition information (e.g., Table 1). To this end, the circuit/module for performing a handoff 4624 collects this information, processes the information to identify the target, and reconfigures its communication parameters to cause communication with the user terminal to be conducted via the target. For example, for a given location of a user terminal, the circuit/module for performing a handoff 4624 can determine whether a particular cell of a particular satellite would provide sufficient coverage for the user terminal based on the location of the satellite and the directionality and coverage of the cells of the satellite over time. If the satellite/cell would provide sufficient coverage, the circuit/module for performing a handoff 4624 can designate that satellite/cell as the target for the handoff and commence handoff signaling accordingly.

The circuit/module for receiving 4626 may include circuitry and/or programming (e.g., code for receiving 4646 stored on the storage medium 4604) adapted to perform several functions relating to, for example, receiving information (e.g., data) from another apparatus. In various implementations, the information to be received may include a measurement message from a user terminal. In various implementations, the information to be received may include capability information from a user terminal. In various implementations, the information to be received may include a message from a user terminal. Initially, the circuit/module for receiving 4626 obtains received information. For example, the circuit/module for receiving 4626 may obtain this information from a component of the apparatus 4600 (e.g., the communication interface 4602 (e.g., a digital subsystem or an RF subsystem), the memory device 4608, or some other component) or directly from a device (e.g., a satellite) that relayed the information from the user terminal. In some implementations, the circuit/module for receiving 4626 identifies a memory location of a value in the memory device 4608 and invokes a read of that location. In some implementations, the circuit/module for receiving 4626 processes (e.g., decodes) the received information. The circuit/module for receiving 4626 outputs the received information (e.g., stores the received information in the memory device 4608 or sends the information to another component of the apparatus 4600). In some implementations, the communication interface 4602 includes the circuit/module for receiving 4626 and/or the code for receiving 4642.

The circuit/module for determining whether to modify 4628 may include circuitry and/or programming (e.g., code for determining whether to modify 4648 stored on the storage medium 4604) adapted to perform several functions relating to, for example, determining whether to modify the satellite and cell transition information. In some implementations, the circuit/module for determining whether to modify 4628 makes this determination based on the received measurement message. To this end, the circuit/module for determining whether to modify 4628 collects this measurement message information (e.g., from the circuit/module for receiving 4626, the memory device 4608, or some other component of the apparatus 4600). The circuit/module for determining whether to modify 4628 may then process the information to determine whether the current timing parameters need to be changed (e.g., due to poor RF conditions or improved RF conditions). For example, the circuit/module for determining whether to modify 4628 may compare signal quality information contained in a measurement message with one or more signal quality thresholds. Finally, the circuit/module for determining whether to modify 4628 generates an indication of this determination (e.g., indicative of advancement of a handoff or delay of a handoff).

The circuit/module for selecting 4630 may include circuitry and/or programming (e.g., code for selecting 4650 stored on the storage medium 4604) adapted to perform several functions relating to, for example, selecting a handoff procedure for a user terminal. In some implementations, the circuit/module for selecting 4630 makes this determination based on capability information received from the user terminal. To this end, the circuit/module for selecting 4630 collects this capability information, processes the information to identify a handoff procedure, and generates an indication of this determination. For example, the selection of the handoff procedure may involve determining whether the user terminal is dual sense capable, and enabling or disabling monitoring for a measurement message from the user terminal based on whether the user terminal is dual sense capable. Thus, in some implementations, the circuit/module for selecting 4630 acquires configuration information about the user terminal (e.g., from the memory device 4608, from the receiver 4616, or from some other component), checks this information to identify the capability of the user terminal to select a supported handoff procedure, and generates an indication of this determination (e.g., that is sent to the memory device 4608, the circuit/module for performing a handoff 4624, or some other component).

The circuit/module for determining a time 4632 may include circuitry and/or programming (e.g., code for determining a time 4652 stored on the storage medium 4604) adapted to perform several functions relating to, for example, determining a time of handoff of a user terminal. In some implementations, the circuit/module for determining a time 4632 makes this determination based on the satellite and cell transition information (e.g., Table 1). To this end, the circuit/module for determining a time 4632 acquires this information (e.g., from the circuit/module for receiving 4626, the memory device 4608, or some other component of the apparatus 4600). The circuit/module for a time 4632 may then process the information to determine the time (e.g., the frame number) for the next handoff of the user terminal. For example, the circuit/module for a time 4632 may compare a current time indication (e.g., a frame number) with the timing indications in Table 1. The circuit/module for determining a time 4632 generates an indication of this determination (e.g., indicative of the time of handoff) and sends the indication to a component of the apparatus 4600 (e.g., the circuit/module for transferring 4634, the memory device 4608, or some other component).

The circuit/module for transferring 4634 may include circuitry and/or programming (e.g., code for transferring 4654 stored on the storage medium 4604) adapted to perform several functions relating to, for example, transferring user queues prior to handoff. Initially, the circuit/module for transferring 4634 receives an indication of a time of handoff (e.g., from the memory device 4608, the circuit/module for determining a time 4632, or some other component). Next, prior to the time of handoff, the circuit/module for transferring 4634 obtains queue information to be sent (e.g., from the memory device 4608, or some other component). In various implementations, this information may be sent to another GN. The circuit/module for transferring 4634 may then format the queue information for sending (e.g., in a message, according to a protocol, etc.). The circuit/module for transferring 4634 then causes the queue information to be sent via an appropriate communication medium (e.g., via the infrastructure 106 of FIG. 1). To this end, the circuit/module for transferring 4634 may send the data to the communication interface 4602 or some other component for transmission. In some implementations, the communication interface 4602 includes the circuit/module for transferring 4634 and/or the code for transferring 4654.

The circuit/module for determining a measurement gap 4636 may include circuitry and/or programming (e.g., code for determining a measurement gap 4656 stored on the storage medium 4604) adapted to perform several functions relating to, for example, determining a measurement gap for measuring satellite signals. In some implementations, the circuit/module for determining a measurement gap 4636 determines that there may be a satellite pointing error that necessitates a change in a handoff time. As a result of this determination or some other trigger, the circuit/module for determining a measurement gap 4636 generates an indication of a measurement gap to be used by a UT (e.g., a measurement gap pattern indicative of times when the GN is not transmitting to the UT). The circuit/module for determining a measurement gap 4636 then sends the indication to a component of the apparatus 4600 (e.g., the circuit/module for sending 4622, the memory device 4608, or some other component).

The circuit/module for determining that a measurement gap is not needed 4638 may include circuitry and/or programming (e.g., code for determining that a measurement gap is not needed 4658 stored on the storage medium 4604) adapted to perform several functions relating to, for example, determining that a measurement gap is not needed for measuring satellite signals. In some implementations, the circuit/module for determining that a measurement gap is not needed 4638 obtains information regarding the status of one or more satellites. Based on this information, the circuit/module for determining that a measurement gap is not needed 4638 determines that there is no satellite pointing error that would necessitate a change in a handoff time. As a result of this determination or some other trigger, the circuit/module for determining that a measurement gap is not needed 4638 generates an indication of this determination and sends the indication to a component of the apparatus 4600 (e.g., the circuit/module for generating 4620, the memory device 4608, or some other component).

As mentioned above, programming stored by the storage medium 4604, when executed by the processing circuit 4610, causes the processing circuit 4610 to perform one or more of the various functions and/or process operations described herein. For example, the programming, when executed by the processing circuit 4610, may cause the processing circuit 4610 to perform one or more of the various functions, steps, and/or processes described herein with respect to FIGS. 11, 12, 15-24, 27, 29, 31-33, 35, 37, 47, and 48 in various implementations. As shown in FIG. 46, the storage medium 4604 may include one or more of the code for generating 4640, the code for sending 4642, the code for performing handoffs 4644, the code for receiving 4646, the code for determining whether to modify 4648, the code for selecting 4650, the code for determining a time 4652, the code for transferring 4654, the code for determining a measurement gap 4656, or the code for determining that a measurement gap is not needed 4658.

Sixth Example Process

Figure 47:
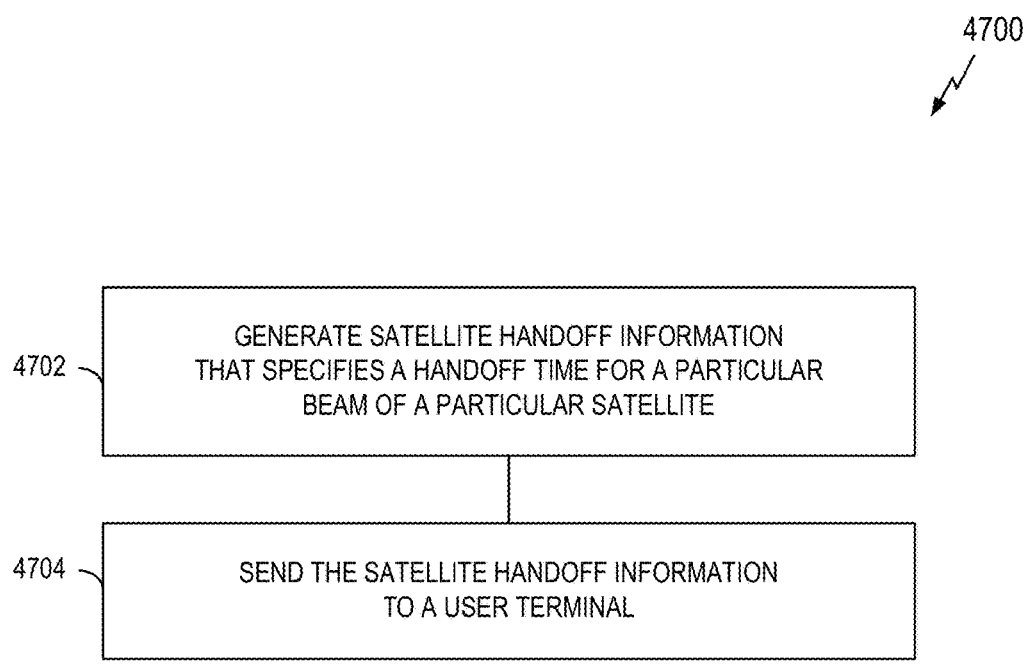
FIG. 47 is a flowchart illustrating an example of a process involving generation of satellite handoff information in accordance with some aspects of the disclosure.

FIG. 47 illustrates a process 4700 for communication in accordance with some aspects of the disclosure. The process 4700 may take place within a processing circuit (e.g., the processing circuit 4610 of FIG. 46), which may be located in a GN or some other suitable apparatus. In some implementations, the process 4700 may be performed by a GN for at least one non-geosynchronous satellite. In some implementations, the process 4700 represents operations performed by the GN controller 250 of FIG. 2. Of course, in various aspects within the scope of the disclosure, the process 4700 may be implemented by any suitable apparatus capable of supporting communication operations.

At block 4702, an apparatus (e.g., a GN) generates satellite handoff information that specifies a handoff time for a particular cell of a particular satellite. In some aspects, the operations of block 4702 may correspond to the operations of block 2406 of FIG. 24.

In some aspects, the generation of the satellite handoff information may be based on at least one of: capabilities information for a user terminal or location information for a user terminal. In some aspects, the capabilities information may indicate at least one of: whether the user terminal can sense multiple beams or whether the user terminal can sense multiple satellites. In some aspects, the capabilities information may indicate at least one of: an inter-beam tune time for the user terminal or an inter-satellite tune time for the user terminal. In some aspects, the location information may include at least one of: a current location for the user terminal or a motion vector for the user terminal.

In some aspects, the generation of the satellite handoff information may be based on at least one of: ephemeris information, a restriction due to an incumbent system, or a satellite pointing error. In some aspects, the generation of the satellite handoff information may be triggered based on at least one of: handoff of the user terminal to a different satellite or receipt of a measurement message from the user terminal.

In some implementations, the circuit/module for generating 4620 of FIG. 46 performs the operations of block 4702. In some implementations, the code for generating 4640 of FIG. 46 is executed to perform the operations of block 4702.

At block 4704, the apparatus sends the satellite handoff information to a user terminal. In some aspects, this information is sent via a satellite. In some aspects, the operations of block 4704 may correspond to the operations of block 2408 of FIG. 24.

The satellite handoff information may take various forms as taught herein. In some aspects, the satellite handoff information may include a table that includes a handoff activation time. In some aspects, the satellite handoff information may include at least one tune-away time. In some aspects, the handoff information may be for at least one future handoff (e.g., the next handoff, a later handoff, or some other handoff that will occur in the future). In some aspects, the handoff information may be for the next beam handoff and for at least one future satellite handoff (e.g., for the next two handoffs that will occur, the next handoff and some other subsequent handoff, etc.).

In some implementations, the circuit/module for sending 4622 of FIG. 46 performs the operations of block 4704. In some implementations, the code for sending 4642 of FIG. 46 is executed to perform the operations of block 4704.

In some aspects, the process 4700 may further include performing handoffs for the user terminal to different beams and at least one satellite based on the satellite handoff information. The handoffs may involve a change of at least one of: a satellite access network (SAN) or a GN antenna. The handoffs may involve a change of at least one of: a satellite beam or a forward service link (FSL) frequency. In some aspects, these operations may correspond to the operations of block 2410 of FIG. 24. In some implementations, the circuit/module for performing a handoff 4624 of FIG. 46 performs these operations. In some implementations, the code for performing a handoff 4644 of FIG. 46 is executed to perform these operations.

In some aspects, the process 4700 may further include receiving a measurement message from the user terminal, and determining, based on the measurement message, whether to modify the satellite handoff information. The modification of the satellite handoff information may include advancing handoff timing or delaying handoff timing. In some aspects, these operations may correspond to the operations of blocks 3102 and 3104 of FIG. 31. In some implementations, the circuit/module for receiving 4626 of FIG. 46 performs the receiving operations. In some implementations, the code for receiving 4646 of FIG. 46 is executed to perform the receiving operations. In some implementations, the circuit/module for determining whether to modify 4628 of FIG. 46 performs the determining operations. In some implementations, the code for determining whether to modify 4648 of FIG. 46 is executed to perform the determining operations.

In some aspects, the process 4700 may further include determining a measurement gap for measuring satellite signals, and sending information indicative of the measurement gap to the user terminal, wherein the measurement message includes an indication of a measurement of signals from at least one satellite conducted during the measurement gap. In some aspects, these operations may correspond to the operations of blocks 3506 and 3508 of FIG. 35. In some implementations, the circuit/module for determining a measurement gap 4636 of FIG. 46 performs the determining operations. In some implementations, the code for determining a measurement gap 4656 of FIG. 46 is executed to perform the determining operations. In some implementations, the circuit/module for sending 4622 of FIG. 46 performs the sending operations. In some implementations, the code for sending 4642 of FIG. 46 is executed to perform the sending operations.

In some aspects, the process 4700 may further include receiving capability information from the user terminal, and selecting a handoff procedure for the user terminal based on the received capability information. the capability information may indicate whether the user terminal is dual sense capable. The selection of the handoff procedure may include enabling or disabling monitoring for a measurement message from the user terminal based on whether the user terminal is dual sense capable. In some aspects, these operations may correspond to the operations of blocks 2702 and 2706 of FIG. 27. In some implementations, the circuit/module for receiving 4626 of FIG. 46 performs the receiving operations. In some implementations, the code for receiving 4646 of FIG. 46 is executed to perform the receiving operations. In some implementations, the circuit/module for selecting 4630 of FIG. 46 performs the selecting operations. In some implementations, the code for selecting 4650 of FIG. 46 is executed to perform the selecting operations.

In some aspects, the process 4700 may further include determining a time of a handoff of the user terminal, and transferring at least one user queue prior to the handoff. In some aspects, these operations may correspond to the operations of blocks 3702 and 3704 of FIG. 37. In some implementations, the circuit/module for determining a time 4632 of FIG. 46 performs the determining operations. In some implementations, the code for determining a time 4652 of FIG. 46 is executed to perform the determining operations. In some implementations, the circuit/module for transferring 4634 of FIG. 46 performs the transferring operations. In some implementations, the code for transferring 4654 of FIG. 46 is executed to perform the transferring operations.

In some aspects, the process 4700 may further include receiving, from the user terminal, a message comprising at least one of: user terminal paging area information or user terminal location information. In some aspects, these operations may correspond to the operations of block 2902 of FIG. 29. In some implementations, the circuit/module for receiving 4626 of FIG. 46 performs these operations. In some implementations, the code for receiving 4646 of FIG. 46 is executed to perform these operations.

In some aspects, the process 4700 may further include determining that a measurement gap is not needed for measuring satellite signals, wherein, as a result of the determination, the generation of the satellite handoff information involves not including a tune-away time in the satellite handoff information. In some aspects, these operations may correspond to the operations of blocks 3502 and 3504 of FIG. 35. In some implementations, the circuit/module for determining that a measurement gap is not needed 4638 of FIG. 46 performs these operations. In some implementations, the code for determining that a measurement gap is not needed 4658 of FIG. 46 is executed to perform these operations.

Seventh Example Process

Figure 48:
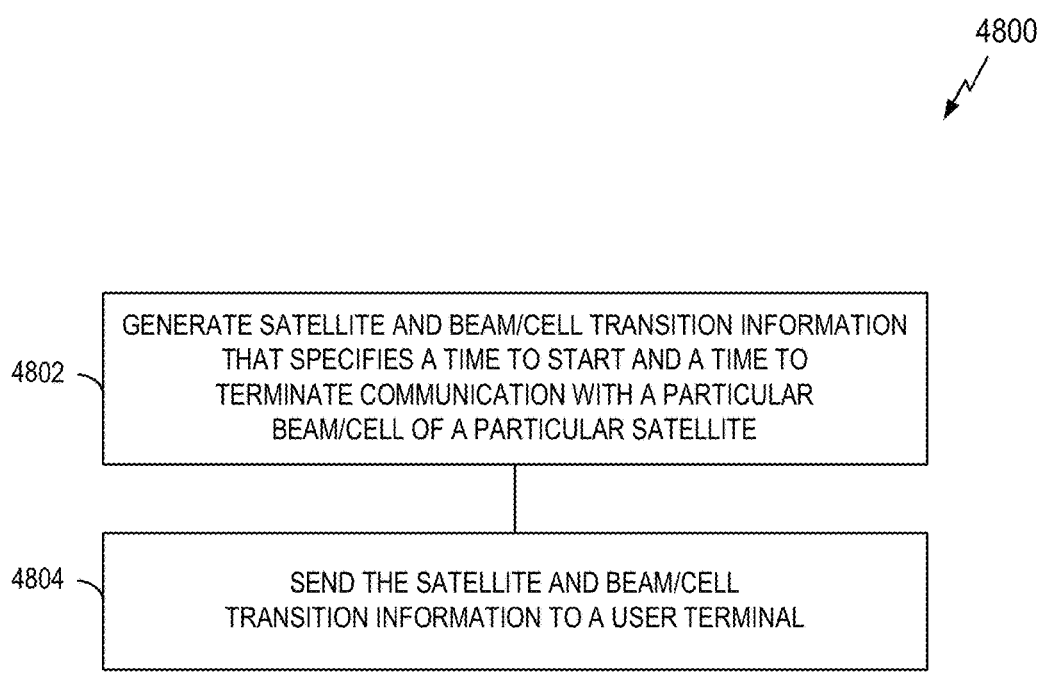
FIG. 48 is a flowchart illustrating an example of a process involving generation of satellite and cell transition information in accordance with some aspects of the disclosure.

FIG. 48 illustrates a process 4800 for communication in accordance with some aspects of the disclosure. The process 4800 may take place within a processing circuit (e.g., the processing circuit 4610 of FIG. 46), which may be located in a GN or some other suitable apparatus. In some implementations, the process 4800 may be performed by a GN for at least one non-geosynchronous satellite. In some implementations, the process 4800 represents operations performed by the GN controller 250 of FIG. 2. Of course, in various aspects within the scope of the disclosure, the process 4800 may be implemented by any suitable apparatus capable of supporting communication operations.

At block 4802, an apparatus (e.g., a GN) generates satellite and cell transition information that specifies a time to start and a time to terminate communication with a particular cell of a particular satellite. In some aspects, the operations of block 4802 may correspond to the operations of block 2406 of FIG. 24.

In some aspects, the satellite and cell transition information is generated based on at least one of: capabilities information for the user terminal, location information for the user terminal, ephemeris information, or a restriction due to an incumbent system. In some aspects, the capabilities information indicates at least one of: whether the user terminal can sense multiple cells, whether the user terminal can sense multiple satellites, an inter-cell tune time for the user terminal, or an inter-satellite tune time for the user terminal. In some aspects, the location information includes a current location for the user terminal or a motion vector for the user terminal.

In some aspects, the generation of the satellite and cell transition information is triggered based on at least one of: handoff of the user terminal to a different satellite, or receipt of a measurement message from the user terminal.

In some implementations, the circuit/module for generating 4620 of FIG. 46 performs the operations of block 4802. In some implementations, the code for generating 4640 of FIG. 46 is executed to perform the operations of block 4802.

At block 4804, the apparatus sends the satellite and cell transition information to a user terminal. In some aspects, this information is sent via a satellite. In some aspects, the operations of block 4804 may correspond to the operations of block 2408 of FIG. 24.

In some implementations, the circuit/module for sending 4622 of FIG. 46 performs the operations of block 4804. In some implementations, the code for sending 4642 of FIG. 46 is executed to perform the operations of block 4804.

In some aspects, the process 4800 further includes performing handoffs for the user terminal to different cells and at least one satellite based on the satellite and cell transition information. In some aspects, these operations may correspond to the operations of block 2410 of FIG. 24. In some implementations, the circuit/module for performing a handoff 4624 of FIG. 46 performs these operations. In some implementations, the code for performing a handoff 4644 of FIG. 46 is executed to perform these operations.

In some aspects, the process 4800 further includes receiving a measurement message from the user terminal; and determining, based on the measurement message, whether to modify the satellite and cell transition information. In some aspects, the modification of the satellite and cell transition information includes advancing a handoff or delaying a handoff. In some aspects, these operations may correspond to the operations of blocks 3102 and 3104 of FIG. 31. In some implementations, the circuit/module for receiving 4626 and/or the circuit/module for determining whether to modify 4628 of FIG. 46 performs these operations. In some implementations, the code for receiving 4646 and/or the code for determining whether to modify 4648 of FIG. 46 is executed to perform these operations.

In some aspects, the process 4800 further includes selecting a handoff procedure for the user terminal based on capability information received from the user terminal. In some aspects, the selection of the handoff procedure includes enabling or disabling monitoring for a measurement message from the user terminal based on whether the user terminal is dual sense capable. In some aspects, these operations may correspond to the operations of block 2706 of FIG. 27. In some implementations, the circuit/module for selecting 4630 of FIG. 46 performs these operations. In some implementations, the code for selecting 4650 of FIG. 46 is executed to perform these operations.

In some aspects, the process 4800 further includes determining a time of a handoff of the user terminal and transferring user queues prior to the handoff. In some implementations, the circuit/module for determining a time 4632 and/or the circuit/module for transferring 4634 of FIG. 46 performs these operations. In some implementations, the code for determining a time 4652 and/or the code for transferring 4654 of FIG. 46 is executed to perform these operations.

Fourth Example Apparatus

Figure 49:
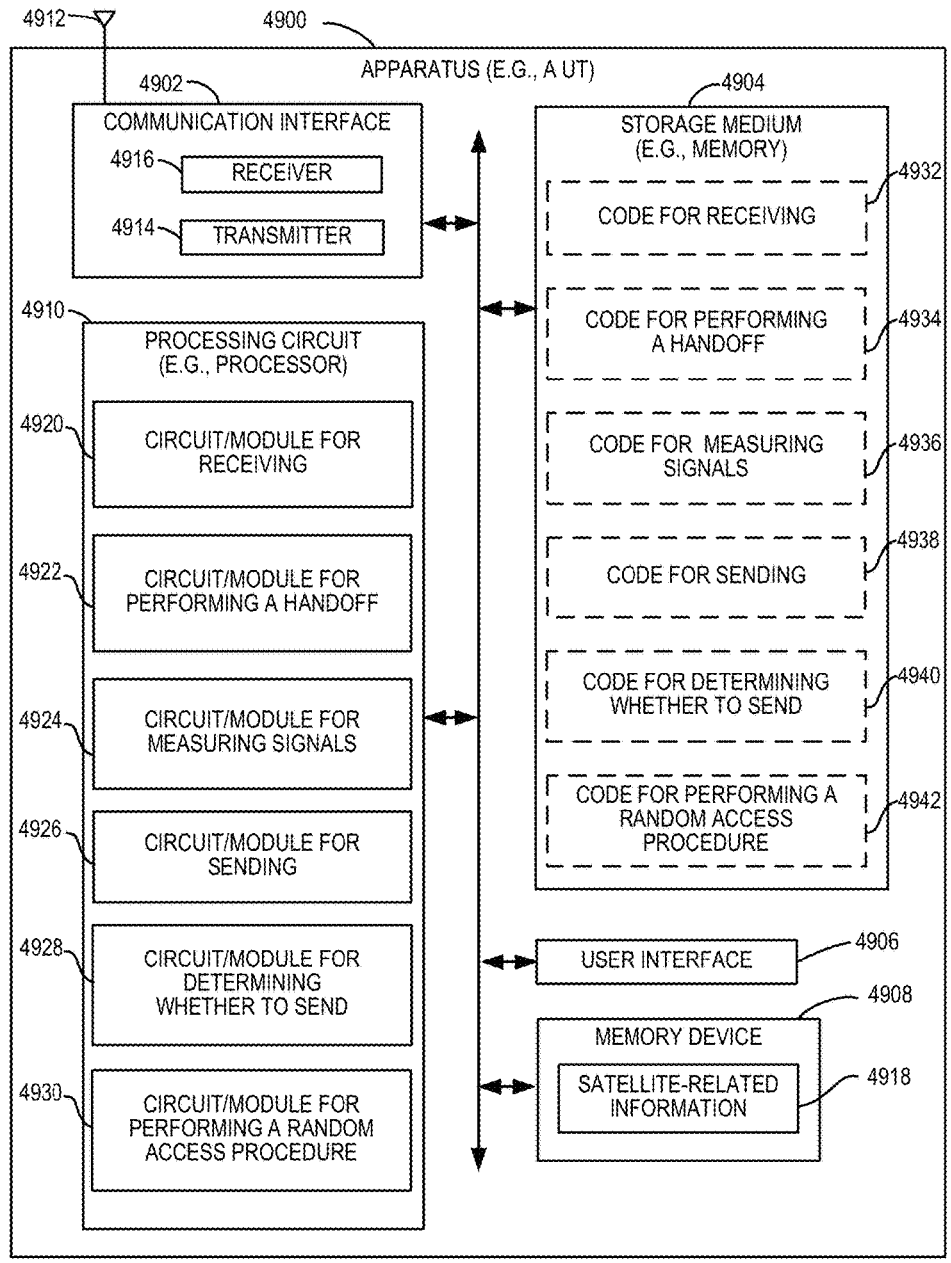
FIG. 49 is a block diagram illustrating an example hardware implementation for another apparatus (e.g., an electronic device) that can support satellite-related communication in accordance with some aspects of the disclosure.

FIG. 49 illustrates a block diagram of an example hardware implementation of another apparatus 4900 configured to communicate according to one or more aspects of the disclosure. For example, the apparatus 4900 could embody or be implemented within a UT or some other type of device that supports wireless communication. Thus, in some aspects, the apparatus 4900 could be an example of the UT 400 or the UT 401 of FIG. 1. In various implementations, the apparatus 4900 could embody or be implemented within a mobile phone, a smart phone, a tablet, a portable computer, a server, a personal computer, a sensor, an entertainment device, a vehicular component, medical devices, or any other electronic device having circuitry.

The apparatus 4900 includes a communication interface (e.g., at least one transceiver) 4902, a storage medium 4904, a user interface 4906, a memory device 4908 (e.g., storing satellite-related information 4918), and a processing circuit (e.g., at least one processor) 4910. In various implementations, the user interface 4906 may include one or more of: a keypad, a display, a speaker, a microphone, a touchscreen display, of some other circuitry for receiving an input from or sending an output to a user. The communication interface 4902 may be coupled to one or more antennas 4912, and may include a transmitter 4914 and a receiver 4916. In general, the components of FIG. 49 may be similar to corresponding components of the apparatus 4600 of FIG. 46.

According to one or more aspects of the disclosure, the processing circuit 4910 may be adapted to perform any or all of the features, processes, functions, operations and/or routines for any or all of the apparatuses described herein. For example, the processing circuit 4910 may be configured to perform one or more of the steps, functions, and/or processes described with respect to FIGS. 11, 12, 15-23, 25, 26, 28, 30, 32-34, 36, 38, 50, and 51. As used herein, the term "adapted" in relation to the processing circuit 4910 may refer to the processing circuit 4910 being one or more of configured, employed, implemented, and/or programmed to perform a particular process, function, operation and/or routine according to various features described herein.

The processing circuit 4910 may be a specialized processor, such as an application specific integrated circuit (ASIC) that serves as a means for (e.g., structure for) carrying out one or more of the operations described in conjunction with FIGS. 11, 12, 15-23, 25, 26, 28, 30, 32-34, 36, 38, 50, and 51. The processing circuit 4910 serves as one example of a means for transmitting and/or a means for receiving. In various implementations, the processing circuit 4910 may incorporate the functionality of the control processor 420 of FIG. 4.

According to at least one example of the apparatus 4900, the processing circuit 4910 may include one or more of a circuit/module for receiving 4920, a circuit/module for performing a handoff 4922, a circuit/module for measuring signals 4924, a circuit/module for sending 4926, a circuit/module for determining whether to send 4928, or a circuit/module for performing a random access procedure 4930. In various implementations, the circuit/module for receiving 4920, the circuit/module for performing a handoff 4922, the circuit/module for measuring signals 4924, the circuit/module for sending 4926, the circuit/module for determining whether to send 4928, and the circuit/module for performing a random access procedure 4930 may correspond, at least in part, to the control processor 420 of FIG. 4.

The circuit/module for receiving 4920 may include circuitry and/or programming (e.g., code for receiving 4932 stored on the storage medium 4904) adapted to perform several functions relating to, for example, receiving information (e.g., data) from another apparatus. In various implementations, the information to be received may include satellite and cell transition information that specifies a time to start and a time to terminate communication with a particular cell of a particular satellite. In various implementations, the information to be received may include information indicative of a measurement gap. In various implementations, the information to be received may include a dedicated preamble signature. Initially, the circuit/module for receiving 4920 obtains received information. For example, the circuit/module for receiving 4920 may obtain this information from a component of the apparatus 4900 or directly from a device (e.g., a satellite) that relayed the information from a GN. In the former case, the circuit/module for receiving 4920 may obtain this information from the communication interface 4902 (e.g., a UT transceiver as described above for the UT 400 of FIG. 4), the memory device 4908, or some other component. In some implementations, the circuit/module for receiving 4920 identifies a memory location of a value in the memory device 4908 and invokes a read of that location. In some implementations, the circuit/module for receiving 4920 processes (e.g., decodes) the received information. The circuit/module for receiving 4920 outputs the received information (e.g., sends the received information to the memory device 4908, the circuit/module for performing a handoff 4922, or some other component of the apparatus 4900). In some implementations, the communication interface 4902 includes the circuit/module for receiving 4920 and/or the code for receiving 4932.

The circuit/module for performing a handoff 4922 may include circuitry and/or programming (e.g., code for performing a handoff 4934 stored on the storage medium 4904) adapted to perform several functions relating to, for example, performing handoff to a particular cell of a particular satellite. In some implementations, the circuit/module for performing a handoff 4922 identifies a particular cell of a particular satellite based on satellite and cell transition information (e.g., Table 1). To this end, the circuit/module for performing a handoff 4922 collects this information, processes the information to identify the satellite and cell, and reconfigures its communication parameters to cause communication with a GN to be conducted via the identified satellite and cell. For example, at a particular point in time, the circuit/module for performing a handoff 4922 can use the information in Table 1 to determine whether the user terminal should switch to a different satellite cell. As another example, triggers may be set up at cell/satellite transitions times (e.g., frame numbers) indicated in Table 1.

The circuit/module for measuring signals 4924 may include circuitry and/or programming (e.g., code for measuring signals 4936 stored on the storage medium 4904) adapted to perform several functions relating to, for example, receiving and processing signals from at least one satellite. Initially, the circuit/module for measuring signals 4924 receives signals. For example, the circuit/module for measuring signals 4924 may obtain signal information from a component of the apparatus 4900 or directly from a satellite that transmitted the signals. As an example of the former case, the circuit/module for measuring signals 4924 may obtain signal information from the communication interface 4902 (e.g., a UT transceiver as described above for the UT 400 of FIG. 4), the memory device 4908 (e.g., if the received signals have been digitized), or some other component of the apparatus 4900. The circuit/module for measuring signals 4924 then processes the received signals (e.g., to determine at least one signal quality of the signals). Finally, the circuit/module for measuring signals 4924 generates an indication of this measurement and sends the indication to the memory device 4908, the circuit/module for sending 4924, or some other component of the apparatus 4900. In some implementations, the communication interface 4902 includes the circuit/module for measuring signals 4924 and/or the code for measuring signals 4936.

The circuit/module for sending 4926 may include circuitry and/or programming (e.g., code for sending 4938 stored on the storage medium 4904) adapted to perform several functions relating to, for example, sending information (e.g., messages) to another apparatus. Initially, the circuit/module for sending 4926 obtains the information to be sent (e.g., from the memory device 4908, the circuit/module for measuring signals 4924, or some other component). In various implementations, the information to be sent may include a measurement message based on measured signals, a message including user terminal capability information, or a message including user terminal location information. In various implementations, the information to be sent may include a message including user terminal capability information. In various implementations, the information to be sent may include a message including user terminal location information. In various implementations, the information to be sent may include a message including user terminal paging area information. The circuit/module for sending 4926 may format the information for sending (e.g., according to a message format, according to a protocol, etc.). The circuit/module for sending 4926 then causes the information to be sent via a wireless communication medium (e.g., via satellite signaling). To this end, the circuit/module for sending 4926 may send the data to the communication interface 4902 (e.g., a UT transceiver as described above for the UT 400 of FIG. 4) or some other component for transmission. In some implementations, the communication interface 4902 includes the circuit/module for sending 4926 and/or the code for sending 4938.

The circuit/module for determining whether to send 4928 may include circuitry and/or programming (e.g., code for determining whether to send 4940 stored on the storage medium 4904) adapted to perform several functions relating to, for example, determining whether to send a message. In some implementations, the information to be sent may include a measurement message that is based on measured signals. Initially, the circuit/module for determining whether to send 4928 obtains information that is used to make a send decision (e.g., from the memory device 4908, the circuit/module for measuring signals 4924, or some other component). For example, the circuit/module for determining whether to send 4928 may obtain signal quality information from the circuit/module for measuring signals 4924. In this case, the circuit/module for determining whether to send 4928 may determine whether the signals from a current serving satellite and/or from a target satellite are inadequate (e.g., by comparing the signal quality information with a signal quality threshold). For example, the sending of a measurement message may be triggered if the signals are inadequate. Finally, the circuit/module for determining whether to send 4928 generates an indication of the determination and sends the indication to the memory device 4908, the circuit/module for sending 4926, or some other component of the apparatus 4900.

The circuit/module for performing a random access procedure 4930 may include circuitry and/or programming (e.g., code for performing a random access procedure 4942 stored on the storage medium 4904) adapted to perform several functions relating to, for example, performing a non-contention-based random access procedure using a dedicated preamble signature. In some implementations, the circuit/module for performing a random access procedure 4930 performs the random access operations described above in conjunction with FIG. 17. In some implementations, the circuit/module for performing a random access procedure 4930 performs the random access operations described above in conjunction with FIG. 19. In some implementations, the circuit/module for performing a random access procedure 4930 performs the random access operations described above in conjunction with FIG. 21. In some implementations, the circuit/module for performing a random access procedure 4930 performs the random access operations described above in conjunction with FIG. 23. In some implementations, the circuit/module for performing a random access procedure 4930 performs the operations described above in conjunction with FIG. 38.

As mentioned above, programming stored by the storage medium 4904, when executed by the processing circuit 4910, causes the processing circuit 4910 to perform one or more of the various functions and/or process operations described herein. For example, the programming, when executed by the processing circuit 4910, may cause the processing circuit 4910 to perform one or more of the various functions, steps, and/or processes described herein with respect to FIGS. 11, 12, 15-23, 25, 26, 28, 30, 32-34, 36, 38, 50, and 51 in various implementations. As shown in FIG. 49, the storage medium 4904 may include one or more of the code for receiving 4932, the code for performing handoffs 4934, the code for measuring signals 4936, the code for sending 4938, the code for determining whether to send 4940, or the code for performing a random access procedure 4942.

Eighth Example Process

Figure 50:
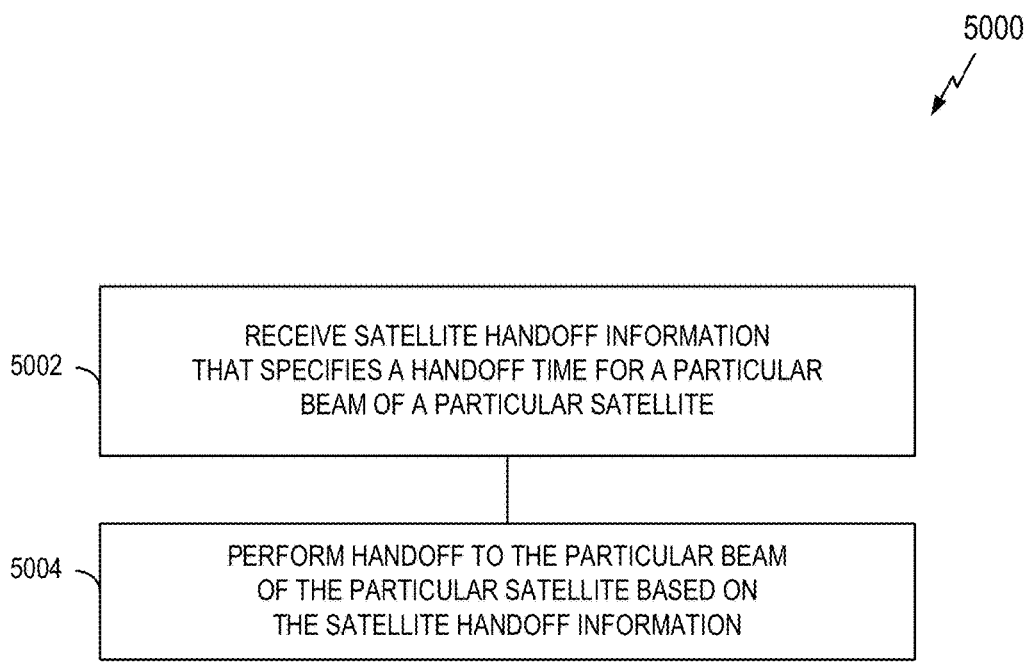
FIG. 50 is a flowchart illustrating an example of a process involving handoff in accordance with some aspects of the disclosure.

FIG. 50 illustrates a process 5000 for communication in accordance with some aspects of the disclosure. The process 5000 may take place within a processing circuit (e.g., the processing circuit 4910 of FIG. 49), which may be located in a UT or some other suitable apparatus. In some implementations, the process 5000 represents operations performed by the control processor 420 of FIG. 4. Of course, in various aspects within the scope of the disclosure, the process 5000 may be implemented by any suitable apparatus capable of supporting communication operations.

At block 5002, an apparatus (e.g., a UT) receives satellite handoff information that specifies a handoff time for a particular cell of a particular satellite. In some aspects, the operations of block 5002 may correspond to the operations of block 2504 of FIG. 25.

The satellite handoff information may take various forms as taught herein. In some aspects, the satellite handoff information may include a table that includes a handoff activation time. In some aspects, the satellite handoff information may include at least one tune-away time. In some aspects, the handoff information may be defined based, in part, on a satellite pointing error. In some aspects, the handoff information may be for at least one future handoff (e.g., the next handoff, a later handoff, or some other handoff that will occur in the future). In some aspects, the handoff information may be for the next beam handoff and for at least one future satellite handoff (e.g., for the next two handoffs that will occur, the next handoff and some other subsequent handoff, etc.).

In some implementations, the circuit/module for receiving 4920 of FIG. 49 performs the operations of block 5002. In some implementations, the code for receiving 4932 of FIG. 49 is executed to perform the operations of block 5002.

At block 5004, the apparatus performs handoff to the particular cell of the particular satellite based on the satellite handoff information. In some aspects, the operations of block 5004 may correspond to the operations of block 2506 of FIG. 25.

In some aspects, the handoff may involve a change of at least one of: a satellite access network (SAN), a GN antenna, a satellite beam, or a forward service link (FSL) frequency.

In some implementations, the circuit/module for performing a handoff 4922 of FIG. 49 performs the operations of block 5004. In some implementations, the code for performing a handoff 4934 of FIG. 49 is executed to perform the operations of block 5004.

In some aspects, the process 5000 may further include measuring signals from at least one satellite, and sending a measurement message based on the measured signals, wherein the satellite handoff information is received as a result of the measurement message being sent. The measurement message may include at least one of: measurement data based on the measured signals, a request to advance handoff timing, or a request to delay handoff timing. In some aspects, these operations may correspond to the operations of blocks 3004 and 3008 of FIG. 30.

In some aspects, the process 5000 may further include receiving information indicative of a measurement gap for measuring satellite signals, wherein the measurement of the signals from the at least one satellite is conducted during the measurement gap. In some aspects, these operations may correspond to the operations of blocks 3602 and 3604 of FIG. 36.

In some aspects, the process 5000 may further include determining whether to send the measurement message based on at least one of: whether signals from a current serving satellite are inadequate or whether signals from a target satellite are inadequate. In some aspects, these operations may correspond to the operations of block 3006 of FIG. 30.

In some aspects, the process 5000 may further include sending a message including user terminal capability information, wherein the received satellite handoff information is based on the user terminal capability information. The user terminal capability information may indicate at least one of: whether a user terminal can sense multiple beams, whether a user terminal can sense multiple satellites, a user terminal inter-beam tune time, or a user terminal inter-satellite tune time. The sending of the message including user terminal capability information may be triggered as a result of an initial connection to a satellite. In some aspects, these operations may correspond to the operations of block 2606 of FIG. 26.

In some aspects, the process 5000 may further include sending a message including user terminal location information, wherein the received satellite handoff information is based on the user terminal location information. The user terminal location information may include at least one of: a current user terminal location or a user terminal motion vector. The sending of the message including user terminal location information may be triggered as a result of at least one of: an initial connection to a satellite, whether a user terminal is beyond a geographical boundary, or whether an error bound has been exceeded. In some aspects, these operations may correspond to the operations of block 2806 of FIG. 28.

In some aspects, the process 5000 may further include receiving a dedicated preamble signature, and performing a non-contention-based random access procedure using the dedicated preamble signature. In some aspects, these operations may correspond to the operations of blocks 3802 and 3804 of FIG. 38.

In some aspects, the process 5000 may further include determining whether to send the measurement message based on at least one of: whether signals from a current serving satellite are inadequate or whether signals from a target satellite are inadequate. In some aspects, these operations may correspond to the operations of block 2806 of FIG. 28.

Ninth Example Process

Figure 51:
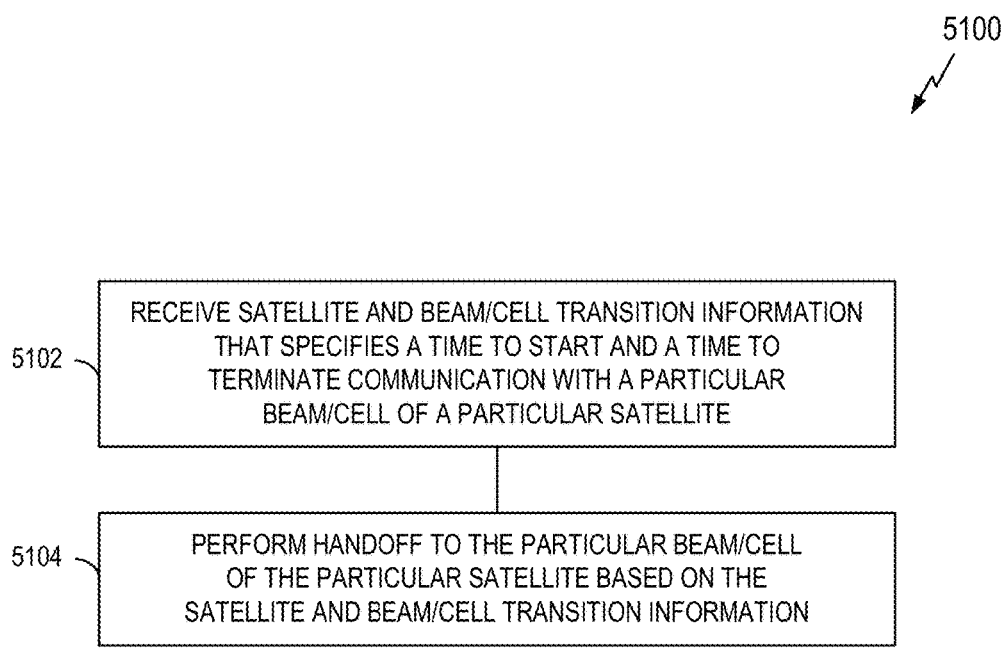
FIG. 51 is a flowchart illustrating an example of a process involving handoff in accordance with some aspects of the disclosure.

FIG. 51 illustrates a process 5100 for communication in accordance with some aspects of the disclosure. The process 5100 may take place within a processing circuit (e.g., the processing circuit 4910 of FIG. 49), which may be located in a UT or some other suitable apparatus. In some implementations, the process 5100 represents operations performed by the control processor 420 of FIG. 4. Of course, in various aspects within the scope of the disclosure, the process 5100 may be implemented by any suitable apparatus capable of supporting communication operations.

At block 5102, an apparatus (e.g., a UT) receives satellite and cell transition information that specifies a time to start and a time to terminate communication with a particular cell of a particular satellite. In some aspects, the operations of block 5102 may correspond to the operations of block 2504 of FIG. 25.

In some implementations, the circuit/module for receiving 4920 of FIG. 49 performs the operations of block 5102. In some implementations, the code for receiving 4932 of FIG. 49 is executed to perform the operations of block 5102.

At block 5104, the apparatus performs handoff to the particular cell of the particular satellite based on the satellite and cell transition information. In some aspects, the operations of block 5104 may correspond to the operations of block 2506 of FIG. 25.

In some implementations, the circuit/module for performing a handoff 4922 of FIG. 49 performs the operations of block 5104. In some implementations, the code for performing a handoff 4934 of FIG. 49 is executed to perform the operations of block 5104.

In some aspects, the process 5100 further includes: measuring signals from at least one satellite; and sending a measurement message based on the measured signals, wherein the satellite and cell transition information is received as a result of sending the measurement message. In some aspects, the measurement message includes at least one of: measurement data, a request to advance handoff timing, or a request to delay handoff timing. In some aspects, the process 5100 further includes determining whether to send the measurement message based on at least one of: whether signals from a current serving satellite are inadequate, or whether signals from a target satellite are inadequate. In some aspects, these operations may correspond to the operations of blocks 3004-3008 of FIG. 30. In some implementations, the circuit/module for measuring signals 4924 and/or the circuit/module for determining whether to send 4928 of FIG. 49 performs these operations. In some implementations, the code for measuring signals 4936 and/or the code for determining whether to send 4940 of FIG. 49 is executed to perform these operations.

In some aspects, the process 5100 further includes sending a message including user terminal capability information, wherein the satellite and cell transition information is based on the user terminal capability information. In some aspects, the user terminal capability information indicates at least one of: whether a user terminal can sense multiple cells, whether a user terminal can sense multiple satellites, a user terminal inter-cell tune time, or a user terminal inter-satellite tune time. In some aspects, the sending of the message including user terminal capability information is triggered as a result of an initial connection to a satellite. In some aspects, these operations may correspond to the operations of blocks 2602-2606 of FIG. 26. In some implementations, the circuit/module for sending 4926 of FIG. 49 performs these operations. In some implementations, the code for sending 4938 of FIG. 49 is executed to perform these operations.

In some aspects, the process 5100 further includes sending a message including user terminal location information, wherein the satellite and cell transition information is based on the user terminal location information. In some aspects, the user terminal location information includes a current user terminal location or a user terminal motion vector. In some aspects, the sending of the message including user terminal location information is triggered as a result of at least one of: an initial connection to a satellite, whether a user terminal is beyond a geographical boundary, or whether an error bound has been exceeded. In some aspects, these operations may correspond to the operations of blocks 2802-2806 of FIG. 28. In some implementations, the circuit/module for sending 4926 of FIG. 49 performs these operations. In some implementations, the code for sending 4938 of FIG. 49 is executed to perform these operations.

Additional Aspects

The examples set forth herein are provided to illustrate certain concepts of the disclosure. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

As those skilled in the art will readily appreciate, various aspects described throughout this disclosure may be extended to any suitable telecommunication system, network architecture, and communication standard. By way of example, various aspects may be applied to wide area networks, peer-to-peer network, local area network, other suitable systems, or any combination thereof, including those described by yet-to-be defined standards.

Many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

One or more of the components, steps, features and/or functions illustrated in above may be rearranged and/or combined into a single component, step, feature or function or embodied in several components, steps, or functions. Additional elements, components, steps, and/or functions may also be added without departing from novel features disclosed herein. The apparatus, devices, and/or components illustrated above may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example of a storage medium is coupled to the processor such that the processor can read information from, and write information to, the storage medium. In the alternative, the storage medium may be integral to the processor.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may comprise one or more elements. In addition, terminology of the form "at least one of a, b, or c" or "a, b, c, or any combination thereof" used in the description or the claims means "a or b or c or any combination of these elements." For example, this terminology may include a, or b, or c, or a and b, or a and c, or a and b and c, or 2a, or 2b, or 2c, or 2a and b, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated.

What is claimed is:

1. A method of communication for an apparatus, comprising:
   identifying a time associated with a particular entry of a set of handoff entries, wherein the set of handoff entries identifies a set of satellites for handoff of the apparatus;
   determining, based on the identified time, whether to send a request for an updated set of handoff entries; and
   sending the request for an updated set of handoff entries if the determination is to send the request.

2. The method of claim 1, wherein the set of handoff entries comprises an idle mode handoff table.

3. The method of claim 1, wherein the time comprises a start time for a handoff to one satellite of the set of satellites.

4. The method of claim 1, wherein the particular entry comprises a last entry of the set of handoff entries.

5. The method of claim 1, wherein the set of satellites is for an idle mode operation of the apparatus.

6. The method of claim 1, wherein:
   the time indicates when the apparatus is to handoff to one satellite of the set of satellites while the apparatus is in an idle mode.

7. The method of claim 1, further comprising:
   sending an indication of the time in conjunction with the sending of the request.

8. The method of claim 1, further comprising:
   sending an indication of a time of validity associated with the set of handoff entries in conjunction with the sending of the request.

9. The method of claim 1, further comprising:
   receiving the updated set of handoff entries after sending the request; and
   handing off the apparatus to a satellite identified by the updated set of handoff entries at a time indicated by the updated set of handoff entries.

10. The method of claim 9, further comprising:
    receiving an indication of at least one carrier frequency at which a next cell that provides coverage for the apparatus will be transmitting,
    wherein the handoff to the satellite identified by the updated set of handoff entries is conducted on the at least one carrier frequency.

11. The method of claim 1, further comprising:
    determining location information for the apparatus; and
    sending the location information in conjunction with the sending of the request.

12. An apparatus for communication, comprising:
    a memory; and
    a processor coupled to the memory,
    the processor and the memory configured to:
        identify a time associated with a particular entry of a set of handoff entries, wherein the set of handoff entries identifies a set of satellites for handoff of the apparatus;
        determine, based on the identified time, whether to send a request for an updated set of handoff entries; and send the request for an updated set of handoff entries if the determination is to send the request.

13. A method of communication for an apparatus, comprising:
identifying a quantity of valid entries in a set of handoff entries, wherein the set of handoff entries identifies a set of satellites for handoff of the apparatus;
determining, based on the identified quantity, whether to send a request for an updated set of handoff entries; and
sending the request for an updated set of handoff entries if the determination is to send the request.

14. The method of claim 13, wherein the set of handoff entries comprises an idle mode handoff table.

15. The method of claim 13, wherein:
the set of handoff entries further identifies times at which the apparatus when in idle mode is to handoff to each satellite of the set of satellites.

16. The method of claim 13, wherein the determination of whether to send the request for an updated set of handoff entries comprises:
determining whether the set of handoff entries includes only one valid entry.

17. The method of claim 13, further comprising:
receiving the updated set of handoff entries after sending the request; and
handing off the apparatus to a satellite identified by the updated set of handoff entries at a time indicated by the updated set of handoff entries.

18. The method of claim 17, further comprising:
receiving an indication of at least one carrier frequency at which a next cell that provides coverage for the apparatus will be transmitting,
wherein the handoff to the satellite identified by the updated set of handoff entries is conducted on the at least one carrier frequency.

19. The method of claim 13, further comprising:
determining location information for the apparatus; and
sending the location information in conjunction with the sending of the request.

20. A method of communication for an apparatus, comprising:
identifying a time of validity associated with a set of handoff entries, wherein the set of handoff entries identifies a set of satellites for handoff of another apparatus;
determining, based on the identified time of validity, whether to send an updated set of handoff entries; and
sending the updated set of handoff entries if the determination is to send the updated set of handoff entries.

21. The method of claim 20, wherein the set of handoff entries comprises an idle mode handoff table.

22. The method of claim 20, wherein the time of validity indicates a duration of time that the set of handoff entries is valid.

23. The method of claim 20, wherein the identification of the time of validity comprises:
receiving an indication of the time of validity.

24. The method of claim 20, wherein the identification of the time of validity comprises:
receiving an indication of a time associated with a particular entry of the set of handoff entries; and
determining the time of validity based on the received indication.

25. The method of claim 20, wherein the identification of the time of validity comprises:
determining a time associated with a last valid entry in the set of handoff entries.

26. The method of claim 20, wherein the set of handoff entries comprises a last set of handoff entries sent by the apparatus to the other apparatus.

27. The method of claim 20, further comprising:
receiving location information for the other apparatus; and
generating the updated set of handoff entries based on the location information,
wherein the updated set of handoff entries is sent to the other apparatus.

28. The method of claim 20, further comprising:
receiving location information for the other apparatus,
wherein the determination of whether to send the updated set of handoff entries is further based on the location information.

29. The method of claim 20, further comprising:
receiving location information for the other apparatus; and
determining movement of the other apparatus based on the location information,
wherein the determination of whether to send the updated set of handoff entries is further based on the movement of the other apparatus.

30. The method of claim 20, further comprising:
receiving location information for the other apparatus;
determining movement of the other apparatus based on the location information; and
determining how many updated handoff entries to send based on the movement of the other apparatus.

* * * * *